July 26, 1966    L. C. KLEIST ETAL    3,262,355
INFORMATION STORAGE AND REPRODUCING SYSTEM
Filed Nov. 6, 1961    22 Sheets-Sheet 1

INVENTORS.
LEROY C. KLEIST,
GEORGE L. BUENGER
BY
Lockwood, Woodard, Smith & Weikart
Attorneys

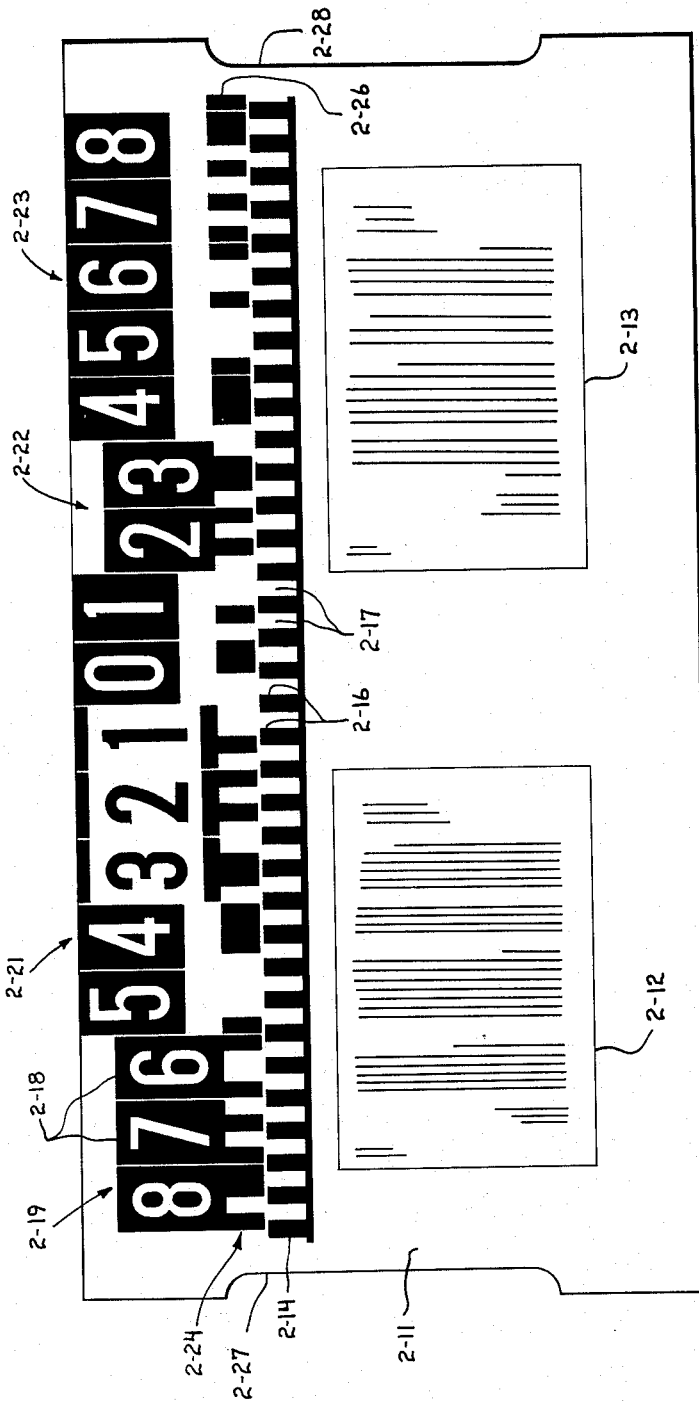

July 26, 1966    L. C. KLEIST ETAL    3,262,355
INFORMATION STORAGE AND REPRODUCING SYSTEM
Filed Nov. 6, 1961    22 Sheets-Sheet 3
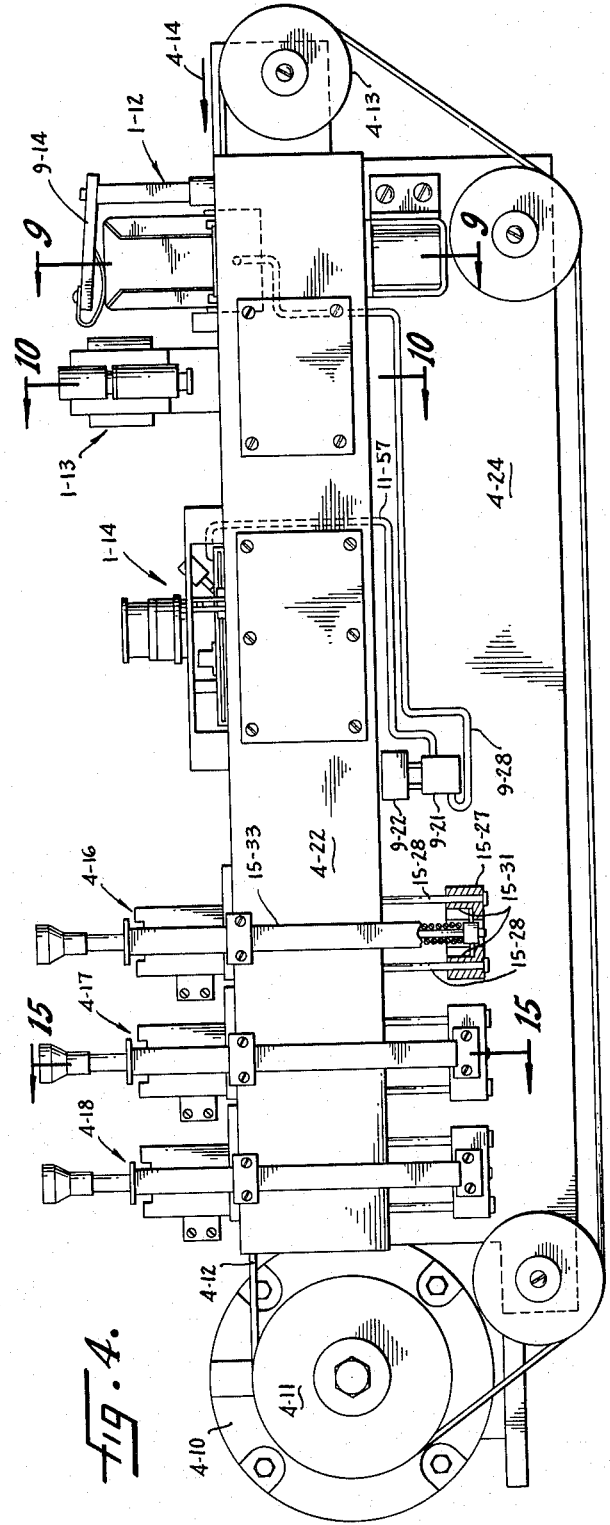
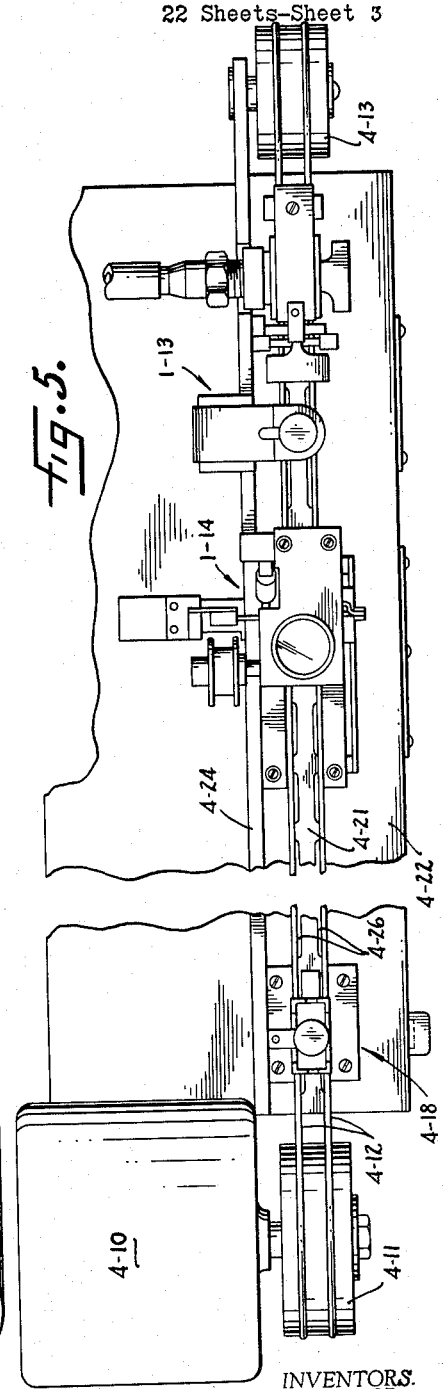
INVENTORS.
LEROY C. KLEIST,
GEORGE L. BUENGER
BY
Lockwood, Woodard, Smith & Weikart
Attorneys

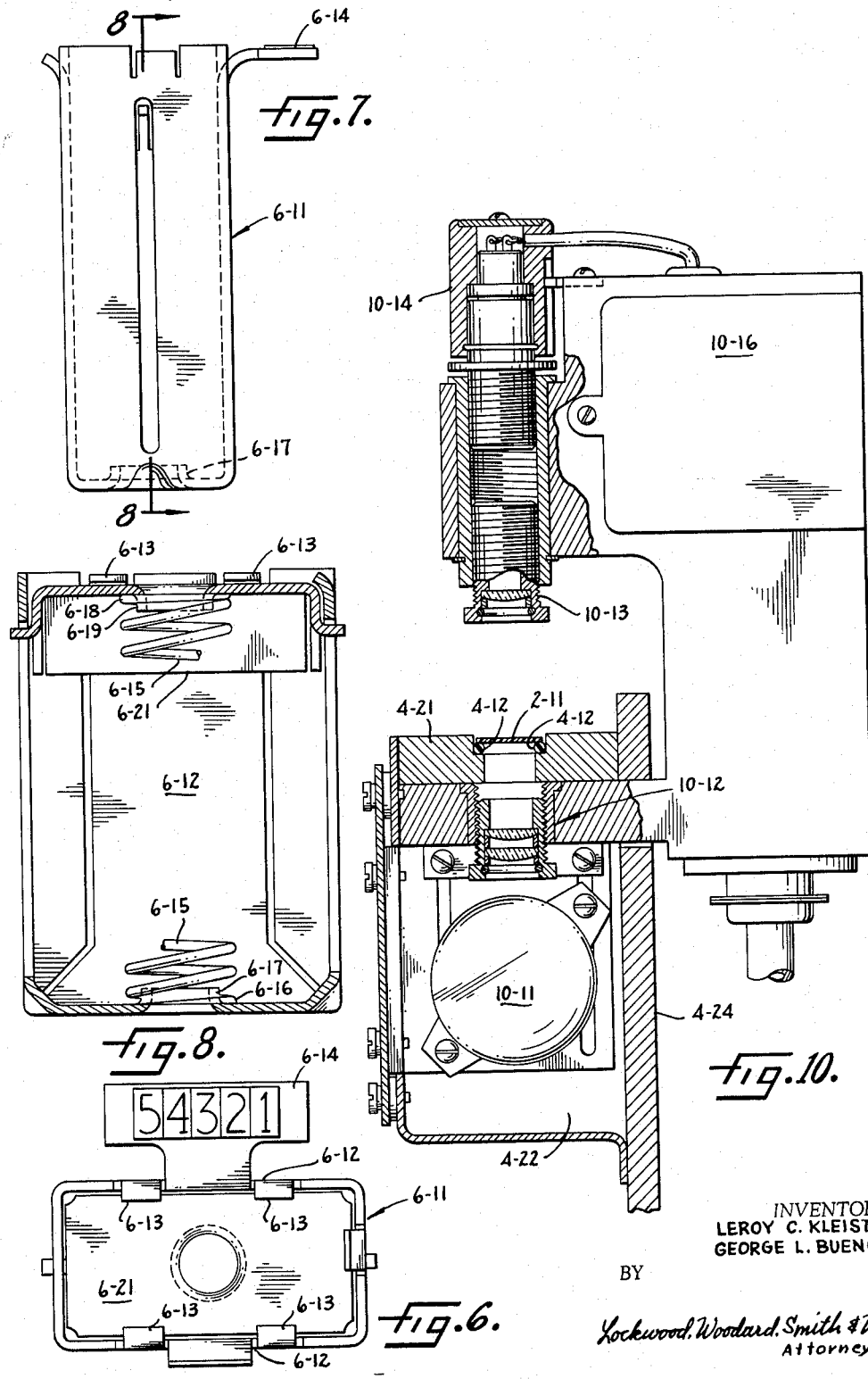

July 26, 1966     L. C. KLEIST ET AL     3,262,355

INFORMATION STORAGE AND REPRODUCING SYSTEM

Filed Nov. 6, 1961     22 Sheets-Sheet 5

INVENTORS.
LEROY C. KLEIST,
GEORGE L. BUENGER
BY
Lockwood, Woodard, Smith & Waikart
Attorneys

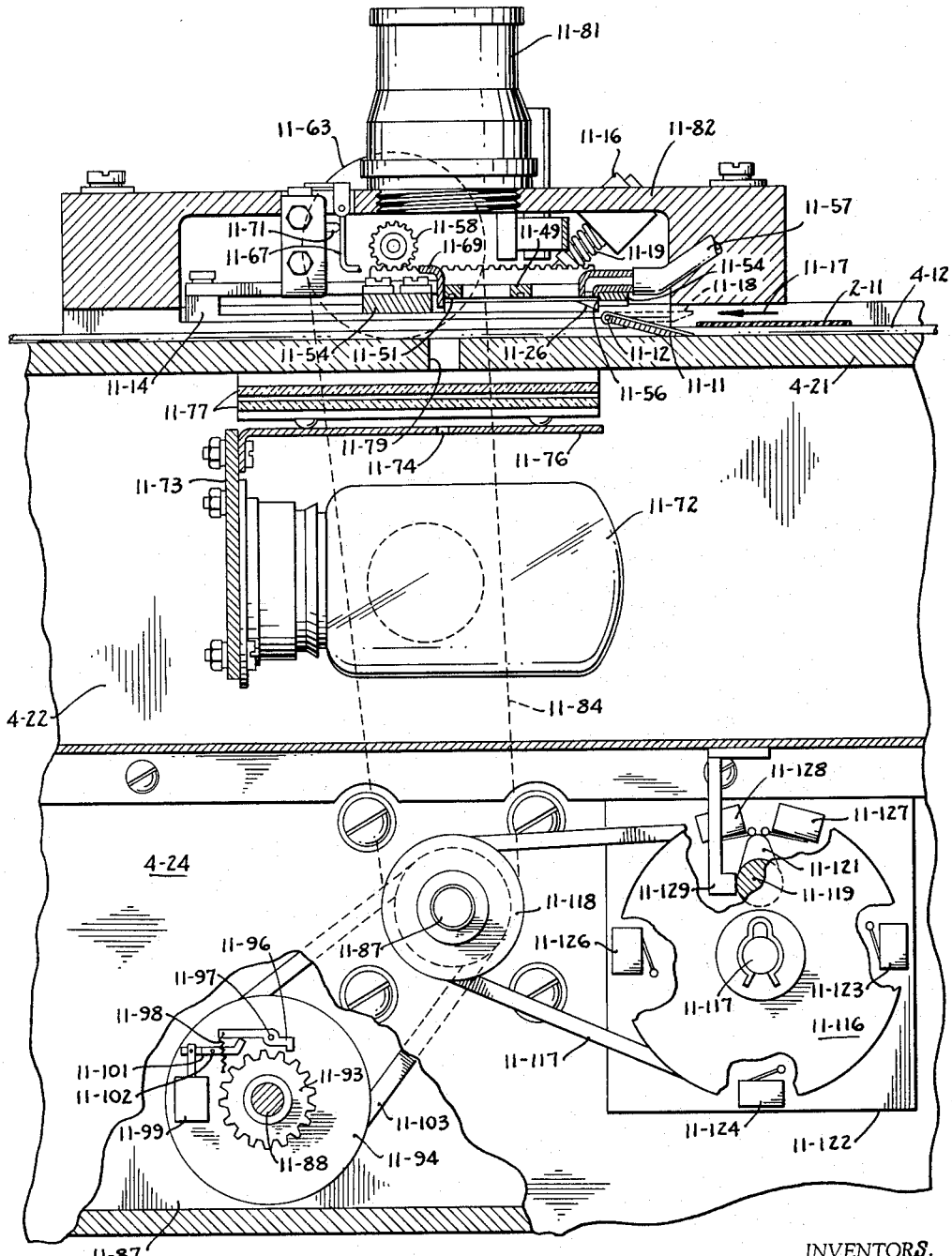

July 26, 1966

L. C. KLEIST ETAL 3,262,355

INFORMATION STORAGE AND REPRODUCING SYSTEM

Filed Nov. 6, 1961

INVENTORS.
LEROY C. KLEIST,
GEORGE L. BUENGER

BY

Lockwood, Woodard, Smith & Weibert
Attorneys

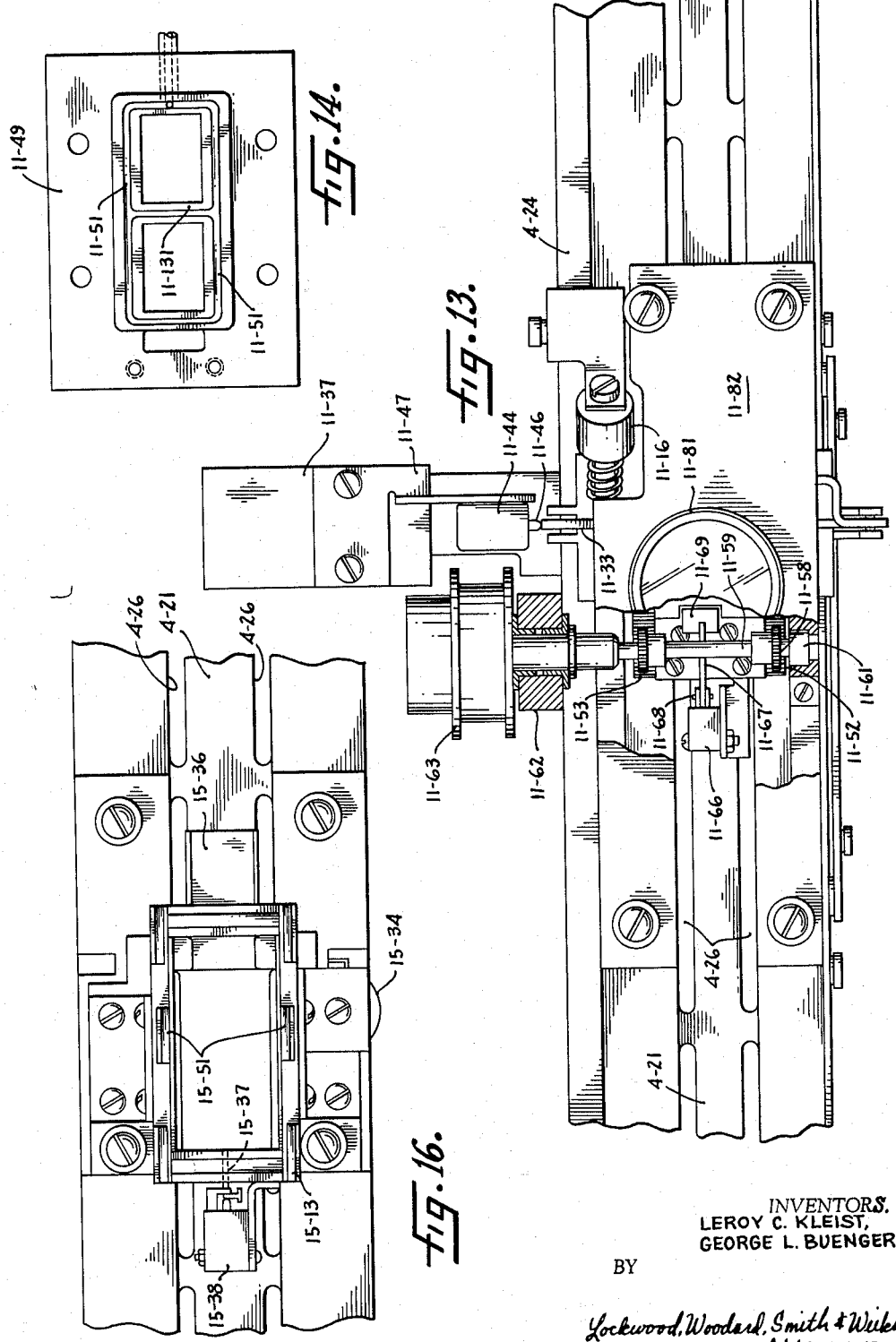

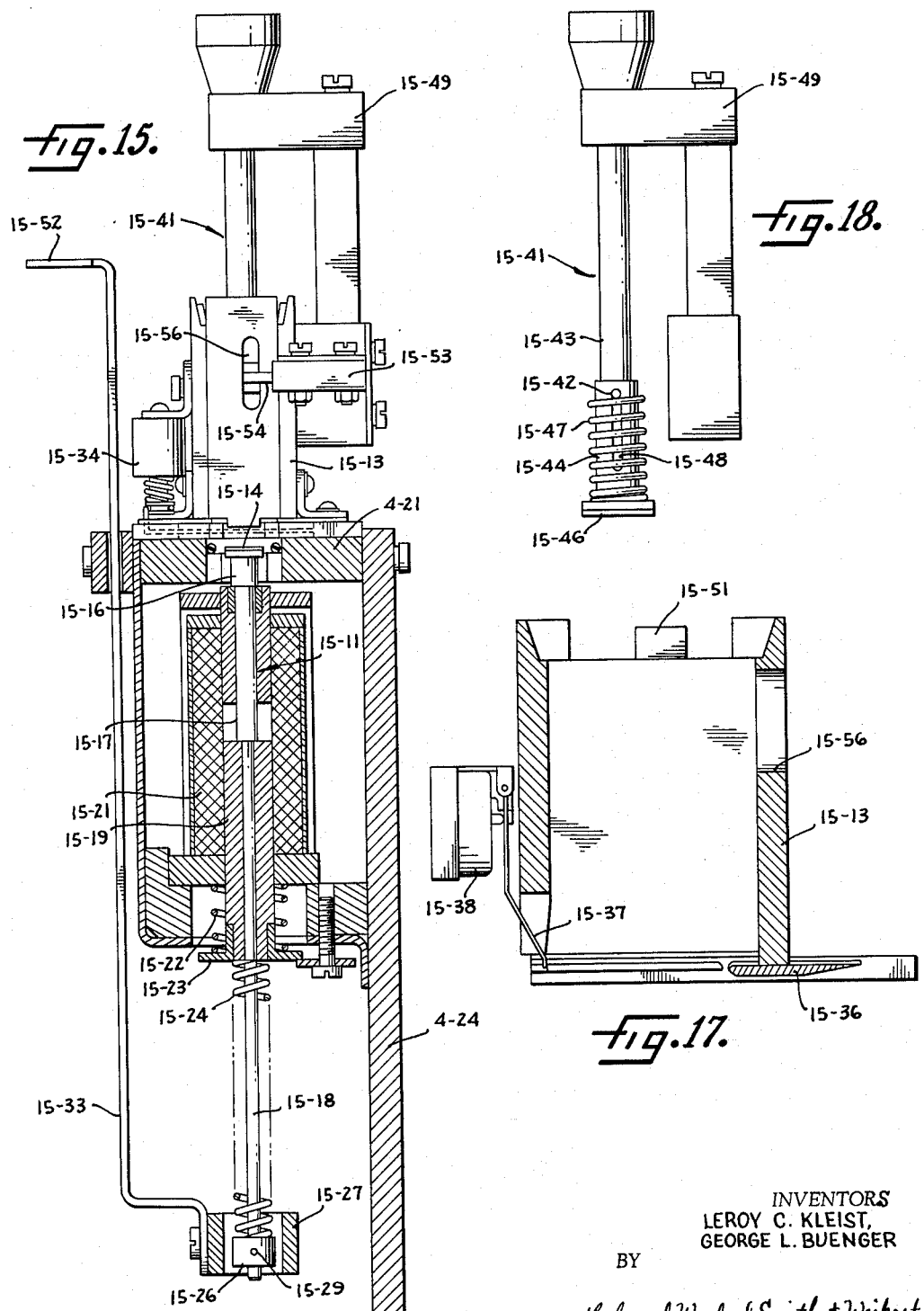

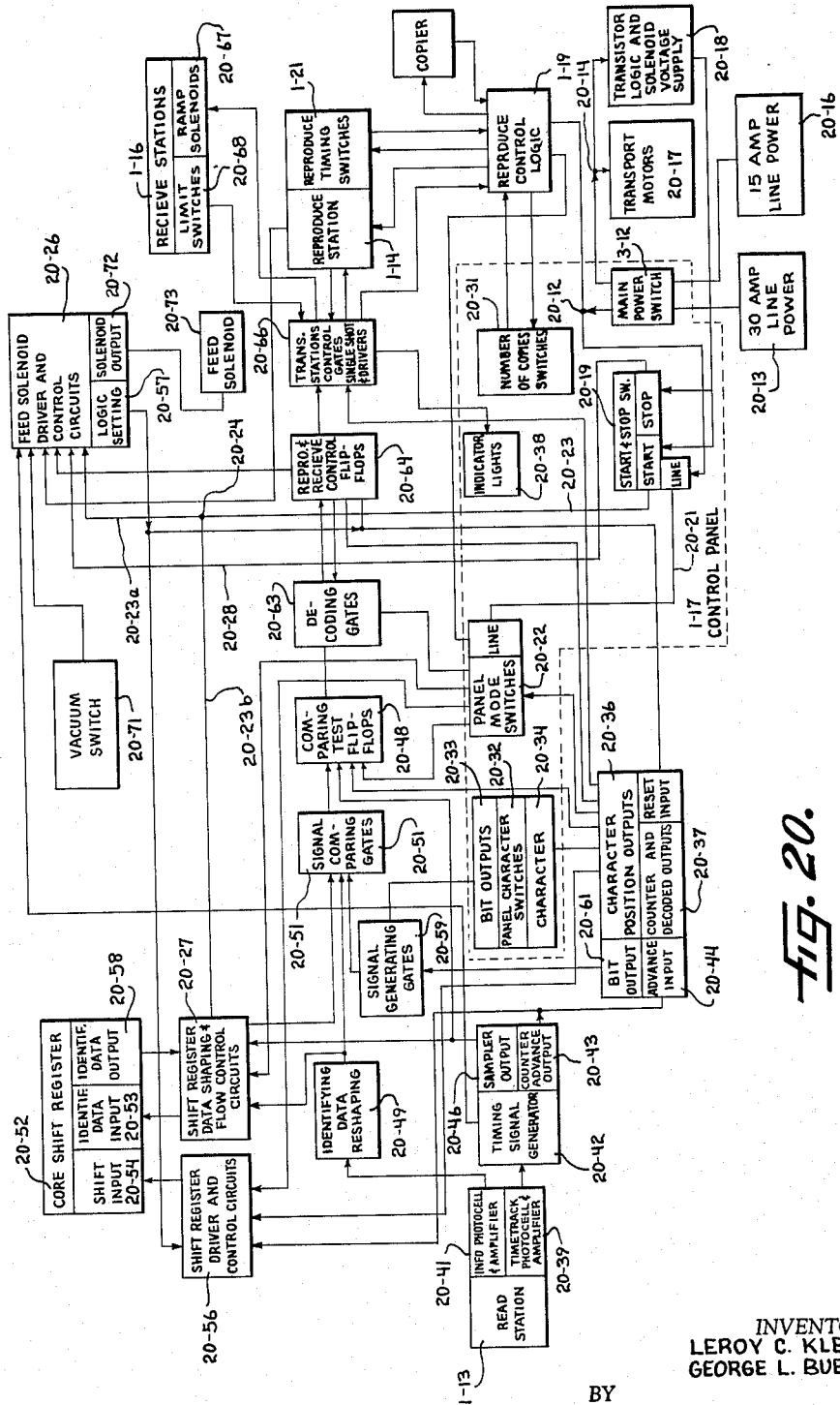

July 26, 1966 — L. C. KLEIST ETAL — 3,262,355
INFORMATION STORAGE AND REPRODUCING SYSTEM
Filed Nov. 6, 1961 — 22 Sheets-Sheet 12

INVENTORS.
LEROY C. KLEIST,
GEORGE L. BUENGER
BY
Lockwood, Woodard, Smith & Wickart
Attorneys

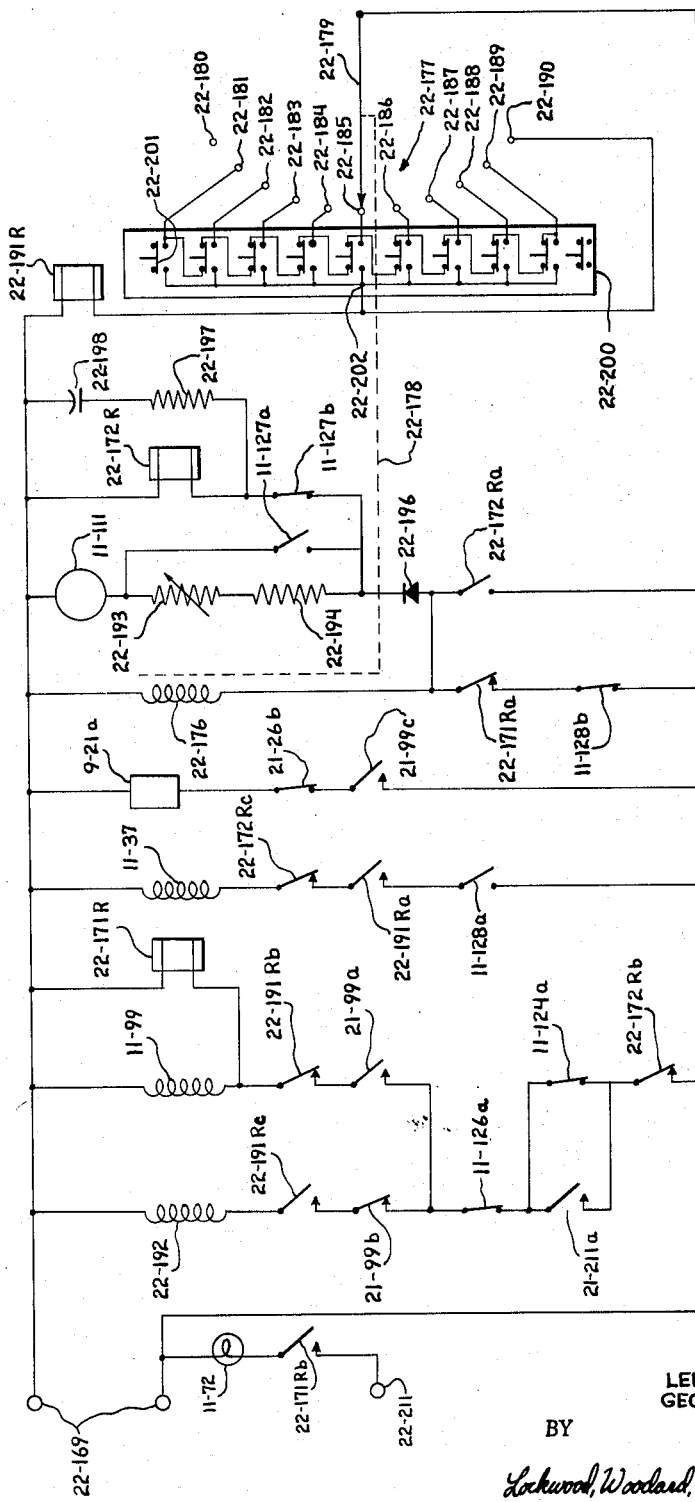

July 26, 1966  L. C. KLEIST ETAL  3,262,355
INFORMATION STORAGE AND REPRODUCING SYSTEM
Filed Nov. 6, 1961  22 Sheets—Sheet 17

INVENTORS.
LEROY C. KLEIST,
GEORGE L. BUENGER
BY
Lockwood, Woodard, Smith & Weikart
Attorneys

INVENTORS.
LEROY C. KLEIST,
GEORGE L. BUENGER

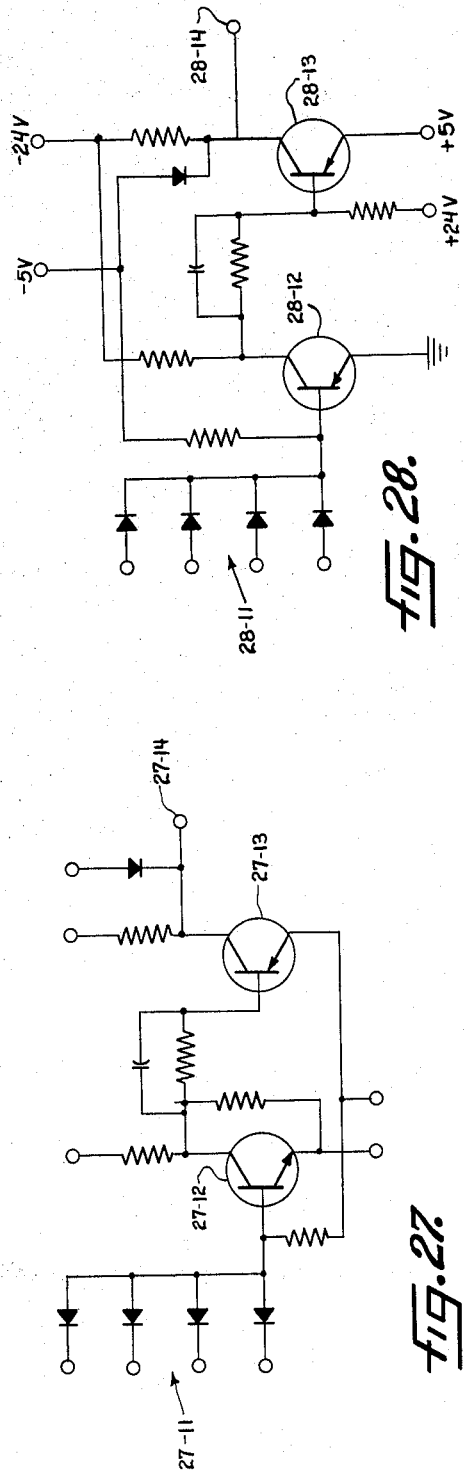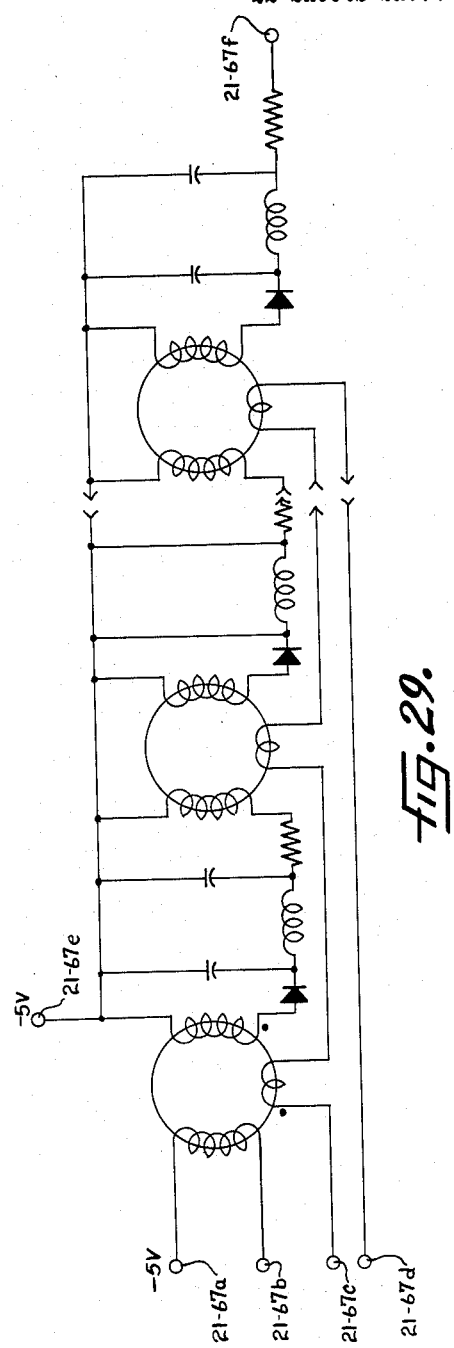
fig.28.
fig.27.
fig.29.

July 26, 1966 L. C. KLEIST ET AL 3,262,355
INFORMATION STORAGE AND REPRODUCING SYSTEM
Filed Nov. 6, 1961 22 Sheets-Sheet 20

INVENTORS.
LEROY C. KLEIST
GEORGE L. BUENGER
BY
Lockwood, Woodard, Smith & Weikart
Attorneys July 26, 1966  L. C. KLEIST ET AL  3,262,355
INFORMATION STORAGE AND REPRODUCING SYSTEM
Filed Nov. 6, 1961  22 Sheets-Sheet 21
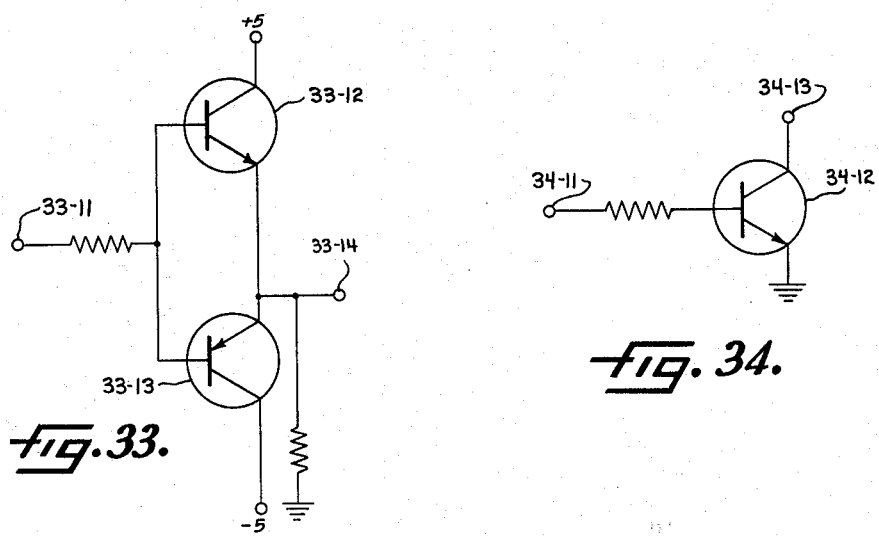
*Fig. 33.*
*Fig. 34.*
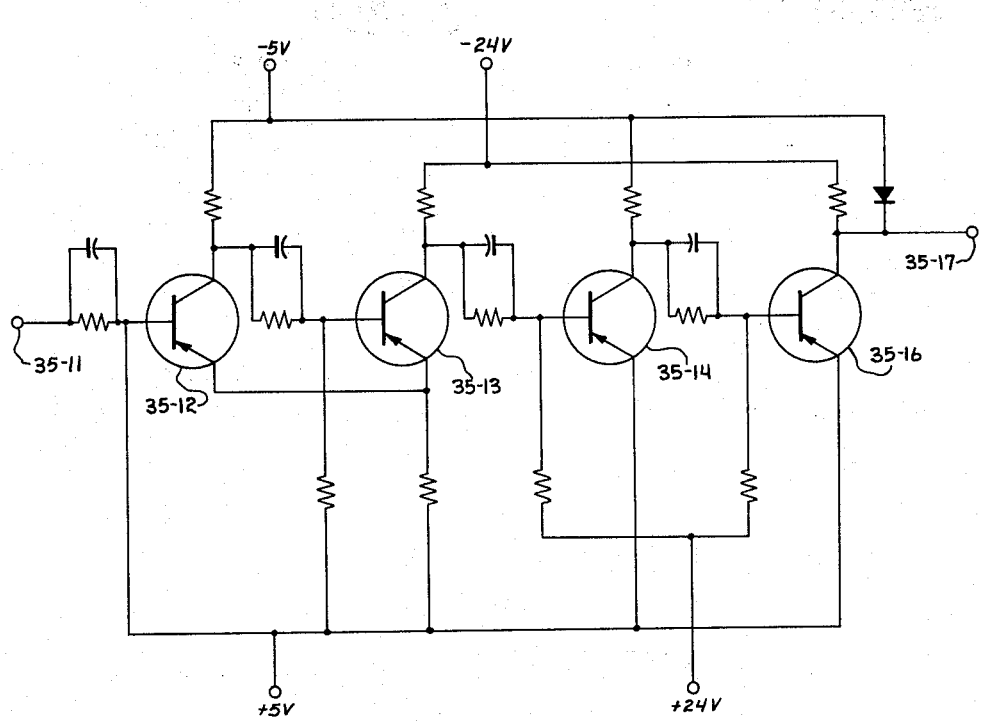
*Fig. 35.*
INVENTORS.
LEROY C. KLEIST,
GEORGE L. BUENGER
BY
*Lockwood, Woodard, Smith & Weikart*
Attorneys July 26, 1966 L. C. KLEIST ETAL 3,262,355
INFORMATION STORAGE AND REPRODUCING SYSTEM
Filed Nov. 6, 1961 22 Sheets-Sheet 22
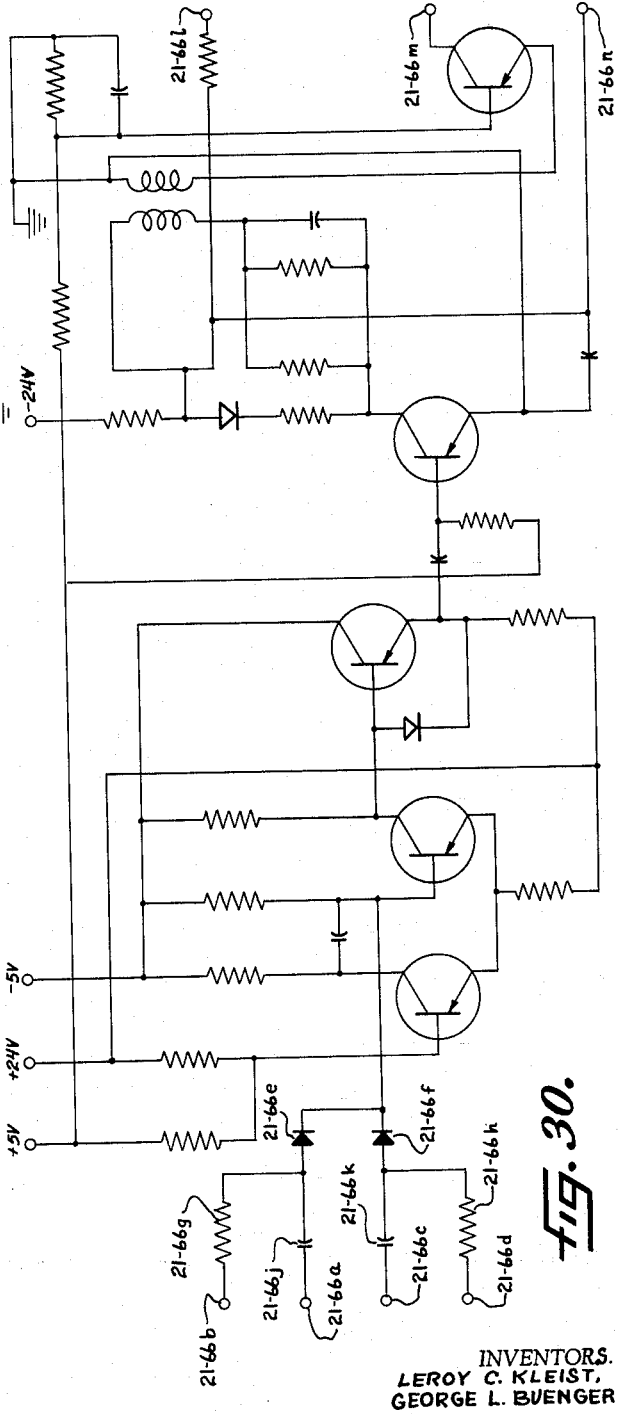
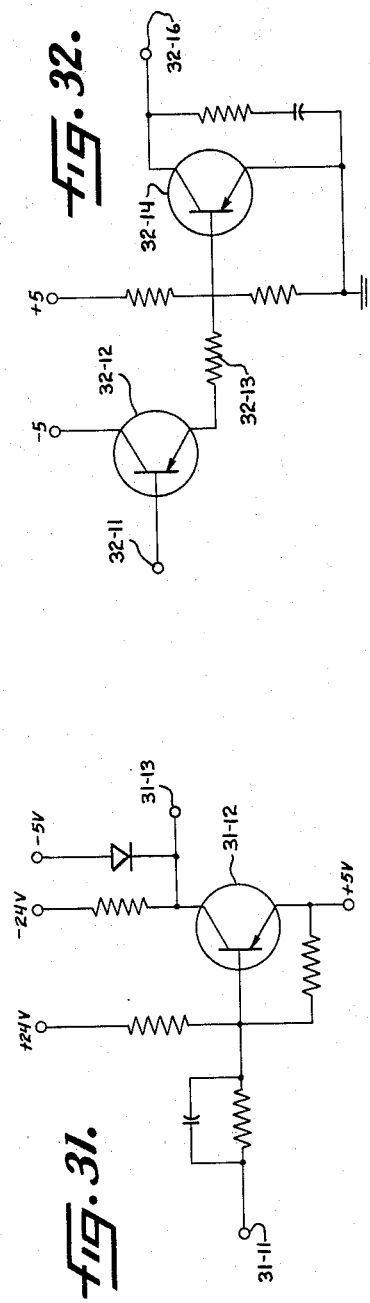
INVENTORS.
LEROY C. KLEIST,
GEORGE L. BUENGER
BY
Lockwood, Woodard, Smith & Weikart
Attorneys 3,262,355
INFORMATION STORAGE AND
REPRODUCING SYSTEM
Leroy C. Kleist, Ogden, and George L. Buenger, Champaign, Ill., assignors to The Magnavox Company, Fort Wayne, Ind., a corporation of Delaware
Filed Nov. 6, 1961, Ser. No. 150,250
23 Claims. (Cl. 88—24)

This invention relates generally to business filing systems and more particularly to means for filing documents and handling the filed information which employ miniature film cards containing the documentary information.

Many systems have been devised for filing information in miniaturized form. One of the most common systems is to photograph documents to be filed and thereby obtain photographic negatives of the documents on microfilm, usually in the form of reels. It is typical to store the microfilmed information on 100-ft. reels with an identification code on the reels and with identifying code adjacent each document on the film. Machines are available which can search through a reel of microfilm, locate a particular document thereon, and print the document. A significant disadvantage of this system is the fact that it takes a substantial length of time for a machine to search through an entire 100-ft. reel to obtain or locate a specific document. Another disadvantage is the fact that there is no practical means whereby information stored on reels of microfilm can be kept up-to-date. If it is desired to delete any documents therefrom, the film must be cut and spliced, requiring a substantial amount of time and making the operation unfeasible.

Another filing system available, but which requires considerably more filing space, employs punched cards with a microfilm chip inserted on the card. The microfilm chip carries the documentary information, and the punched card carries identifying code. Disadvantages of this system are the excessive space requirement and the cost.

Another system which is available employs film cards of substantial size which contain both the documentary information and the identifying code. The cards are of a large size to facilitate hand filing and searching. Obviously, although use of film in such systems requires a minimal thickness for the card, the area of the card must be substantial in order to facilitate hand filing and searching. Therefore, the space requirement of such systems is substantial.

Still another system employs individual miniature cards of microfilm containing both documentary information and identifying code. While great economy of filing space is effected by such a system, the use of an extensive coding system together with documentary information on a miniature card, creates significant problems of reliability, complication and cost.

It is, therefore, a general object of the present invention to provide an improved information storage and reproducing system.

It is a further object of this invention to provide such a system whereby the space requirement for filing documentary information can be readily reduced to a fraction of that for filing full sized documents.

It is a still further object of this invention to provide a system of the foregoing character whereby files can be kept current.

It is a still further object of this invention to provide a system of the foregoing character having great reliability and a very nominal cost.

Described briefly, a typical embodiment of the invention uses miniature cards having dimensions of approximately 16 millimeters wide by 32 millimeters long. Each card includes documentary information obtained from full sized documents, together with a numerical identification data for reading and filing by an operator. Each card also contains a binary code corresponding to the numerical identification and a timing code for synchronization purposes which will become apparent. The cards are filed by hand in numerical order in capsules, each capsule receiving from 100 to 200 cards. The capsules are filed in a file according to certain characters of their identification numbers, for example, the first eight characters. When a specific card is sought, a clerk may make a rough search through a file drawer for a capsule bearing a number in a range which indicates to the clerk that the specific card is in the capsule. A machine is provided according to the invention upon which the capsule of film cards, selected from the file drawer, may be placed. The machine searches through the cards in the capsule, locates the specific card, and performs designated operations thereon. The machine includes a control panel for selection of specific cards and for determination of operations to be performed on the cards. Operations typically provided for are the detection of cards erroneously filed in a capsule, removal from the file, of cards which contain expired or obsolete information, printing enlarged copies of documents on selected cards, and return of all cards other than obsolete or misfiled cards, to the capsule from which they were obtained.

The operator selects a capsule from the storage file drawer by a group of significant figures marked on the capsule and common to all cards therein. The capsule is then placed on a feed station of the machine. The operation to be performed is determined by actuating the appropriate mode switch on the control panel. A specific card for printing or removal from the file is selected by the clerk actuation of appropriate character switch buttons on the panel. The machine is then started by activation of the start switch.

The cards are fed automatically down a card transport conveyor, one-at-a-time, from the feed station. After leaving the feed station, each card passes under a reading station which reads the binary coded information on the cards. A reproducing station is provided for printing an enlarged copy of the document on the card selected, and three card receiving stations are for purging obsolete cards and for collecting misfiled cards if any, respectively. The last receiving station is for the purpose of collecting from the conveyor all cards passing the former two receiving stations.

Transistor logic circuitry of the machine determines, on the basis of information read from the card and the state of the various switches controlled from the control panel buttons, which of the receiving stations of the system is to receive the card, and whether or not it is to be processed by the reproduce station prior to receipt by one of the receive stations.

In the reproduce station of the typical embodiment of the machine, means are provided whereby a card can be optically scanned to project the document thereon to a photosensitive material in a conventional copying machine as the material moves in synchronism with the card. A copy, enlarged to original document size, can thereby be produced quickly and at the same time space can be conserved by comparison with that which would be required with a machine not having a scanning capability.

After the last card from the capsule on the feed station has been fed, a light on the control panel will be illuminated indicating that the capsule on the feeding station is empty. Provided the last card is not still being processed by the reproduce station, all the cards will have been sorted in the proper receive stations as prescribed by the control panel switches. The processing of a card by the reproduce station is indicated by a light on the control panel. Presence of cards in the error station will be indicated by another lamp on the control panel.

After completion of the card processing, the cards can be transferred manually from the receive station to an empty capsule and returned to the file. Cards in the purge or error station can also be removed to capsules at those stations and returned to a new file or discarded. During processing of the cards by the reproduce station, enlarged copies of the information recorded on the document areas of the cards, accumulate in a copy tray according to the number of copies to be made thereof as designated by the operation of an appropriate button on the control panel to designate number of copies desired.

The full nature of the invention will be understood from the accompanying drawings and the following description and claims:

FIG. 2 illustrates a typical film card used in the practice of this invention.

FIG. 4 is a side elevation of a typical embodiment of the selector-reproducer of this invention illustrating the general arrangement of the card transport system and card processing stations.

FIG. 5 is a plan view of the structure of FIG. 4, the view being abbreviated slightly to conserve space.

FIG. 6 is a view of a card capsule used in this invention, looking into the open end of the capsule.

FIG. 7 is a side view of the capsule.

FIG. 8 is a section through the capsule along the line 8—8 of FIG. 7.

FIG. 10 is a section through the read station, taken along line 10—10 of FIG. 4.

FIG. 11 is a view, partially in vertical section, of the reproduce station of the invention.

FIG. 13 is an enlarged fragmentary plan view of the reproduce station.

FIG. 14 is an enlarged view of the underside of a platen used in the reproduce station.

FIG. 15 is a section through the error station taken along line 15—15 in FIG. 4.

FIG. 16 is an enlarged plan view of the error station.

FIG. 17 is a section through the upper portion of the error station, the section being taken on a vertical plane parallel to the card transport direction.

FIG. 18 is a view of the card hold-down plunger assembly of the error station.

FIG. 20 is a detailed block diagram of the control system of this invention.

FIGS. 21A, 21B, 21C, and 21D comprise a logic diagram of the sorting and transport control portions of the control system according to the invention.

FIG. 22 is a schematic diagram of the reproduction control portion of the control system.

Figure 23:
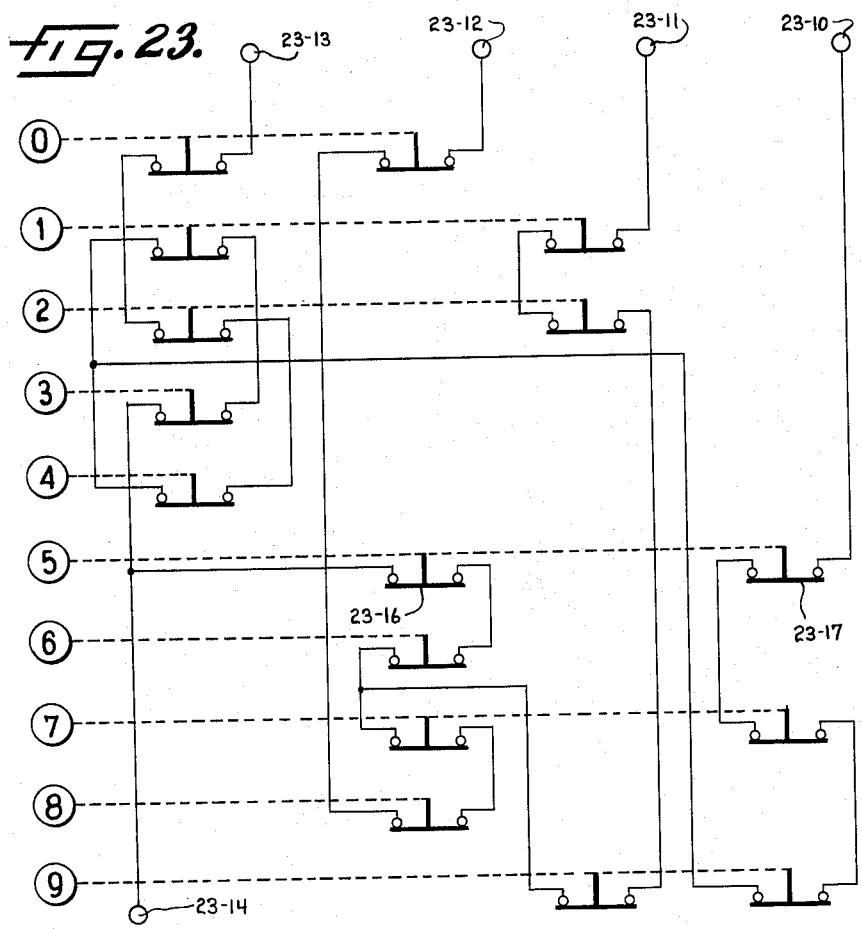

FIG. 23 is a schematic diagram of the binary character switch circuitry operated by the character switch buttons on the machine control panel.

Figure 24:
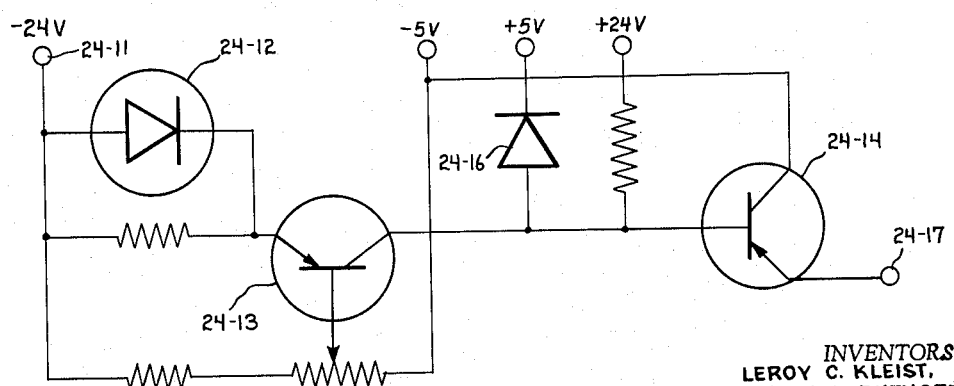

FIG. 24 is a schematic diagram of the circuitry employed for the identifying code and timing track data reading means.

Figure 25:
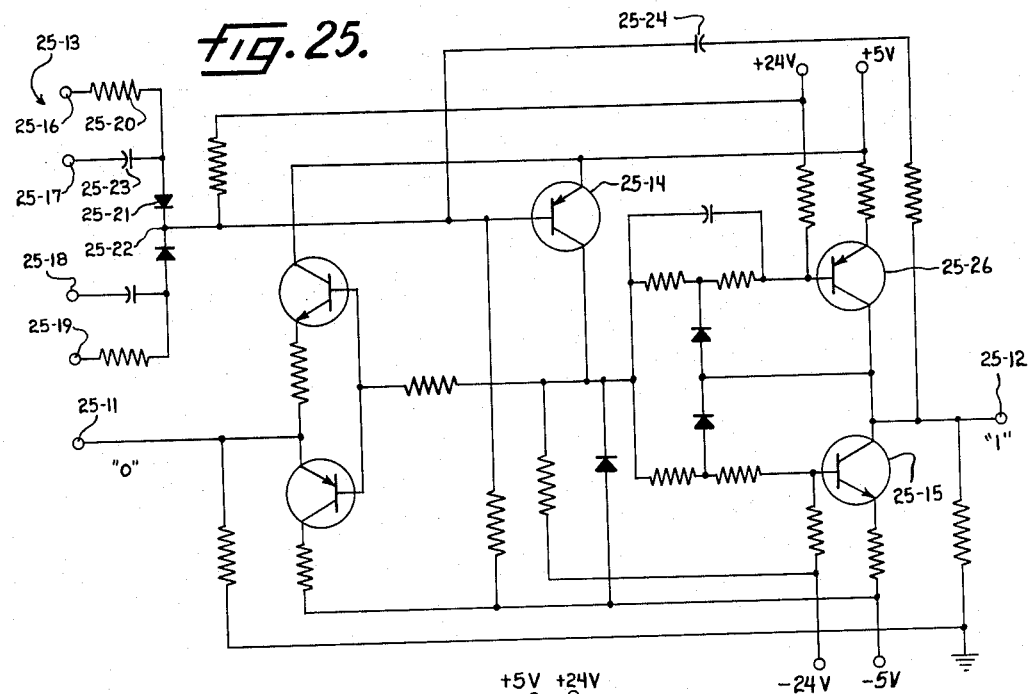

FIG. 25 is a schematic diagram of single-shot multivibrators which may be employed throughout the control circuitry.

Figure 26:
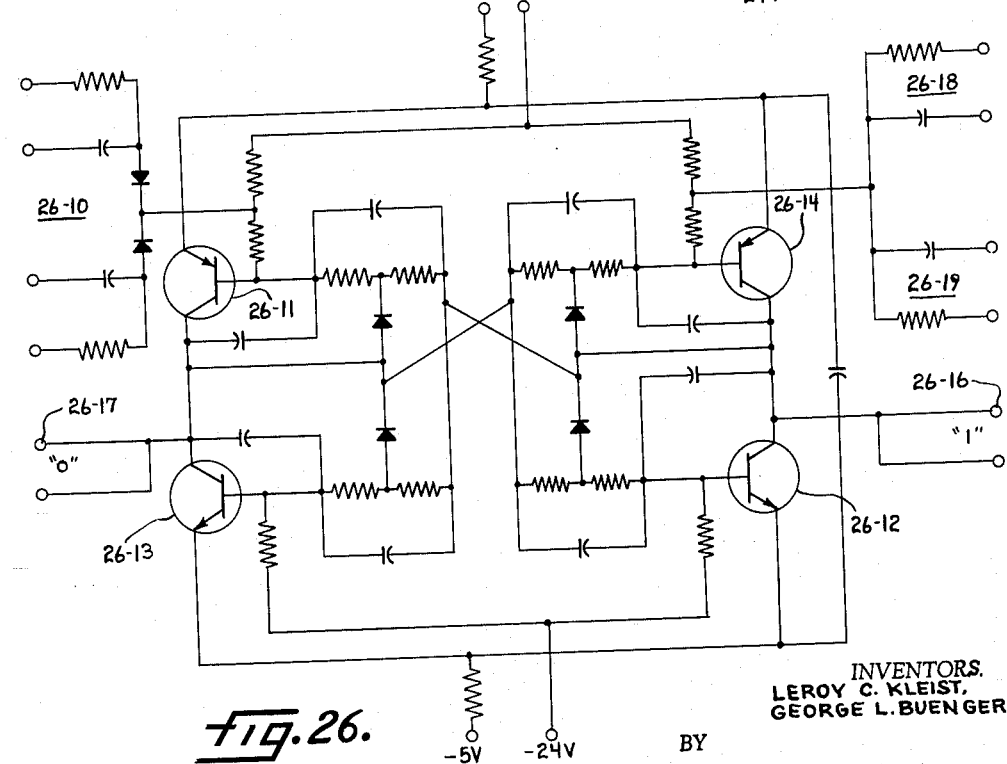

FIG. 26 is a schematic diagram of flip-flops which may be used throughout.

FIG. 27 is a schematic of AND gates which may be used throughout.

FIG. 28 is a schematic of OR gates which may be used throughout.

FIG. 29 is a schematic of a core shift register which may be used in the invention.

FIG. 30 is a schematic of a core shift register driver which may be used in this invention.

FIG. 31 is a schematic of an inverter used frequently throughout the circuitry.

FIG. 32 is a schematic of a solenoid driver circuit which may be used throughout.

FIG. 33 is a schematic of an emitter-follower driver used frequently in the circuitry.

FIG. 34 is a schematic of a lamp-driver circuit used occasionally in the circuitry.

FIG. 35 is a schematic of a Schmitt trigger circuit used frequently for wave shaping purposes.

Figure 36:
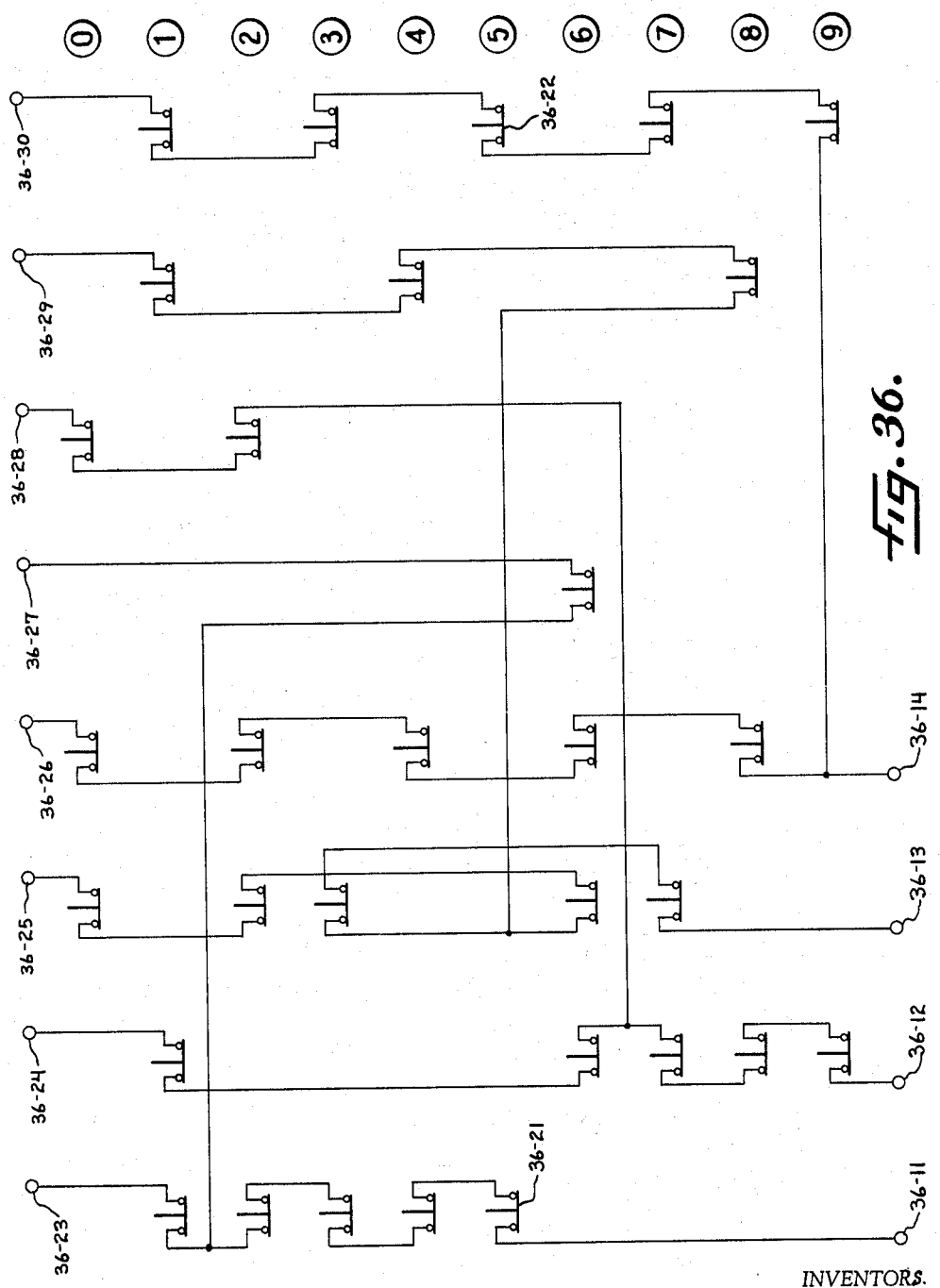

FIG. 36 is a schematic diagram of the purge switch circuitry employed in the example described.

In the description of the various figures, a structural part will be given a reference numeral having a prefix corresponding to the number of the figure being described when the item is first described. The same reference numerals will be used to identify the same items throughout the description.

Figure 1:
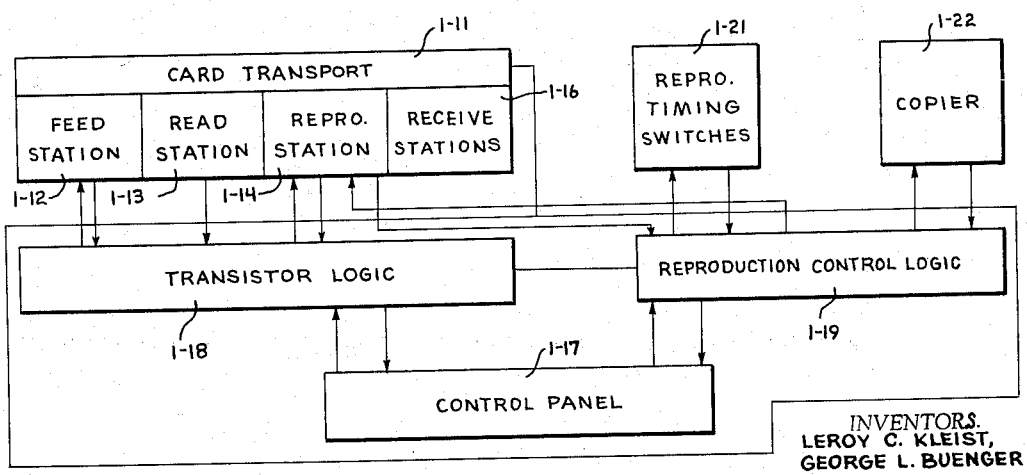
FIG. 1 is a general block diagram of the card handling system of this invention.

Referring to FIG. 1 which is a general block diagram of the system of this invention, a card transporting means 1–11 has associated therewith a feed station 1–12, read station 1–13, a reproducing or printing station 1–14 and receive stations 1–16. A control panel 1–17 which contains switch buttons and indicator lights for operation by and alerting of the machine operator, is coupled through a transistor logic 1–18 to the various stations of the machine. Both the control panel and transistor logic are coupled to a reproduction control logic 1–19. The reproduction control logic has couplings to the reproduction station 1–14, to the reproduction timing switches 1–21, to a copying machine 1–22. The detailed relationship of these principal components will become apparent.

Referring to FIG. 2, film card 2–11 includes two documents 2–12 and 2–13 thereon. A 16-mm. by 30-mm. film card has ample space for storage of two 9 x 14 documents or one larger document. The apparatus of this invention can, of course, be sized to handle larger cards if desired. Adjacent the document areas, there is a timing track 2–14. Each dark area or bit 2–16 of the timing track is of the same length as every other, and the space 2–17 between bits is of the same length as the bit. Adjacent the edge of the card are seventeen character positions 2–18, each having a character which may be from 0 through 9. The characters in combination identify documentary information on the card. The characters appear in groups, which are staggered to facilitate the reading thereof by a clerk. For example, the first group 2–19 of characters is inset with respect to the second group 2–21. The third group 2–22 is inset with respect to the second group, and the fourth group 2–23 is aligned with the second group.

Between the printed numbers and the timing data track, there is an identifying data track 2–24. The identifying data track includes four bits directly adjacent each character position. These bits represent the respective character according to the excess three binary code. The excess three code offers the advantages of more balanced light and dark areas on cards, and a code for the character 9 which is the inverse of that for the character 0. It should be observed that the bits of the timing data track are ahead of the bits of the identifying data track by an amount which is equal to one-half the length of the timing bit. This is for timing purposes which will become apparent as the description proceeds.

Because there are 17 characters on the card, there are 68 identifying code bits representing the characters on the card. There is an additional 69th bit 2–26 in the identifying track following the 68th bit, to indicate to the logic in a manner which will become apparent, that there are two documents on this particular film card.

The use of 17 characters is for purposes of example only, inasmuch as this machine can easily be modified to make use of more or less, according to the type of information stored in the file, the identification thereof, and the manner in which it is to be processed. To give an example of the use of the 17 characters, the first 10 characters may be considered the number of an insurance policy. These characters comprise the groups 2–19 and 2–21. The first 3 characters represent an area code, the significance in the policy number being the area to which the policy pertains. All cards in all capsules in a file drawer would have the same three numbers for the first three characters. The first 5 characters of the second group 2–21 are characters by which all of the cards in a given capsule would be filed. The last 2 characters of the policy number, being the last 2 characters of group 2–21, bear the significant figures from 0–99 identifying each card in a capsule of 100 cards. There can, for example, be two cards in a capsule bearing the same policy number. Each of these could contain two pages of a four-page policy.

The two characters of group 2–22 may be considered to represent policy expiration date. The first of the two may be considered to identify a two-month period within a year and the second of the two, to identify a year. The last five characters, being group 2–23, can be considered the identification of the insurance agent or producer of the policy.

It should be observed that the space between the forward edge 2–27 of the card and the first bit of the identification track and of the timing track, includes no dark area. Similarly, the space between the last bit of each track and the rear edge 2–28 of the card is also a clear area. This is necessary to avoid erroneous signals from the identification and timing track reading station. It may be noted at this point, that the interchanging of the connection of two wires will convert the machine to be described herein from one reading positive cards to one reading negative cards. This connection change could be handled by a switch which would be placed in the machine for this purpose.

Figure 3:
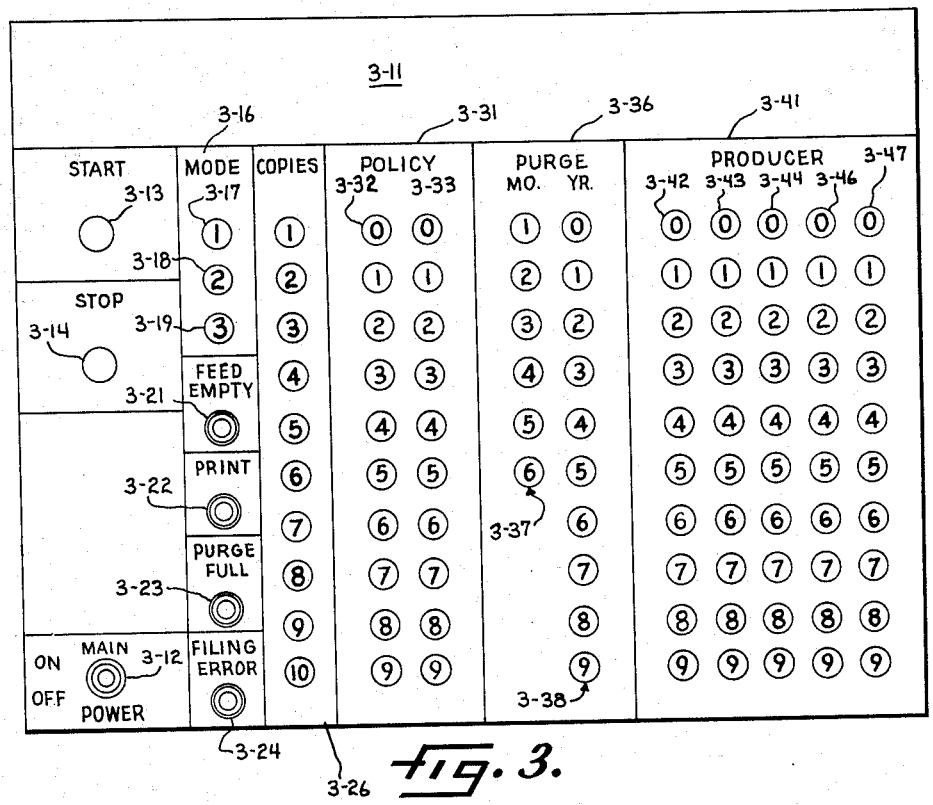
FIG. 3 is a view of a control pan employed with the embodiment described.

Referring to FIG. 3, a generally rectangular panel 3–11 includes at the left-hand side toward the bottom corner a "Main Power" toggle switch 3–12. This switch may be moved between the "on" and "off" positions and controls the entire supply of power to the machine of this invention. At the upper left-hand corner are a "Start" button 3–13 and a "Stop" button 3–14. The start button is provided to start the processing of cards from a capsule mounted on the feed station. The stop button is to stop the processing of the cards at any time.

A group 3–16 of three buttons 3–17, 3–18 and 3–19 comprises the "Mode" switch group. Each of the three buttons in this group provides for a different mode of processing the cards, and it is the selection of one of these buttons, the other two being interlocked therewith to be deactivated by the activation of one, by which the mode of operation can be selected.

A light 3–21, the "Feed Empty" light, is provided to indicate when the capsule supplying the cards at the feed station is empty. Another light 3–22, the "Print" light, is provided to be illuminated whenever a card is being reproduced. A third light 3–23, the "Purge Full" light, is provided to be illuminated whenever the purge station is full of cards. When the purge station is full, the machine stops feeding cards automatically. The light, therefore, indicates why the machine has stopped. Cards may then be removed from the purge station hopper to a capsule to thereby prepare for receipt of additional cards at the purge station. Another lamp 3–24, the "Filing Error" lamp, is provided to indicate the discovery by the machine of a card which has been misfiled in the capsule from which cards are being fed.

Another group 3–26 of switch buttons, is provided whereby the pressing of one of the buttons determines the number of copies of a document which will be made. These buttons are all numbered according to the number of copies which will be produced by depression of the respective button. All are interlocked so that depression of one will release all others.

Another group 3–31 of buttons is the "Policy" group and is provided to key in the last two characters of the policy number of the specific card to be located by the machine for processing through the reproduce station according to the policy number in mode 1 of operation. These buttons are called character switch buttons. The first group of buttons in the policy button group 3–31 includes ten buttons 3–32, each bearing a character from 0 through 9. The second group in the policy group includes ten buttons 3–33, each bearing a character from 0 through 9. All of the bottons in the sub group 3–32 are interlocked so that the pressing of one causes the release of all others. This same interlocking arrangement is provided in each of the vertical lines of buttons of the remaining groups on the control panel.

The next group of buttons is the "Purge" group 3–36. This group includes the month group of six buttons 3–37, and the purge year group of ten buttons 3–38. It is the selection of these buttons by which the card file may be kept up-to-date. The final group 3–41 of buttons, the "Producer" group, includes five character switch groups 3–43, 3–42, 3–44, 3–46 and 3–47. It is the selection of buttons in these groups which designates the producer of the policy. To correlate the three major groupings of character switch control buttons with corresponding characters on the film card of FIG. 2, the policy group 3–31 provides for keying in characters to be matched with the ninth and tenth identifying characters on the film card. The purge group 3–36 provides for keying in characters corresponding to the eleventh and twelfth characters of the film card. The producer group 3–41 provides means for keying into the machine characters to be matched by the last five, i.e., thirteenth through seventeenth, characters of the film card and is useful in mode 2 of operation of the example to be described for printing cards based on the producer number.

Referring to FIGS. 4 and 5, the card transport means includes a conveyor having the drive motor 4–10, the driving wheel 4–11, the parallel belt strands 4–12, and the idler wheel 4–13. The strands are driven in the direction of the arrow 4–14 from the feed station 1–12 toward the receive stations, the driving wheel 4–11 rotating in a counter clockwise direction. Adjacent the feed station 1–12 is the read station 1–13 followed by the print or reproduce station 1–14. The various receive stations of FIG. 1 are shown in FIG. 3 as the purge station 4–16, the error station 4–17 and the final receive station 4–18.

Additional details of a transport system well suited to the practice of this invention may be found in a copending application of Donald E. Craig, Serial No. 67,825, filed November 7, 1960, now Patent No. 3,197,201, entitled, "Card Transport System," and incorporated herein insofar as necessary to complete this disclosure.

The feed station to be described briefly hereinafter, may have details of construction shown in the copending application of Stuart E. Hotchkiss et al., Serial No. 138,742, filed September 15, 1961, entitled, "Card Feeding Station," (now Patent 3,137,496) the disclosure of which is incorporated herein for reference insofar as is necessary to complete this disclosure.

The reading station will be described briefly hereinafter. The print station, also to be described briefly hereinafter, may incorporate details such as shown in the copending application of James R. Thompson et al., Serial No. 117,723, filed June 16, 1961, now U.S. Patent No.

3,178,177, entitled, "Card Reproducing Device," the disclosure of which is incorporated herein for reference insofar as is necessary to complete this disclosure.

The purge, error, and final receive stations, described briefly hereinafter, may have details as shown in the copending application of James R. Thompson et al., Serial No. 117,723, filed June 16, 1961, now U.S. Patent No. 3,178,177, entitled "Card Receiving Device," the disclosure of which is incorporated herein for reference insofar as is necessary to complete this disclosure.

The purge and error stations differ from the final receive station only in that the purge and error stations incorporate ramps which may be depressed by solenoid action to pick up a film card as it moves along the conveyor. The final receive station includes a ramp which is fixed to be depressed at all times to remove all cards from the conveyor which have passed all of the stations ahead of the final receive station during transport by the conveyor.

To avoid necessitating reference to the copending applications, the transport system and various stations will now be described.

*The transport system*

In the transport system, conveyor belt strands 4–12 may be a pair of elastic strings of circular cross section laterally spaced and having no protrusions of any sort thereon for the purpose of moving cards. The belts are driven continuously by a motor 4–10 and move along a track 4–21 which provides lateral confinement for a card on the belt. A vacuum is provided under the strands by providing a manifold under the track and coupled to a high volume vacuum pump (not shown). The vacuum is communicated from the manifold to the strands through slots 4–26 in the track. The card is thereby retained firmly on the belt, once placed on the belt, until removal therefrom by mechanical means at one of the stations along the conveyor.

*The capsule*

Referring to FIGS. 6, 7, and 8, the capsule in which cards are stored according to the present invention is shown. The capsule comprises a container 6–11 having flexible, resilient sidewalls or panels 6–12 which have inwardly projecting lips or tabs 6–13 at their distal ends. An outwardly projecting finger 6–14 is provided on one panel to display identification characters. These characters are the same as the fourth through seventh characters of the cards in the capsule. There is provided within the container, a spring 6–15 which has one end 6–16 anchored about an annular boss 6–17 integral with the container and another end 6–18 anchored about an annular boss 6–19 forming a part of card engaging plunger 6–21.

Figure 9:
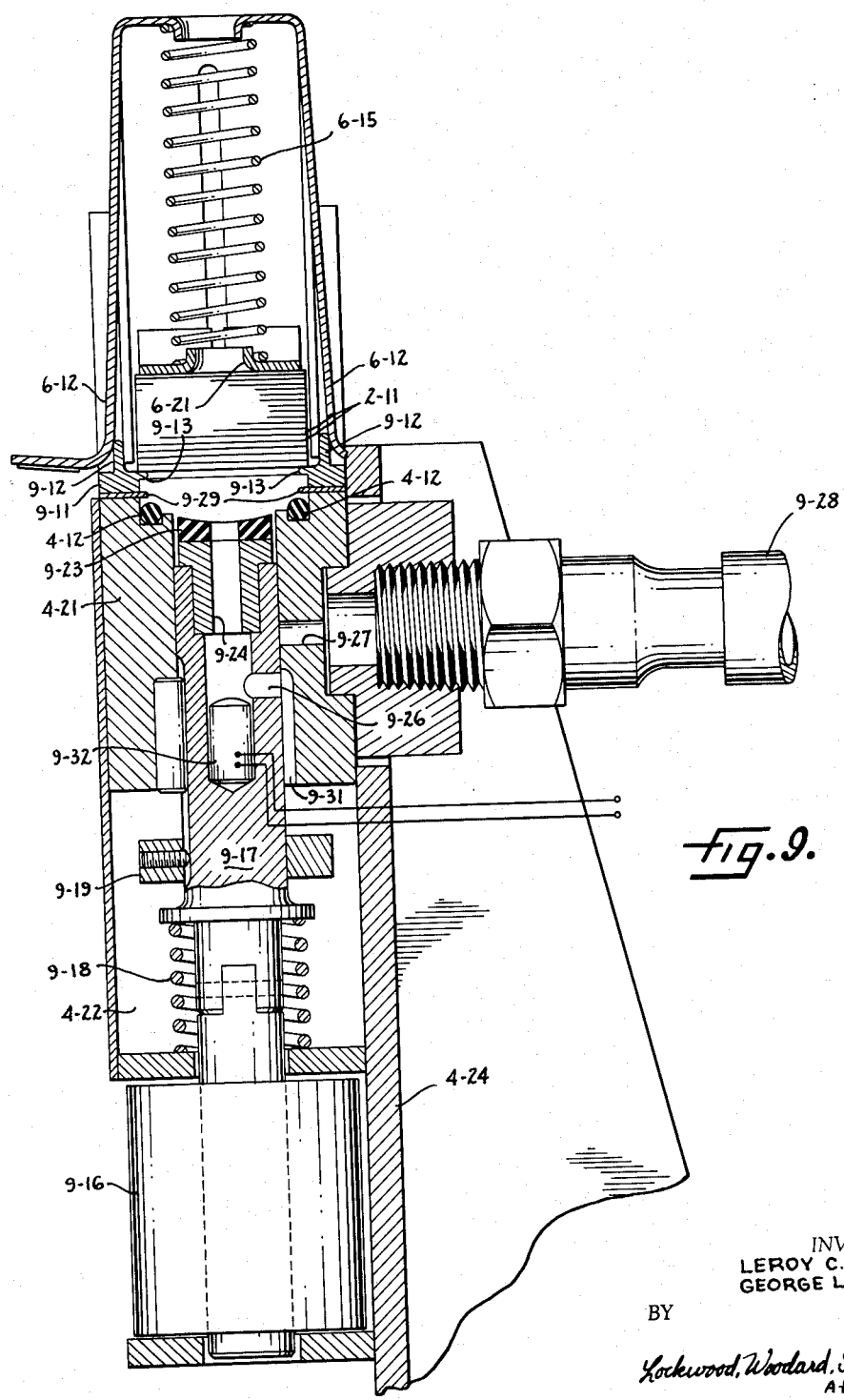
FIG. 9 is a section through the feed station, taken along line 9—9 in FIG. 4.

When the capsule is dismounted from one of the stations of the system, the tabs 6–13 are positioned as shown in FIG. 6 and function to prevent the cards from moving out of the capsule under the urging of the plunger 6–21. On the other hand, when the capsule is installed at the feed station, as shown in FIG. 9, or when the capsule is installed on top of the hopper of a receive station, as shown in FIG. 16, the camming surfaces at the upper margin of the station spread the sidewalls or panels of the capsule thus spreading the tabs sufficiently to permit departure of cards from the capsule at the feed station or admission of cards to the capsule at the receive station. As cards accumulate during entry into the capsule, the plunger 6–21 is forced inwardly, compressing the spring. As cards leave the capsule, for example, when they are being fed, the compression of the spring urges the remaining cards in the capsule toward the open end so that they may leave as fed.

*The feed station*

The function of the feed station, illustrated in FIG. 9, is to place a single card from the capsule of cards on the belts at the proper time. The upper portion of the feed station is a fixture 9–11 supported by the track 4–21 which locates the capsule over the track. When a capsule is pushed down into the fixture, two camming surfaces 9–12 of the fixture spread the two sides 6–12 of the capsule, allowing the contained cards to fall past the capsule lips 6–13 onto the upper lips 9–13 of the feed station fixture 9–11 itself. In conjunction with this fixture is a spring loaded clamp 9–14, illustrated in FIG. 4, which holds the capsule in the feed station.

Located below the tracks is the feed solenoid 9–16. This solenoid is coupled with the feed plunger 9–17 used to withdraw a card from the capsule. With no power applied to the feed solenoid (the normal condition), the feed plunger is pressed by a spring 9–18 up against the cards 2–11 in the capsule, the adjustable stop 9–19 being provided to limit upward travel of the plunger. By means of a high vacuum, derived through a solenoid valve assembly 9–21 of FIG. 4 from high vacuum pump 9–22 of FIG. 4, the bottom card in the capsule is held tight against the feed plunger. This vacuum arrives at the soft upper surface 9–23 of the plunger by registry of porting 9–24, 9–26 in the plunger and porting 9–27 in the track, when the plunger is in the normally up position. Porting 9–27 in the track is connected through line 9–28 to the valve 9–21 of FIG. 4.

When power is applied to the feed solenoid, the plunger moves down to the position shown in FIG. 9 compressing the spring and pulling the bottom card through a double set of feed lips 9–13, 9–29 onto the transport belts. Due to the fact that the bottom card must curl in order to pass the lips and the cards above it are being pressed flat against the lips by the spring 6–15 and plunger 6–21 in the capsule, only the bottom card in contact with the evacuated plunger surface will leave the capsule. Occasionally, two or three cards may pass through the upper set of lips 9–13 due to adhesive force between cards. As the cards proceed towards the lower set of lips 9–29, the upper set of lips isolate them from the downward pressure exerted by the cards and spring in the capsule. The freedom of motion in the cavity between the two sets of lips enables the separations of other cards from the bottom card due to flexing of the bottom card as it passes through the lower set of lips.

As the card reaches the belts, the high vacuum is not adequate to prevent the removal of the card from the plunger as the plunger passes between the strands. The strands therefore carry the card away as the plunger passes. Inasmuch as the high vacuum is not adequate to retain the card on the plunger and thus pull it between the belts of the conveyor, the high vacuum is ported from the plunger upper surface and from plunger port 9–26 through relief passage 9–31 to the manifold 4–22 allowing the card to leave the plunger as the plunger passes between the two belts. The porting of the high vacuum source to the manifold at this time increases the force holding the card against the belts and thereby contributes to the initial acceleration of the card along the belts. If the porting is prolonged, as is the case after feeding the last card, it also opens contacts in a vacuum operated electric switch 9–32 located in the plunger, to inhibit subsequent application of power to the feed solenoid until restoration of the vacuum. This will be described subsequently. On removal of power from the solenoid, the spring returns the plunger to its original position ready to feed the next card. Power to the feed solenoid is controlled by the transport control and sorting transistor logic circuitry discussed hereinafter.

*The read station*

The read station of FIG. 10 is the next station encountered by the card as it proceeds down the transport conveyor. Light from an incandescent bulb 10–11 located in the manifold 4–22, is focused by means of an adjustable condensing lens assembly 10–12 through the timing and identifying tracks of the card 2-11, through an adjustable upper lens assembly 10-13, onto two photocells. The photocells are disposed in holder 10-14 so that one reads the light from the timing data track and the other one reads the light from the identifying data track. The signals from these cells are handled separately through amplifier circuits in box 10-16, amplified, and fed into the logic.

*The reproduce station*

Following the read station is the reproduction or print station. Details of this station are shown in FIGS. 11, 12, 13 and 14. However, the construction and operation will first be described briefly without reference to the drawings. A detailed description will follow this, with reference made to the drawings.

At the front end of this station is a ramp which, on command from the transport logic, can be tipped down between the two belts. The ramp is normally held above the belts by a ramp solenoid return spring, allowing cards to travel under it as they pass by the station. When power is applied to the ramp solenoid coupled to the ramp, the ramp is lowered and the momentum of a card approaching the station carries it up the ramp into the station. At the top of the ramp, the card passes under two points referred to as "card stops." On entering the station, the card approaches the stops at an angle. Therefore, any contact of the card with the stops only helps to guide the card into the station. If a card attempts to bounce back out of the station after having passed the stops, the trailing edge of the card will hit the stops at a perpendicular angle and the card will be stopped.

As the card moves under the stops into the station, it is guided parallel to the rack by a platen on top and two gates below, which separate the card from the belts. It should be noted at this point that the belts, ramps, stops, gates, platen, and lips of the various stations of this invention come in contact only with the outer edges of the card. Only the soft surfaces of plungers which move perpendicular to the surface of the card come in contact with it in areas where information is stored. By this means, the card is protected from scratching which might impair the reading or reproduction of the recorded information.

At the end of the forward motion of the card after entering the reproduce station, the leading edge of the card contacts the actuator arm of a limit switch (the "print" switch). The spring action of the actuator arm, after absorbing the momentum of the card, moves the card back against the "car stops" thus accurately positioning the card in the station. The signal generated by the print switch contacts indicates to the transport logic that the card has entered the reproduce station and is now ready to be processed.

Actuation of the print switch initiates movement of the card in a carriage of the print station in synchronism with the movement of a photosensitive member in a copying machine. This is the copier of 1-22 of FIG. 1. As the carriage moves, the card is scanned by a light, and by optical projection, the documentary information thereon is transferred to the photosensitive member in the copying machine to provide a copy of the document. The photosensitive member of the machine may be either a photosensitive drum, as in xerography, or a sensitized paper as in other couying processes, or other photosensitive member whereby copies may be produced of documents optically projected from a miniature film card.

The detailed construction of the card reproducing station of this invention will be more readily appreciated by referring to the FIGS. 11, 12, 13 and 14. Belt 4-12 is shown resting on upper surface of the belt guide track 4-21. A card 2-11 is shown resting on the belt. The reproducing station includes at its front end the ramp 11-11 pivotally mounted by means of the shaft 11-12 to the two base plates 11-13 and 11-14 which are affixed by screws to the belt guide track. The ramp shaft is coupled to the plunger of ramp solenoid 11-16 whereby energization of the solenoid rotates the shaft to place the ramp in its depressed position, as shown, whereby it is able to pick up a card 2-11 moving along on the belts in the direction of arrow 11-17. An alternate and inactive position of the ramp is illustrated by the dotted outline designated by reference numeral 11-18. The ramp is returned to this position by the ramp solenoid return spring 11-19.

A pair of gates 11-21 and 11-22 is provided and the gates are mounted on the base plates 11-13 and 11-14 in such a manner as to be laterally slidable so as to increase the space between their inner edges 11-23 and 11-24. Positioning strips 11-13a and 11-14a are fastened to the plates 11-13 and 11-4, respectively, by screws. The forward portion of each of the gates is provided with an incline 11-26 whereby a card ascending the ramp 11-11 can easily continue along the forward portion of the gates and move toward the rear portions thereof.

Gate actuators 11-27 and 11-28 are provided with key-like projections 11-29, 11-31 which extend into longitudinal recesses of the gates 11-21 and 11-22, respectively. The gate actuator 11-28 is connected by a pin 11-32 to the L-shaped crank 11-33 which is connected by pin 11-34 to the plunger 11-36 of the gate solenoid 11-37.

Figure 12:
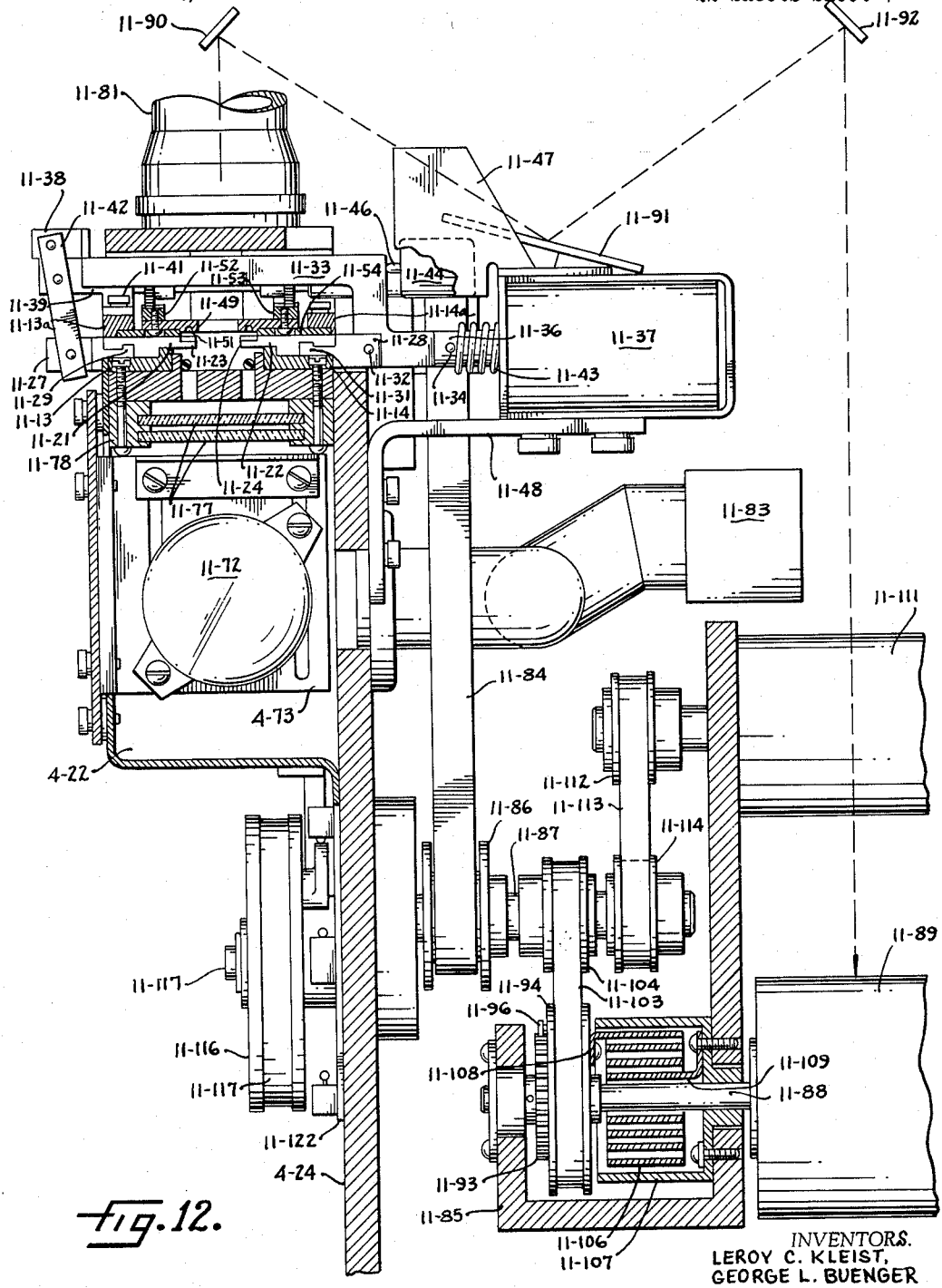
FIG. 12 is a view of the reproduce station shown partially in vertical section transverse to the direction of the card transport conveyor.

An offset link 11-38 is fastened to the L-shaped crank 11-33. A pivot arm 11-39 is fastened by means of the screw 11-41 to the positioning strip 11-13a. A pivot link 11-42 is connected by pins to the gate actuator 11-27, the pivot arm 11-39 and the offset link 11-38 whereby the motion caused by actuation of the solenoid produces a reverse motion in the gate actuator 11-27. A gate solenoid return spring 11-43 is provided whereby the gates are positioned as shown in FIG. 12 except when the gate solenoid 11-37 is actuated separating the inner edges of the gates. A card release gate limit switch 11-44 having an actuating member 11-46 engaged with the crank 11-33, is mounted by any suitable means such as, for example, the bracket 11-47 to the gate solenoid which is mounted in turn by a bracket 11-48 to the upright. A purpose of this switch is to prevent feeding of a card by the feed station at any time the gates are open, in a manner which will become apparent.

A platen 11-49 is provided having portions disposed directly above the gates. Portions of a groove 11-51 in the bottom of the platen can be seen also, the general configuration of which can be more readily observed in FIG. 14. The platen also has gear racks 11-52 and 11-53 fastened thereto. There is disposed between the outer portions of the platen and the upper faces of the gates, a card guide plate 11-54. This plate rests on the base plates 11-13 and 11-14 and is confined laterally and vertically by the positioning strips 11-13a and 11-14a. The plate constitutes a carriage frame and serves to guide and confine the side edges of a card in the carriage, to provide a depending abutment 11-56 for use as the card stop as will become apparent, to provide a mounting means for the platen, and to move longitudinally precisely within the bounds provided by the positioning strips and base plates as a card is being scanned.

The platen is securely mounted to the card guide plate by means of screws. Flexible tubing 11-57 is attached to the forward end of the platen to communicate a vacuum or pressure, as determined by valve assembly 9-21 of FIG. 4, to the slot 11-51 in the bottom face thereof.

Rack drive pinions 11-58 are mounted to a shaft 11-59 and are continuously engaged with the racks 11-52 and 11-53. The outer end of shaft 11-59 is carried in ball bearing 11-61 and the inner end of the shaft is supported by bearing 11-62. The drive shaft 11-59 is driven by a pulley 11-63.

The limit switch 11-66, also referred to as the "scan starting switch," or, preferably the "print switch," is mounted to the card guide plate 11–54 and has an operating arm 11–67 pivotally mounted at the pin 11–68 and having a broad metal "pad" 11–69 at the forward end thereof which descends to a location shown particularly well in FIGS. 11 and 13. The upper end of the arm 11–67 operates a spring-loaded plunger 11–71 of the print switch.

A source of light is provided by means of the lamp 11–72 which is mounted by way of the bracket 11–73 to the upright 4–24. The lamp, which may be, for example, a Sylvania Tru-Focus unit, produces a beam of light in an upward direction. The light produced by the lamp is permitted to pass upwardly through a slit-shaped aperture 11–74 in the aperture plate 11–76. A pair of spaced, heating-dissipating glass plates 11–77, is disposed above the aperture plate and these glass plates are maintained in spaced relation by the mounting member 11–78 fastened to the underside of the belt guide track by means of screws. These plates protect the film cards from heat. An opening 11–79 is provided through the guide-track above the aperture 11–74 so as to admit light to the area in the carriage where a card to be reproduced will be located.

A lens assembly 11–81 fastened to the lens mount 11–82 is disposed above the opening 11–79 and is available thereby to project light originating at the lamp 11–72 and passing through a card such as card 2–11 when positioned in the carriage.

It should be noted that, at all times, a vacuum is maintained in manifold 4–22 under the belt guide track by the high volume pump 11–83 and is communicated to the area of the belts by means of the slots 4–26 in the track.

As illustrated in FIG. 12, the drive for the pulley 11–63 is provided through a belt 11–84 driven by the pulley 11–86 fastened to shaft 11–87. Inasmuch as belt slippage cannot be tolerated if synchronism of the carriage drive with the copying machine is to be achieved, the belts mentioned herein are of the positive drive type used in timing applications. Drive for pulley 11–86 is obtained by coupling to the driving system of a conventional copying machine of the progressive or scanning type.

An example of a suitable machine is the Xerox Model Office Copier produced by Haloid Xerox, Inc., of Rochester, New York. The Model 914 machine conventionally produces copies of documents by xerography, in a manner well known to those skilled in the art. When the machine is used in conventional manner, not as used according to this invention, the document to be copied is stationary and an illuminating lamp and lens system are moved in synchronism with the drum of the machine to "scan" the document in the reproduction process. The reproduction is the full size of the original document to be reproduced. When used with the present invention, however, the lamp, document holder, and moving lens system are dispensed with, as the present invention projects the documentary information from the film card to the photosensitive drum of the machine.

The terms "continuous process" and "progressive" are used from time to time herein with reference to the copying or reproducing process, to designate a process whereby a portion of the image to be reproduced is presented to a portion of a photoconductively sensitized drum or sensitized paper or the like to which it is to be transferred, and the image receiving medium progresses until the entire image from one end to the other has been impressed on the receiving medium. This is to distinguish from a process wherein the entire image to be transferred is impressed on the entire receiving medium substantially instantaneously, such as in direct photographic copying.

Obviously, machines other than xerographic machines employ continuous processes and may therefore be used according to this invention. For example, the Smith-Corona-Marchant Model 33 office copier may be used.

In FIGS. 11 and 12, a portion of the frame of the copying machine is designated by reference number 11–85. Shaft 11–88 is driven continuously and at constant speed by driven mechanism (not shown) in the copying machine. It, therefore, drives the drum 11–89 continuously and at constant speed. The light path from the lens assembly 11–81 to drum 11–89 includes mirrors 11–90, 11–91 and 11–92. A ratchet wheel 11–93 is fastened to the shaft 11–88 and is, accordingly, a constantly rotating member.

A drive pulley 11–94 is mounted on shaft 11–88 but is rotationally free with respect to the shaft, so that it may normally remain stationary as the shaft rotates. A pawl 11–96 is pivotally mounted to pulley 11–94 by means of pin 11–97. The pawl is held normally disengaged from the ratchet wheel by means of return spring 11–98.

A scan starting solenoid 11–99 is fixed to pulley 11–94 and is coupled to the pawl by means of lever 11–101 mounted to pulley 11–94 by pin 11–102. Actuation of the solenoid can thus engage the pawl with the ratchet wheel to initiate rotation of drive pulley 11–94 with shaft 11–88. Pulley 11–94 drives pulley 11–86 by means of belt 11–103 and pulley 11–104 fastened to the shaft 11–89. Pulley 11–63 drives the carriage for scanning of a card in the carriage.

A scan return torsion spring 11–106 coiled in the form of a clock spring is disposed in the housing 11–109 which is fastened to frame 11–87. One portion of the spring, such as outer winding 11–108, may be fastened to the drive pulley 11–94 and the other portion such as inner winding 11–109 may be fastened to the housing whereby the spring will be wound whenever the pawl 11–96 is engaged with the ratchet wheel 11–93.

A brake motor 11–111, which is part of the Xerox machine, may be coupled to shaft 11–87 by way of motor pulley 11–112, belt 11–113, and shaft pulley 11–114, to controllably absorb energy stored in the spring 11–106 during a scan, when the pawl 11–96 is released at the end of the scan. The motor is an A.C. motor. At the end of the scan, a low level D.C. voltage applied to the rotor provides a light braking action to slow the return to home position ("scan home") caused by the scan return spring. A high level D.C. voltage applied to the rotor toward the end of "scan home" effectively stops the "scan home."

A timing wheel 11–116, in the form of a pulley, may be journalled to a shaft 11–117 mounted to upright 4–24. The drive for the timing wheel is by way of belt 11–117 driven by pulley 11–118 fastened to shaft 11–87. The timing wheel is shown in "home" position and should be understood to rotate clockwise from the position shown, during scan of a card, and to return to the position shown, in a counterclockwise direction during "scan home." The wheel has a lug 11–119 to which cam 11–121 is mounted. Behind the wheel and fastened to the upright 4–24, is a switch mounting plate 11–122. Several switches engageable by the cam, are mounted to this plate. Switch 11–123 is a program cam switch for initiating miscellaneous functions in the copying machine, such as initiating paper feed and operating a blower. Switch 11–124 is the end-of-first-document-scan switch which, for a film card bearing only one document, causes deenergization of the scan solenoid and consequent disengagement of the pawl from the ratchet wheel. Switch 11–126 is the end-of-second-document-scan switch. Switch 11–127 is the final brake switch which applies high voltage D.C. to the brake motor at the end of the "scan home." Switch 11–128 is the home switch for purposes which will become apparent. A fixed stop 11–129 is provided for engagement by lug 11–119 at the end of scan home to establish a fixed mechanical reference from which to start scans.

Referring to FIG. 14, the underside of the platen is shown illustrating the arrangement of the various portions of the passageway 11–51. The face in which passageway 11–51 is provided, is of a flatness preferably of .001 inch total indicator reading or better. In this way, when the high vacuum is applied to passageway 11–51 with the film card in place in the carriage, the card can be held against the platen by the vacuum with a like degree of flatness. A typical vacuum is 29 inches of mercury, for example.

An integral rib 11–131 extending transversely across the opening in the platen can be incorporated where the film cards used have two separate document areas on them separated by a space bearing no information. The rib, therefore, does not interfere with projection of the information on the card, while it provides additional support and flattening effect for the card.

As indicated above, actuation of the print switch 11–66 by the card in the reproduce station carriage, causes deenergization of the ramp solenoid 11–16 whereupon the ramp returns to its normal position. It also causes activation of the scan solenoid 11–99. The scan solenoid engages the pawl 11–96 with the teeth of the ratchet wheel 11–93 which rotates in synchronism the photosensitive member in the copying machine. Engagement of the pawl thereby causes movement of the carriage of the reproducing station whereupon the film card therein is scanned and projected to the photosensitive member in the copying machine. At the end of the scan of both documents on the card, the cam 11–121 coupled to the carriage moving mechanism, engages the end-of-second-document-scan limit switch 11–126 which deenergizes the scan solenoid, releasing the pawl. During the traverse of the carriage, the return spring 11–106 is wound, and at the end of the scan, the return spring returns the carriage to the "home" position established by engagement of stop 11–129 by the timing wheel lug 11–119. Return of the carriage is controlled by means of the electric brake 11–111 through other control means such as a dashpot, shock absorber, or the like may be employed. For a single card in the carriage, the reproduce control logic will provide the number of scans required for the number of copies selected on the control panel of the machine. At the end of the last scan, and when the carriage has returned to its original home position, the card release gate solenoid 11–37 will be energized to separate the gates below the card, the gate crank then operating the card release gate limit switch 11–44. The vacuum which held the card flat against the platen during the scanning, is switched by the limit switch 11–44 to a positive air flow which ejects the card to the transport belts.

*The receive stations*

Following the print station are the receive stations. The number of receive stations on a machine will vary according to the number of groups into which the user might wish to sort a capsule of cards. For example, as in the disclosed embodiment, he may wish to place any card previously misfiled into the capsule into one station, all outdated cards in a second, and all remaining cards including those reproduced into a third capsule. A card is received by a receive station in the same manner described for the reproduce station with these exceptions: Instead of the card being guided and located between the platen and gates, it is guided into and located between two sets of lips. One set separates the card from the belts while the other set supports those cards previously processed by the station and prevents these cards from dropping in such a way as to obstruct the path of other cards entering the station. The ramp for the station located furthest from the feed station, the final receive station, is inactive and removes from the belts all cards not previously removed. The ramps, card stops, card locating limit switch actuator and switch are all similar to the corresponding elements of the reproduce station, and function in a like manner.

Except for the fixed ramp of the final receive station, all of the receive stations have the configuration, shown in FIGS. 15, 16, 17, 18 and 19, and they process a received card in a manner as will now be described. A "receive" plunger 15–11 is used to push received cards through the upper lips 15–12 (shown only in FIG. 19) of the station into a rectangular tube or hopper 15–13 which stores the cards until they are manually removed from the station into a capsule. The receive plunger includes a rubber pad 15–14 and pad holder 15–16 at the upper end. Normal to the surface of the pad is a shaft having two diameters, the greater of which 15–17 is located at the pad or upper end of the shaft. The small diameter portion 15–18 of the plunger shaft fits freely into a hole drilled through the receive solenoid plunger 15–19. On the application of power to the solenoid coil 15–21, the solenoid plunger is pulled up into the coil. The upward movement of the plunger pushes up the receive plunger. The plungers are returned to their normal position after the removal of solenoid power by two springs. One spring 15–22 is compressed between the solenoid coil and a flange 15–23 at the end of the solenoid plunger. The second spring 15–24 is compressed between the flange and a block 15–26 pinned to shaft 15–18 by pin 15–29 passing through the receive plunger shaft 15–18 at its lower end. The first spring tends to push the solenoid plunger down out of its coil. The second spring tends to seat the receive plunger shaft in the solenoid plunger due to the fact that the downward motion of the shaft with respect to the solenoid plunger is limited by the step between the diameters 15–17 and 15–18.

The receive plunger guide 15–27 (shown in FIG. 4 and FIG. 15) is a fixture which is free to travel vertically below the manifold on two bolts 15–28. The manifold limits the upward motion of this guide while the heads of the bolts limit its downward motion. The lower portion of the receive plunger and the pin 15–29 through it, travel in this guide. The pin rides in slots 15–31 cut in the guides. By this means, the rotation of the plunger is limited insuring that the plunger pad remains properly oriented with the track belts.

Figure 19:
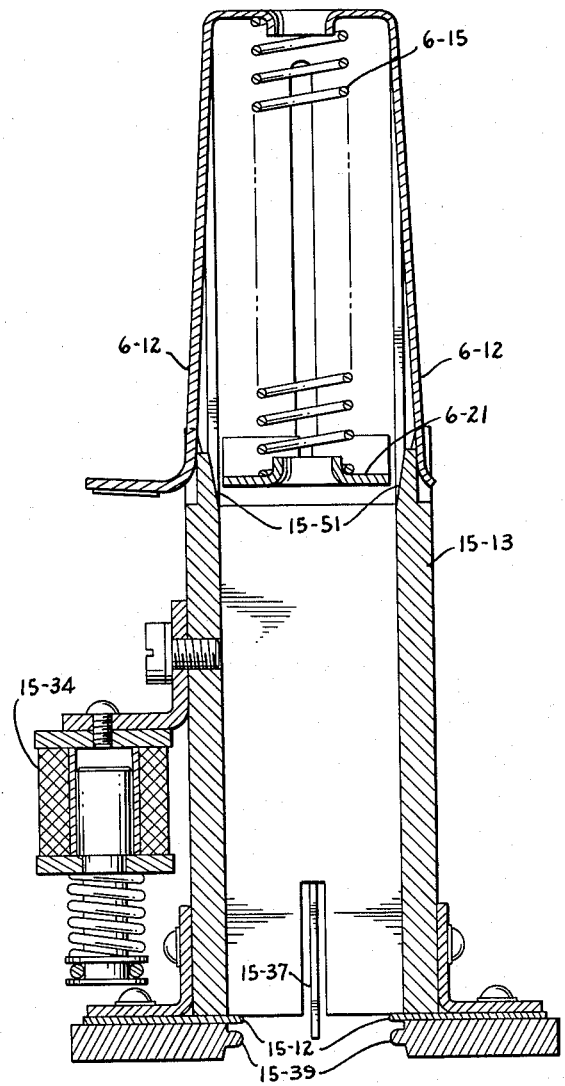
FIG. 19 is a vertical sectional view of the upper portion of the error station taken on a plane transverse to the direction of travel of the conveyor belts, illustrating certain details including the placement of a capsule atop the hopper in position to receive the cards therein.

A lever 15–33 coupled to this guide enables an operator to manually pull the guide up the two bolts thereby pushing the plunger up through the storage tube 15–13 into a capsule mounted thereon as in FIG. 19. When the operator lets go of the lever, the guide and plungers are returned to their normal position by the action of the two springs.

In its normal position, the receive plunger is held by the springs at a position sufficiently below the belts to allow the unobstructed passage of cards not to be processed by the station. When the transistor logic determines that a specific card is to be removed at a specific receive station, the ramp solenoid 15–34 for that station will be energized. The ramp 15–36 is therefore lowered and intercepts the card as it moves along the conveyor. When the selected card enters the receive station, it drives against the actuating arm 15–37 of the limit switch 15–38 for that station. Upon receipt of the signal from this limit switch by the transport logic, the plunger solenoid for the station, pushes the plunger 15–11 between the belts and lower set of lips 15–39 (shown in FIG. 19) to engage the received card resting on the lower set of lips. The plunger continues upward to push the card through the upper lips 15–12 into the hopper tube 15–13.

A second plunger assembly (15–41 in FIGS. 15 and 18), acting from above, controls the motion of the processed cards, thus preventing them from falling back through the upper lips, and assures that the cards will remain in the tube after snapping through the lips. This upper plunger is held down by its own weight and that of the snubbing device at its lower end, and is free to rise with the increase of cards in the tube. The snubbing device includes a pin 15–42 in the hold-down rod 15–43 supporting a sleeve 15–44. At the lower end of the sleeve is a soft hold-down pad 15–46. The snubbing spring 15–47 disposed around the sleeve and longitudinally confined by the pin and the pad biases the sleeve and pad assembly downwardly, but by virtue of the slot 15-48 in the sleeve, the pad assembly can move upwardly with respect to the hold-down rod. Thus the spring absorbs the initial shock of the receive plunger action in the tube. In so doing harmonic motion of the card stack and this plunger is minimized. The fixture 15-49 which supports the upper plunger assembly is free to rotate in such a manner that this plunger assembly can be lifted out of the tube and rotated to the side of the tube when removing cards from the station.

The top portion of the card storage tube is a fixture used to locate a capsule over the end of the tube. As at the feed station, the sides of the capsule are separated by two camming surfaces 15-51 when a capsule is pressed down on the fixture. By using the lever handle 15-52 to manually move the receive plunger up through the card storage tube, a stack of cards is transferred from the tube to a capsule located above it, as shown in FIG. 19. By removing the capsule from the fixture while the plunger is held in a raised position, the closing of the capsule lips retains the cards within the capsule.

The coupling between the receive plunger springs, solenoid, and the manually operated lever is such that the solenoid imparts a stroke of only sufficient length to the plunger to push a card through the upper lips of the receive station. By means of the lever, the plunger can be pushed up through the storage tube into the capsule a sufficient distance to retain a card stack in the capsule while the capsule is being removed from the station and its lips are closing, providing a semiautomatic means of reloading a capsule from a receive station.

To provide an electrical indication of when a hopper is full, a limit switch 15-53 is mounted to the hopper. It has an actuating arm 15-54 which extends through a slot 15-56 in the hopper wall to a point just inside the hopper. When the card hold-down plunger assembly reaches and moves the arm as it rises during filling of the hopper with cards, the switch can send a signal to illuminate a lamp thereon such as, for example, the "purge full" lamp 3-23 of FIG. 3.

*The control system*

Referring to FIG. 20, which is a detailed block diagram of the system according to this invention, control panel 1-17 is shown to include a main power switch 3-12 which is a double pole, single throw switch. Closure of the main power switch supplies power to point 20-12 from the 115 volt 30 amp A.C. power source 20-13. It also supplies power to the point 20-14 from the 115 volt 15 amp A.C. power source 20-16. Perhaps it should be mentioned here that these values, as well as those assigned elsewhere throughout this description are for purpose of example only and should, of course, not be construed as limitations on the scope of the invention. Power from point 20-14 is supplied to the transport motors 20-17 and to the supplies 20-18 for the transistor logic and the solenoids in the system. The supplies 20-18 are conventional and supply the appropriate stable D.C. energy throughout the control system. Power is supplied from the point 20-12 to the reproduce control logic 1-19 and to the start and stop switch block 20-19.

The normally open start switch, is capable upon closure thereof, of providing a 115-volt A.C. power output on line 20-21 to the panel mode switches 20-22. It is also capable of supplying a 5-volt positive D.C. supply output on line 20-23 to the point 20-24, and therefrom on line 20-23a to the feed solenoid driver and control circuits 20-26 as well as on line 20-23b to the shift register information shaping and flow control circuits 20-27.

The normally closed stop switch is capable, upon opening thereof by pressing the stop button, of connecting a source of direct current voltage at a 5-volt level above ground through the line 20-28 to the feed solenoid driver and control circuits 20-26. The effect of the 5-volt positive direct current level produced by activating the stop button during the operation of the machine is different from that produced by activating the start button prior to the operation of the machine. This will be understood upon study of the description of FIG. 21.

To provide for selection of the number of copies to be reproduced from a given film card, number of copies switches 20-31, operable by the group 3-26 of buttons provided on the control panel, are coupled to the reproduce control logic 1-19.

The panel character switch block 20-32 is, of course, operable by the groups 3-31, 3-36, and 3-41 of character switch buttons described with reference to FIG. 3. As will become apparent, each of the character switch buttons is capable of operating a switch group for producing an output bit sequence corresponding to the character of the button and in the excess three binary code. The bit outputs are represented in FIG. 20 by the reference numeral 20-33. The bit outputs are derived from input signals to each group of character switches, the inputs being designated 20-34. These inputs are derived from the character position outputs 20-36, of counter and decoder 20-37 of the machine.

Finally, the control panel includes a group of indicator lights 20-38, already mentioned with reference to FIG. 3, to indicate to the operator various conditions of the machine.

Referring further to FIG. 20, the read station 1-13 includes a photocell and amplifier 20-39, for the time track of the film card. It also includes a photocell and amplifier 20-41 for the identification track of the film card.

The output of the time track photocell and amplifier 20-39 is coupled to the timing signal generator 20-42 having a counter advance output 20-43 coupled to the counter advance input 20-44 of the counter 20-37. The timing signal generator output to the counter moves the counter along in response to the reading of the time track data bits by the photocell at the read station 1-13.

The timing signal generator 20-42 also has a sampler output 20-46 coupled to the shift register information shaping and flow control circuits 20-27, and also to the comparing test flip-flops 20-48. The output of the identifying information data track photocell and amplifier 20-41, is coupled to data reshaping circuits 20-49. The output of the reshaping circuits is coupled both to the shift register information shaping and flow control circuits 20-27 and also to signal comparing gates 20-51. From circuits 20-27 the core shift register 20-52 receives information at input 20-53. Drive for the core shift register comes into the register at the shift input 20-54 from the shift register driver and control circuits 20-56.

The shift register driver and control circuits are controlled by outputs from the counter 20-37, from the counter advance output of the 20-43 of the timing signal generator 20-42, and from the panel mode switches 20-22. A further control is provided by way of an input from the logic setting output 20-57 of the feed solenoid driver and control circuits 20-26. The purpose of the core shift register is to store information based on the first eight characters of a film card. This information is obtained from the first card of the group fed from the capsule at the feed station, and is compared with the first eight characters of each succeeding card from the given capsule to ascertain whether or not there has been a filing error.

For each subsequent card, the identifying data output 20-58 of the core shift register is coupled back into the circuits 20-27 from which an output is coupled to the signal comparing gates 20-51.

In addition to the inputs to the signal comparing gates 20-51 from the circuits 20-27 and from the reshaping circuitry 20-49, an input is also derived from the signal generating gates 20-59. The signal generating gates include AND gates and OR gates and inverters. These circuit elements receive inputs from two principal sources. One input is received from the bit output section 20-61 of the counter 20-37. The input to the gates 20-59 from the bit output 20–61 represents the number of the bit in the character being read. The other input to the gates 20–59 is derived from the bit outputs 20–33 of the panel character switches 20–32. At any one time the data from this source represents which of the 17 character positions of a film card is being considered and the character in that position designated by the character switch button which is depressed. The output of the signal generating gates, representing the character keyed in at the control panel, is coupled to the signal comparing gates 20–51 for comparison with card identifying data being read by the photocell 20–41 from a film card passing through the read station 1–13. The output of the comparing gates is coupled to the comparing test flip-flops.

Additional inputs are provided to the comparing test flip-flops 20–48. These include a sampler pulse input from the sampler output 20–46 of the timing signal generator to time and initiate the sampling of the signals from the other inputs. An additional input is provided from the character position outputs 20–36 of the counter 20–37 to indicate the position of the character being considered. Finally another input is available from the panel mode switches 20–22 to designate the specific flip-flops in the group 20–48 to handle the information input to the group.

The output of the group 20–48 is coupled to the decoding gates 20–63. An additional input is provided to the decoding gates from the panel mode switches 20–22, again to place the proper gates in condition for handling the information from the comparing test flip-flops according to the mode selected.

The output of the decoding gates 20–63 is coupled to the reproduce and receive station control flip-flops 20–64. Other inputs are provided for the reproduce and receive station control flip-flops. One input is derived from the character position outputs 20–36 of the counter 20–37. Another input is from the logic setting output 20–57 of the feed solenoid driver and control circuits 20–26.

The reproduce and receive station control flip-flops produce outputs back to the decoding gates 20–63 and also to the various transport station control gates and drivers thereof in the block 20–66. The outputs of the gates and drivers in block 20–66 are available to energize appropriate ramp solenoids 20–67 for the purge and error receive stations 20–68. The output from block 20–66 to the reproduce station 1–14 is for energization of the ramp solenoid for the reproduce station.

The receive stations 1–16 have their limit switches 20–68 which feed signals back to the block 20–66 upon activation by a card received by a station. Similarly, the limit switch in the reproduce station feeds back a signal to the block 20–66 upon activation of the limit switch by a card received in the station.

Another output from the block 20–66 is coupled to the reproduce control logic 1–19 to provide a signal at that point at the same time of the signal which operates the ramp of the reproduce station. The reproduce timing switches in block 1–21 are in mechanical synchronization with the mechanism of the reproduce station 1–14, and are coupled to the reproduce control logic 1–19 to provide control thereof according to operation of the station.

A vacuum switch 20–71 is shown providing input to the feed solenoid driver and control circuits 20–26. The purpose in operation of this switch will become apparent as the description proceeds. A solenoid output 20–72 is shown in conjunction with the control circuits 20–26 and provides an output to the feed solenoid 4–73. This output of course controls the operation of the feed solenoid to feed cards from the feed station to the conveyor belt.

*Character switches*

It will be well at this point to describe the character switches of FIG. 23. For the purpose of convenience of reference in the description which is to follow, the excess three binary code is set out below for decimal numbers from 0 through 9.

| Decimal | Binary | | | |
|---|---|---|---|---|
| | $2^3$ | $2^2$ | $2^1$ | $2^0$ |
| 0 | 0 | 0 | 1 | 1 |
| 1 | 0 | 1 | 0 | 0 |
| 2 | 0 | 1 | 0 | 1 |
| 3 | 0 | 1 | 1 | 0 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 0 | 0 |

It has already been mentioned that the control panel includes a group of ten buttons, each bearing a character from 0 through 9, for each character position of nine character positions corresponding to the last nine characters on the film cards used in this example of the machine. FIG. 23 is a schematic diagram of the wiring of each group of ten character buttons. The buttons in a group are shown at the left-hand side of the schematic, each button bearing a character, and the switches operated by a button being connected to the button by a dotted line. Inasmuch as four binary numbers are adequate to designate any of the decimal numbers from 0 to 9, there are four binary output terminals designated respectively, 23–10, 23–11, 23–12 and 23–13. The terminal 23–10 represents $2^0$, 23–11 represents $2^1$, 23–12 represents $2^2$ and 23–13 represents $2^3$.

The buttons in the group should be understood to be the type which remains depressed once pressed, and all the buttons are interlocked so that depression of one releases another. An input to the network is provided at terminal 23–14. By means, which will later become apparent as the description proceeds, an input potential of five volts positive potential is available at the terminal 23–14 when information from the switch group is to be compared with card information being read. At all other times the input level at the terminal is 5 volts negative potential.

The switches connected to each of the buttons are all in the normally closed position shown. When a button is depressed, its corresponding switch contacts are opened to provide appropriate outputs at the output terminals. For example, when the decimal button bearing the decimal character 5 is depressed, the switch contacts 23–16 and 23–17 are opened. All other switch contacts remain closed. Thus, assuming a 5-volt positive potential at the input terminal 23–14, and tracing through the circuit, a 5-volt positive potential will be available at terminal 23–13, no specific potential will be available at terminal 23–12, this terminal being open, by virtue of the opening of switch 23–16, no specific potential will be available at terminal 23–11, again because this terminal is open by virtue of the opening of switch 23–16, and similarly, no potential is present at terminal 23–10 by virtue of the opening of switch 23–17. It should be mentioned at this point that the effect of an open circuit to one of the output terminals or to any of the output terminals provides the same effect at the input of an OR gate coupled thereto, as does a negative voltage at the output terminal. Accordingly, the effect of having a plus 5-volt potential at terminal 23–13 and open circuits to the remaining three output terminals is to provide a binary code output in the excess three system representing the decimal character 5.

Before beginning a detailed description of the logic diagrams, it should be understood that it has been the practice to use direct current levels of either 5 volts positive potential or 5 volts negative potential on the various control elements in the logic. Clearly, of course, this invention is not restricted to the use of such potentials, but they are mentioned here for purposes of facilitating the description and to provide an example of a typical embodiment of the invention. In the discussion which follows, when a signal line has a potential of 5 volts direct current above ground, the line will be termed "up." When the level on the signal line is 5 volts negative potential, the line will be referred to as "down." A logic "1" is represented by the positive voltage level of between 4 and 5 volts above ground, while a logic "0" is represented by a negative voltage level between 4 and 5 volts below ground.

THE LOGIC AND OPERATION THEREOF

Initiation of processing

Figure 21A:
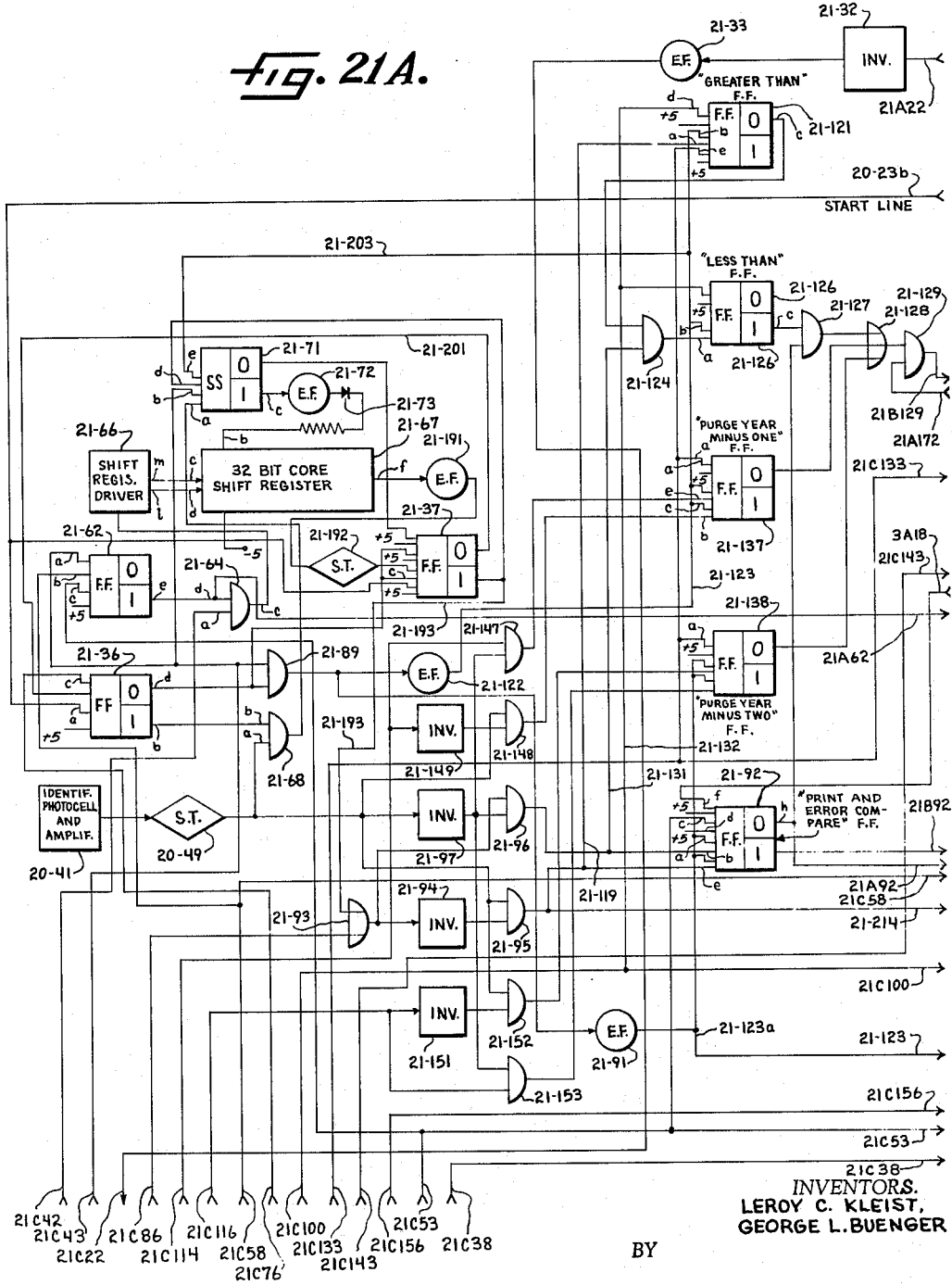
Figure 21B:
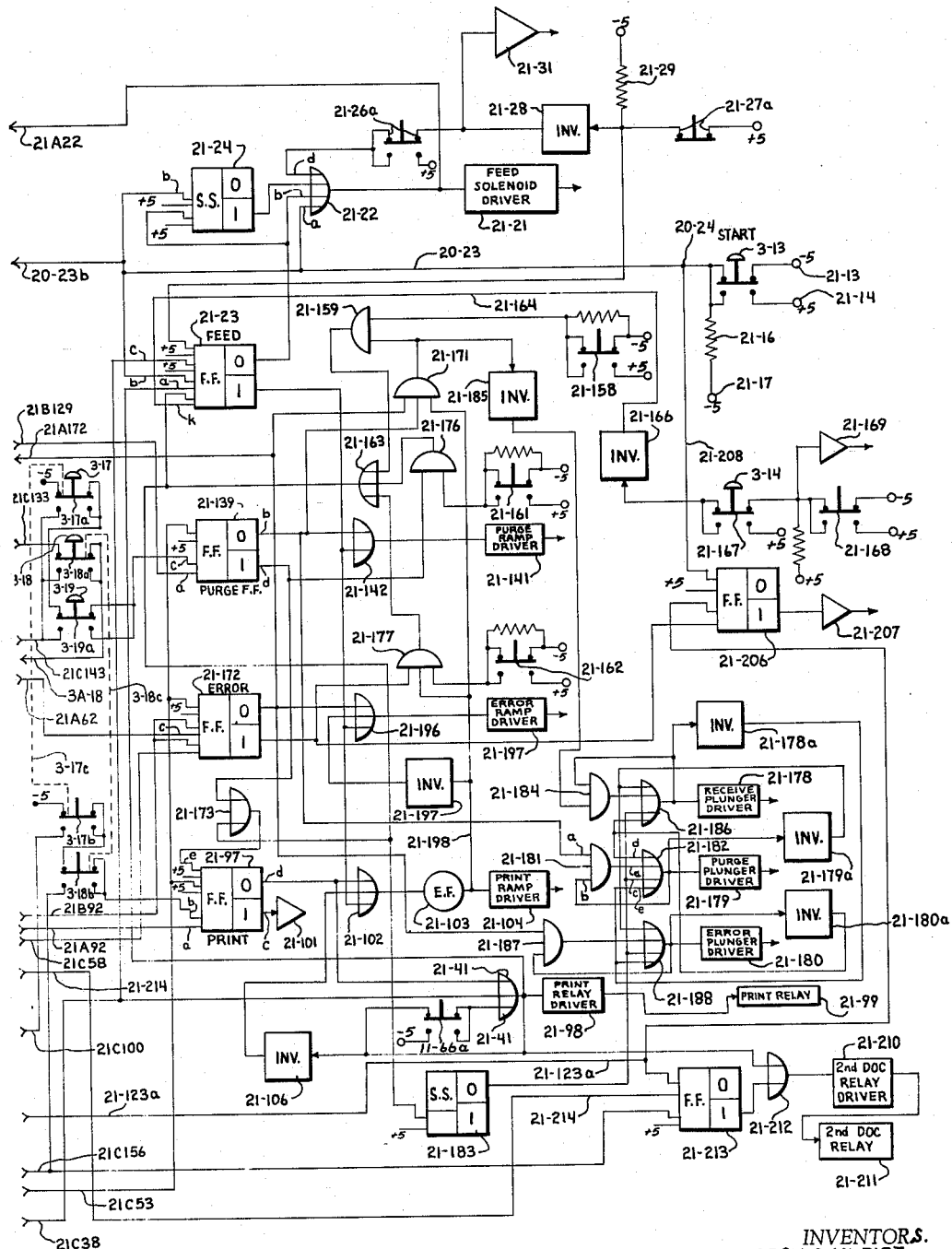

Referring to FIG. 21B there is shown the start switch button 3–13 with the contacts normally coupling the junction 20–24 to the potential at terminal 21–13 which is 5 volts below ground. Pressing of the start button will connect junction 20–24 to a potential of 5 volts above ground at terminal 21–14. Resistor 21–16 connected between junction 20–24 and terminal 21–17 which is at a 5-volt potential below ground serves to tie the potential at junction 20–24 to 5 volts below ground during the movement of the start button between the normally closed contacts and the normally open contacts. It thus prevents false starts.

Hereinafter, throughout the description, the drawing will be relied upon to indicate the potentials normally applied at terminals such as 21–13, 21–14 and 21–17. For example, at all inputs where there is normally applied a potential of 5 volts above ground, this will be designated on the drawing by +5. Similarly, at all terminals or inputs where there is normally maintained a potential of 5 volts below the ground, this will be indicated on the drawing by a −5. Thus, without further mention in the description of the logic diagrams, the inputs normally maintained at various points shown on the drawing will be at the level as indicated on the drawing.

While numerous solenoids are employed throughout the system of this invention, they will not be illustrated on the logic diagrams, but should be understood to be coupled immediately to the corresponding solenoid driver which is shown on the diagrams. The solenoid drivers which may be used throughout are shown in the schematic of FIG. 32. They will be understood to produce an output for energization of a solenoid, only when the input to the driver is at a level of 5 volts below ground. In other words, to activate the various drivers used throughout the diagram for energization of solenoids, it is necessary to have a logic "0" input to the driver.

The single shots, flip-flops, AND gates, OR gates, inverters, emitter follower drivers, and Schmitt triggers, which will be mentioned in the description of the logic diagram should be considered of the type shown in the additional figures of drawings herein. Prior to further description of the logic diagram, it may be well to briefly refer to the drawings representing the other components used throughout the logic diagram. For example, referring to FIG. 25, which is a single-shot with complementary outputs at terminals 25–11 and 25–12, the input to the single shot is by way of pulse gates designated generally as 25–13. In the stable state of the single shot, the zero state, transistors 25–14 and 25–15 are normally conducting whereby the terminal 25–12 is normally down, making this the "1" output terminal of the single shot. At the same time, the complementary output terminal 25–11 is up, making this "0" output of the single shot.

The gate input to the base of transistor 25–14 includes four terminals 25–16, 25–17, 25–18 and 25–19. The first terminal 25–16 is coupled through resistance 25–20 to the diode 25–21 which is coupled in turn to the junction 25–22 on the input line to the base of the transistor 25–14. Input terminal 25–17 is coupled through capacitor 25–23 to the same diode. When the input terminal 25–16 is up, and when a positive pulse input signal to terminal 25–17 brings this terminal up, a positive pulse is applied to the base of transistor 25–14. This transistor is thus turned off whereupon the output terminal 25–12 will go up and output terminal 25–11 will go down. This unstable state of the single shot will remain for the duration determined by timing capacitor 25–24. Then transistor 25–26 is turned off and transistors 25–14 and 25–15 are turned back on. Of course, if negative input signals are applied to terminal 25–17 the state of the single shot will not be affected. Similarly if the input terminal 25–19 is down at the time of arrival of a positive signal at terminal 25–18, the latter will not influence condition of the single shot. Thus the presence of a negative potential at terminal 25–16 disenables the upper half of the gate 25–13, whereas the presence of the positive potential at terminal 25–16 enables the upper half of the gate. The lower half of the gate 25–13 operates in the same manner as the upper half. Thus, to the single shot there are provided four input terminals, two being enable inputs and two being signal or pulse inputs.

Referring to FIG. 26, which is a schematic of flipflops used throughout the logic diagram, a flip-flop is shown to have the same type of pulse gate input as was described with reference to the single shot of FIG. 25. The flip-flop will be readily observed to be a combination of the pair of PNP transistors placed back-to-back with a pair of NPN transistors utilizing a common crossover network. Transistor 26–11 is normally on when the flip-flop is in the 0 state and the NPN transistor 26–12 is in the on condition at the same time. NPN transistor 26–13 is off as is the PNP transistor 26–14, when the flip-flop is in the 0 state. When the flip-flop is in the 1 state the output terminal 26–16 is up and the "0" output terminal 26–17 is down. Thus, output terminal 26–16 is the "1" output of the flip-flop, and output terminal terminal 26–17 is the "0" output terminal of the flip-flop.

In the manner similar to the triggering of the single shot described in FIG. 25, the proper combination of inputs to the gate 26–10 of the flip-flop will provide a transition thereof from the 0 state to the 1 state. To reset the flip-flop from the 1 state to the 0 state, reset gates 26–18 and 26–19 are provided similar to the set gates 26–10. The flip-flop is considered set when it is in a 1 state and is considered reset when the flip-flop is in a 0 state.

Referring to FIG. 27, circuitry used typically throughout the logic for the AND gating functions is shown. A conventional AND gate 27–11 is provided and is coupled to the base of transistor 27–12. Transistors 27–12 and 27–13 are coupled together to provide a double inverter effect and to provide an adequate power output at terminal 27–14 in response to an input from the gate 27–11 to the base of transistor 27–12. The pair of transistors in the circuitry shown provide an amplification whereby the gate 27–11 itself is not unduly loaded. Thus the signal levels of the logic are maintained.

Referring to FIG. 28, which is typical of the OR gates used throughout the invention, it will be observed to be quite similar to the AND gates employed. The conventional OR gate 28–11 is coupled to the base of transistor 28–12. Application of a positive pulse to any of the input terminals of the OR gate 28–11, turns off transistor 28–12, dropping the base of transistor 28–13 to turn it on, whereby an output of 5 volts above ground is produced at terminal 28–14. The transistors 28–12 and 28–13 coupled to the OR gate 28–11 provide a signal of adequate power at the output terminal 28–14, of the proper level, and without unduly loading the gate 28–11. Thus, in a manner similar to that used with the AND gate of FIG. 27, the stability of the logic is protected.

After placing of the capsule on the feed station, and after depressing the appropriate character switch buttons on the control panel together with the mode switch button corresponding to the operating mode desired, the first step in the card processing is to feed a card from the feed station to the transport belts. To do so feed solenoid driver 21—21 of FIG. 21B must be driven. Remembering that it requires a 5-volt negative input level at the input to the solenoid driver to drive it, the OR gate 21–22 must provide such an output. Inasmuch as a positive level at any of the four inputs to the OR gate 21–22 will provide a positive level at the output thereof, the feed solenoid driver cannot be energized unless all of the inputs to the OR gate are at a 5-volt negative potential.

The first of these inputs 21–22a may be provided by release of the start button 3–13 whereby the switch contacts return to their original position coupling a 5-volt negative potential to the input 21–22a. The second input 21–22b of OR gate 21–22 will be down whenever the feed control flip-flop 21–23 is set, or placed in its 1 condition. It will be observed that the block representing the feed flip-flop 21–23 is divided into three boxes. This is for the purpose of schematic illustration. One box has an F—F therein to designate a flip-flop. The box with the 0 therein represents the "0" output portion of the flip-flop, and the box with the 1 therein represents the "1" output portion of the flip-flop. This convention is used throughout the logic diagram. It will be remmebered from the discussion of FIG. 26, that when the flip-flop 21–23 is in the set condition its "0" output terminal is down.

Inputs to the flip-flops are shown at the left-hand side of the block. Those below the level of the horizontal line in the block represent the "set" inputs and those above the level of the horizontal line represent the "reset" inputs. The inputs shown as straight lines are enable inputs and those shown as irregular lines are the pulse inputs of the input gates. The same conventions are used with respect to single-shots except that they are marked S—S rather than F—F.

Referring back to the OR gate 21–22, it has an input coupled to the "1" output of the feed single-slot 21–24. Recalling the description of the single-shot in FIG. 25, it will be observed that the "1" output thereof will be down whenever the single shot is in the stable state. It will be observed that the two enable inputs of the single shot are maintained in the up condition. Therefore the impression of a positive pulse from the start switch upon depression of the start switch button to the set pulse input terminal 21–24b will place the single shot in the astable state to raise the "1" output line during this state. Thus a feed signal output will not be available from the OR gate 21–22 until the single shot 21–24 returns to the stable state. This avoids feeding before the feed solenoid, which has a comparatively slow cycling time, has returned to a position of engagement with a film card. While this is not a critical timing condition for the feeding of the first card, it is a necessary protective measure to prevent energization of the feed solenoid for feeding a subsequent card, until the solenoid plunger has engaged the subsequent card.

Finally, in order to provide a negative input level at the input terminal 21–22d of the OR gate 21–22, two conditions are required. First of all, the contacts 21–26a of the card release gate limit switch 11–44 of FIG. 12 must be closed. It will be observed from the drawing that if these contacts are not closed as shown in the drawing, but are instead in the lower position to provide a 5-volt positive potential at input 21–22d of OR gate 21–22, a feed signal cannot be obtained from the feed OR gate 21–22.

The second condition which must be fulfilled in order to provide a negative potential at the input 21–22d is that the vacuum switch contacts 21–27a be closed to provide by way of inverter 21–28, a negative potential to the card release gate switch contacts 21–26a. This vacuum switch is coupled to the feed solenoid plunger and may be installed as shown in FIG. 9 and designated 9–32. As mentioned above, the feed solenoid plunger is provided with a high vacuum whereby a card can be secured to the plunger during withdrawal from the feed station and movement to the belts. The vacuum will be high whenever a card is engaged by the plunger, and the vacuum switch is closed when the vacuum is high. However, when the vacuum is low, as for example whenever the feed station is empty of cards, the vacuum switch would be open. This condition is reflected by the presence of 5-volt negative potential derived through the resistor 21–29 which, inverted by inverter 21–28 provides a 5-volt positive potential at the input 6–22d. Thus if the plunger vacuum is low, the feed solenoid driver cannot be driven.

It will also be observed that low vacuum at the plunger provides a 5-volt positive potential at the "feed empty" lamp driver 21–31. This will illuminate the "feed empty" light 3–21 on the control panel of the machine. A lamp driver schematic is presented in FIG. 34. Because of its simplicity, discussion thereof is believed unnecessary.

A positive potential applied to input terminal 34–11 is effective to turn on transistor 34–12. Output terminal 34–13 will then be brought to ground potential. Thus a lamp having one side connected to terminal 34–13 and another side connected to a suitably higher potential, such as 24-volt D.C., would be illuminated by the positive potential applied to input terminal 34–11.

To summarize, in order to obtain energization of the feed solenoid, it is necessary that the start button be released, that the feed flip-flop be in the feed or 1 condition, that the feed single-shot 21–24 have returned to the stable state, that the card release gates have closed, and that a high vacuum is provided to the vacuum switch.

Assuming that all of the aforementioned conditions have been met, the feed solenoid driver energizes the feed solenoid to remove a card from the feed station and place it on the belt. At the same time, OR gate 21–22 provides a signal on line 21A22 through the inverter 21–32 and emitter follower 21–33 of FIG. 21A to the line 21C22 for setting the counter of FIG. 21C and FIG. 21D.

Assuming that the enable input 21–23a of the feed flip-flop is up, the pressing of the start button brings the corresponding pulse input 21–23b up, to set the flip-flop to the 1 or "feed" condition whereby the "0" output terminal 21–23h thereof is down. In addition to this function and the function of pulsing the feed single shot 21–24, pressing of the start button also serves over line 20–23b to set the register input control flip-flop 21–36 of FIG. 21A and to set the register data return flip-flop 21–37. At this point, a film card may be considered moving along the belt from the feed station toward the other stations situated along the conveyor.

*Card reading*

The next operation is the reading of the card by the reading station. As was mentioned above, the reading station includes a photocell and amplifier together with illuminating means for both the identifying data track and the timing data track provided on the film card. The manner of reading the information by use of light and photocells is typical of those known in the art. FIG. 24 shows the schematic diagram of the photocell and amplifier used for each channel in the read station. In FIG. 24, a 24-volt negative potential is provided at terminal 24–11. This is coupled to a photodiode 24–12 of which type 1N2175 is satisfactory. The output of the photodiode is connected to the emitter of an NPN transistor 24–13. The collector of transistor 24–13 is coupled to the base of PNP transistor 24–14. The base of 24–14 is clamped to a 5-volt level above ground by the diode 24–16. The output of the circuit is available at terminal 24–17 and is up upon the reading of a dark bit and down upon the reading of a light bit.

*Timing*

Figure 21C:
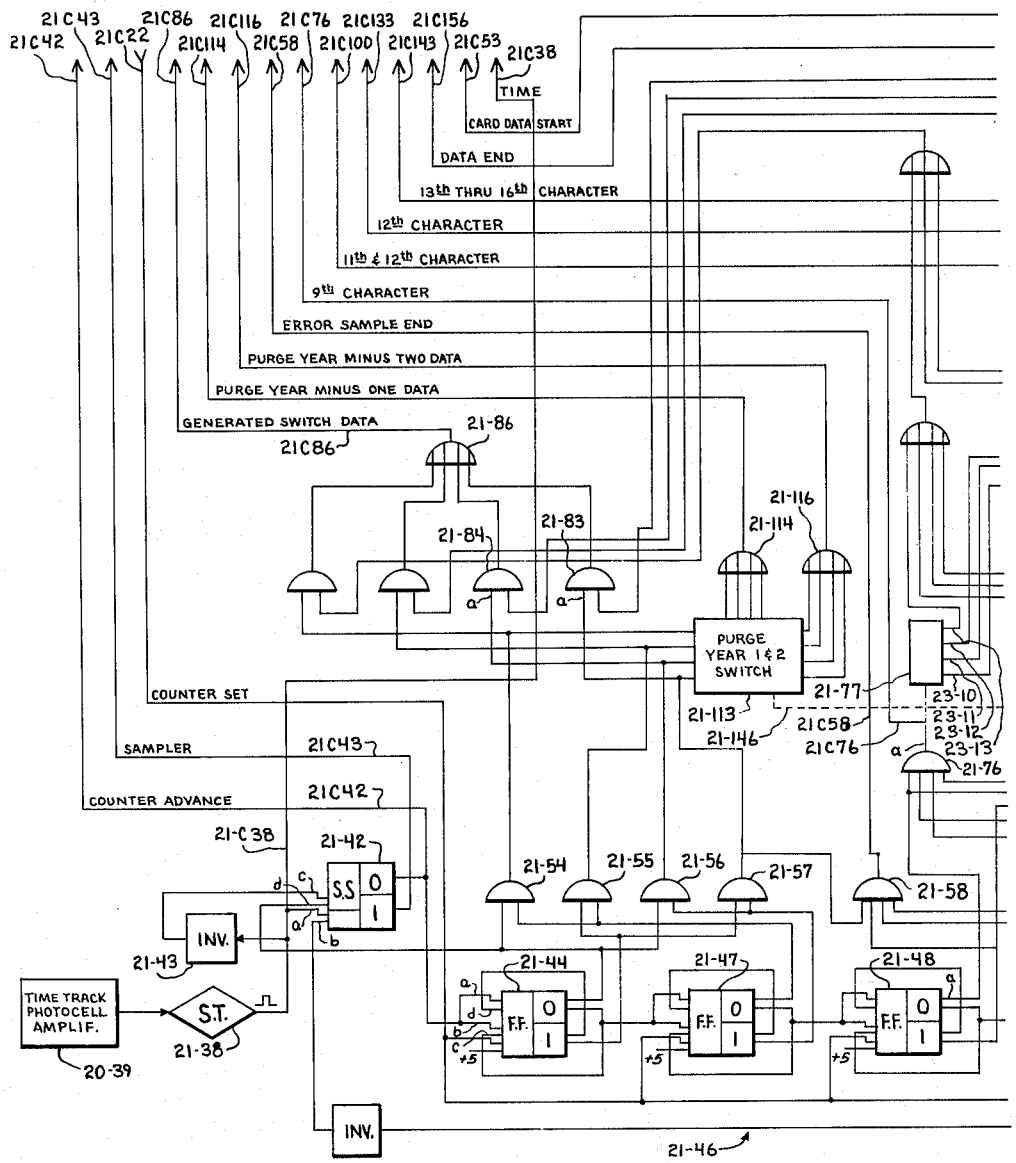

Referring further to FIG. 21C, the time track photocell and amplifier 20–39, upon reading the first timing bit of the card, produces an output to the Schmitt trigger 21-38. The Schmitt trigger 21-38 is primarily for the purpose, as are the other Schmitt triggers used in this logic, of providing a wave shaping function. Thus the output is a rectangular waveform as indicated. The Schmitt trigger is shown in detail in FIG. 35, though others could be employed as well.

Referring to FIG. 35, the input is applied to the terminal 35-11 coupled to the base of transistor 35-12. Transistors 35-12 and 35-13 together with their associated circuitry function in a manner common to Schmitt trigger circuits. Transistor 35-14 performs a switching function and together with the inverter transistor 35-16 isolates the Schmitt trigger from the load, whereby the proper operation of the Schmitt trigger is not prevented. The output of the circuit is available at terminal 35-17.

Referring again to FIG. 21C, Schmitt trigger provides a timing output pulse on output line 21C38 corresponding to each dark timing bit on the timing track of the film card. It will be observed, referring to FIGS. 21A and 21B that the time pulse from the Schmitt trigger is fed over the line 21C38 to the reset pulse input terminal 21-23C of the feed flip-flop. This pulse then, from the first bit of the card fed, resets the feed flip-flop to 0 or "don't feed" state. The timing pulses are also fed from the line 21C38 to the print relay OR gate 21-41. The purpose of this will become apparent as the description proceeds.

Referring again to FIG. 21C, the timing pulse output from Schmitt trigger 21-38 is fed to the set pulse input 21-42a of the timing track single shot 21-42. At this time the enable input 21-42b of the single shot 21-42 is up whereby the pulse input at 21-42a triggers the single shot into the unstable state. Thus, the "0" output thereof is down and the "1" output is up. The timing pulse output from the Schmitt trigger 21-38 is also fed through inverter 21-43 to the pulse input 21-42c of the single shot. Thus, assuming an enable potential level is available at the input 21-42d of the single shot 21-42, either a positive or negative pulse output signal from the Schmitt trigger will trigger the single shot into the unstable state whereby the "0" output thereof is down and the "1" output is up.

Figure 21D:
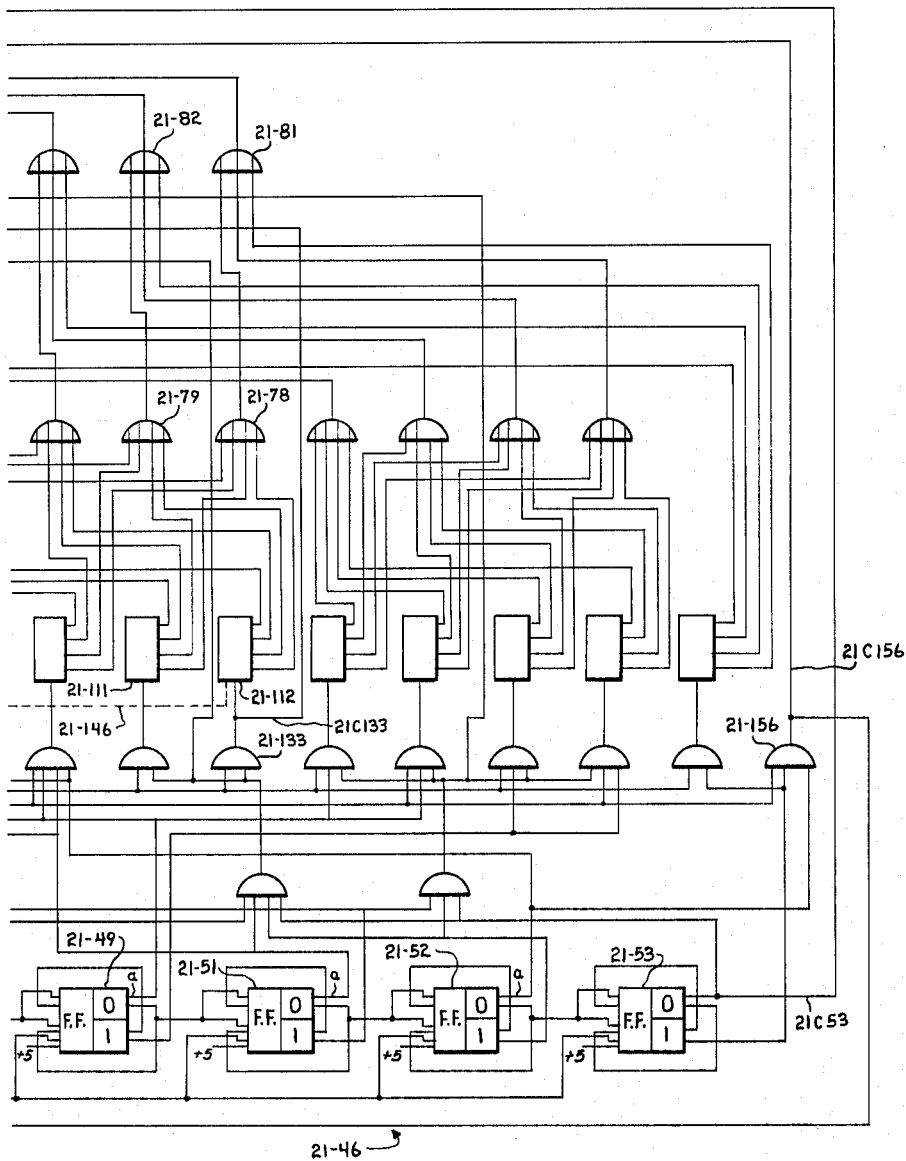

Thus it is seen that for the first timing pulse out of the Schmitt trigger, a negative going counter advance signal is fed from the "0" output of the single shot 21-42 to the pulse inputs 21-44a and 21-44b of the first flip-flop 21-44 of the counter 21-46. The negative counter advance signal is also provided on line 21C42 for a purpose which will become apparent. It should be noted at this point, that when the single shot resets to the stable state, the "0" output will be up and therefore the inputs 21-44a and 21-44b of the counter flip-flop 21-44 will both be up. Thus, depending upon the state of the flip-flop 21-44, one of the enable inputs 21-44c and 21-44d thereof will be up. This flip-flop will be changed in state (toggled) when the single shot 21-42 returns to the stable state after being triggered. It will be remembered, that a counter setting pulse on line 21C22, was derived from the feed OR gate 21-22 at the time of the feed signal produced by the gate and coupled to the feed solenoid driver. As shown in FIG. 21C and FIG. 21D, the line 21C22 is coupled to a set pulse input of each flip-flop of the counter, whereby the pulse sets all the flip-flops in the counter to the 1 state.

We have seen that as a consequence of the first pulse from the time track channel, flip-flop 21-44 is toggled by the return of the single shot 21-42 to the stable state. In turn, flip-flop 21-44 will toggle flip-flop 21-47 whenever the flip-flop changes from a 1 to a 0 state. Likewise flip-flop 21-47 toggles flip-flop 21-48 and so on down the line in the manner typical of the operation of counters well known in the art. It should be apparent that upon every return of the single shot 21-42 to the stable state, the counter 21-46 is advanced one. Moreover, the resetting of the last flip-flop 21-53 after the first bit provides a positive signal on the card data start line 21C53 coupled to the "0" output thereof.

*Character counting*

Recalling that each character of the film card can be represented by four bits in the excess three binary code, and the fact that there are four timing bits for every four information bits, it will be recognized that the first two flip-flops 21-44 and 21-47 of the counter perform the function of counting the bits in the character. Resolution of the count is made by the AND gates 21-54, 21-55, 21-56 and 21-57. The output of gate 21-54 represents the first bit, that from gate 21-55 represents the second bit, and so on. The importance of these bit sample outputs will be appreciated as the description proceeds.

At this point it should be recalled that in the embodiment of the invention described herein, the first eight characters on the film card are used for the purpose of detecting a filing error as cards are fed through the machine. Thus, in the embodiment of the invention being described, it is not until the ninth character is reached by the reading station that a character significant for any purpose other than error detection is considered by the machine. Considering the fact that the counter 21-46 is advanced by every "0" and "1" bit on the timing track, it will be apparent from a consideration of the inputs to the AND gate 21-58 that the output of the gate will come up at the beginning of the last bit designating the eighth character. The output of this gate provides the "error sample end" signal on line 21C58.

Recalling that the first two flip-flops of the counter count the bits representing a character, it can readily be recognized that the next five flip-flops of the counter count the characters as they are read. This can be appreciated when one considers that subsequent to the resetting of all counter flip-flops to the 0 state after the reading of the first bit, the flip-flop 21-48 will change state every fourth timing bit. Therefore, the condition of this flip-flop together with that of the remaining flip-flops 21-49 and following indicates which character has been read. The significance of the AND gate 21-58 is that, upon arrival of the ninth character of a film card at the reading station, the system will have been conditioned by the "error sample end" signal to terminate the error sampling and initiate sampling and comparison for other purposes such as the purge of cards and the printing of cards. The error sample end pulse from the AND gate 21-58 is provided as mentioned above, on the line 21C58, at the reading of the last bit of the eighth character on the film card.

Now returning to the timing generator single shot 21-42 operated by the time track Schmitt trigger 21-38, the sampler signal output thereof is up upon triggering of the single shot. This output is available on line 21C43. Referring again to FIG. 21A, the sampler signal is fed to the reset pulse input 21-62a of the flip-flop 21-62. Recalling that until the beginning of the reading of the last bit of the eighth character, the error sample end line 21C58 is down, and considering that this input is coupled to the enable input 21-62b of flip-flop 21-62, this flip-flop cannot be placed in the 0 state until the reading of the last bit of the eighth character. Accordingly, the rise of the card data start signal line 21C53 which occurs at the beginning of the first timing bit and impression of this at the set pulse input 21-62c of flip-flop 21-62 places this flip-flop in the 1 condition. Thus the "1" output 21-62e of the flip-flop is up.

Bearing in mind that the flip-flop 21-62 has been placed in the 1 state by the card data start pulse, the return of the timing single shot 21-42 of FIG. 21C to the stable state will produce a counter advance pulse on the line 21C42 which is coupled to the input 21-64a of the shift driver control AND gate 21-64. This together with the output of flip-flop 21-62 to the input 21-64d of the AND gate 21-64 produces an output therefrom to the shift input 21–66a of the shift register driver 21–66. The shift register driver 21–66 has a positive shift output 21–66m and a negative shift output 21–66L. These outputs are coupled to corresponding inputs of the 32 bit core shift register 21–67.

*Card data storage*

At this point, it will be well to refer to FIG. 29 which is a schematic diagram of a portion of the shift register. In order to store information representing the first eight characters of the first card fed from a capsule, in view of the fact that it requires four bits to represent each character, the shift register will require 32 cores in order to store the information. For purposes of simplicity of drawing, only three cores are shown in the schematic. The negative data input terminal is designated 21–67a and is maintained at 5 volts below ground. The positive data input terminal is designated 21–67b. The positive shift input is 21–67c and the negative shift input is 21–67d. Terminal 21–67e is connected to a source 5 volts below ground, and is common to each core. The current output terminal is 21–67f. The operation of the shift register is essentially the same as that of those well known to those skilled in the art.

FIG. 30 shows the shift register driver 21–66. The various input levels applied to the various points in the circuit are indicated on the drawing. The shift pulse input terminal is 21–66a. The shift enable input is 21–66b, the clear pulse input is 21–66c and the clear level input is 21–66d. The two diodes 21–66e and 21–66f may be identical. To indicate the respective differences between the inputs to these diodes from the trigger inputs and from the clear inputs, resistance 21–66g may be of a value such as 4.7K ohms while resistance 21–66h may be of a value of 6.8K ohms. Capacitance 21–66j may be of a value of 500 microfarads and capacitor 21–66k may be of a value of 0.022 microfarad. The negative shift output terminal is designated 21–66L and the positive shift output terminal is designated 21–66m. A test output 21–66n is also provided. The purpose of the driver is simply to shift the register along as pulses are received from the AND gate 21–64, of FIG. 21, and so a detailed description is believed unnecessary.

The information input to the shift register 21–67 is obtained in the following manner. As the timing track photocell and amplifier produce timing pulses derived from the timing track of the film card, the identification track photocell and amplifier 20–41, shown in FIG. 21A, produce pulses representative of the data obtained from the identification track of the film card. This data is fed to the Schmitt trigger 20–49 for information reshaping. The output of the Schmitt trigger takes two paths. The first of these is to the input 21–68a of the AND gate 21–68. The second will be discussed hereinafter.

Referring to the AND gate 21–68, another input 21–68b thereof is received from the output 21–36b of the flip-flop 21–36. It may be recalled that the release of the start button places the set pulse input 21–36a of the flip-flop 21–36 in the up condition. Therefore, both the inputs to the AND gate 21–68 are up when the identification data from the first card is being read and thus the AND gate produces a positive output to input 21–71a of the shift register input single shot 21–71. In view of the pulse nature of the information from the information track, AND gate 21–68 is satisfied to cause the input to be up whenever there is a positive pulse produced by the Schmitt trigger 20–49, so long as flip-flop 21–36 remains in the set condition.

It should be noted at this point that line 21–201 connects the "0" output of flip-flop 21–37 to the reset enable input of flip-flop 21–36. The pulse reset input to flip-flop 21–36 is connected to line 21C76. In addition to this line coming up during the reading of the ninth character, it will also come up for a short period while the counter is advancing from the set to the first count state.

Because flip-flop 21–37 is set by a start line signal, the "0" output of flip-flop 21–37 and also the reset enable input of flip-flop 21–36 will be down. This enable input will remain down until after information has started to enter the shift register. Thus the resetting of flip-flop 31–36 is delayed until the reading of the ninth character.

Recalling that the sampler pulse from the timing track single shot 21–42 causes line 21C43 to be up when the single shot 21–42 is triggered, coincidence of this pulse fed to the pulse input 21–71b of the shift register single shot, with an up condition at the enable input 21–71a thereof, will trigger the single shot to produce an up condition at the output 21–71c. This is fed through the emitter follower 21–72 and diode 21–73 to the information input 21–67b of the shift register. Thus, it is seen that the timing track signal is effective to permit entry of identification track information into the shift register upon triggering of the timing track single shot 21–42. Then, upon resetting of the single shot 21–42, the counter advance pulse on line 21C42 satisfies AND gate 21–64 to activate the shift register driver and shift the register. Consequently, as the timing track and identification track are read, the bit information on the identification track representing the first eight characters is fed into the shift register.

It will be well to remember at this point that we are still discussing the reading of information from the first card fed from the feed station. At this point it should be mentioned that the information now stored in the shift register will be retained in the register until the next card is fed. It is during the reading of the next card that the information stored in the shift register from the first card is useful to determine whether or not the next card has been misfiled. Subsequently herein, the error comparison function will be discussed as well as the return of the information to the shift register as it is being read out.

*Generation of data representing keyed-in-characters to select a card for printing*

It is now pertinent to discuss the operations which take place upon the reading of the first timing bit corresponding to the first information bit for the ninth character on the film card. This action includes cessation of the feeding of the information into the shift register and cessation of the shifting of the register.

Assume that it is desired to print a copy of the film card bearing a policy having the last two characters 1 and 2, or in combination, 12. These will appear in the ninth and tenth character positions on the film card. It will be recalled that the first eight characters of each card in a capsule are the same, they being common to each of the policies in a capsule. It is the last two characters of the policy number and of each policy of the group in the capsule which distinguish one from the other. Thus, the printing of the card having the policy with the last two characters being 12 will take place after the feeding of all cards ahead of this one in the capsule. In order to facilitate the description of the invention, it will be assumed that it is desired to print the first card from the capsule. The ninth and tenth characters of this card would likely be 0 and 1, respectively. Similarly, if each card contains a different policy, the second card would bear the ninth and tenth characters 0 and 2, respectively Now we will consider the printing of the first card.

On the control panel of the machine, the character switch button for the ninth character and bearing the character 0 would be depressed. In the button group for the tenth character, the button designated by 1 would be depressed. When the timing track photocell and amplifier 20–39 produces a pulse in response to the reading of the timing bit corresponding to the first character identification bit of the ninth character, the timing track single shot 20–42 is triggered. Upon reset thereof, or a return to a stable state, the counter 21-46 is advanced, whereupon the combination of conditions of flip-flops 21-44 and 21-47 represents that of the first bit of the ninth character about to be or being read, and the combination of the remaining counter flip-flops indicates that the ninth character is being or about to be read. At this time, the output 21-48a of flip-flop 21-48 is up. Similarly, output 21-49a of flip-flop 21-49 is up, output 21-51a of flip-flop 21-51 is up, and output 21-52b of flip-flop 21-52 is up. Accordingly, all of the inputs to AND gate 21-76 are up, and they will remain up during the reading of the four timing and information bits corresponding to the ninth character. Thus the output 21-76a of AND gate 21-76 will remain up during the reading of the entire ninth character. Thus, the input terminal of the character switch group 21-77 will be up during the reading of the ninth character.

Referring to FIG. 23 along with FIG. 21C, this means that with the character 0 button depressed the outputs 23-10 and 23-11 will be up whereas the output 23-12 and 23-13 will be open circuited, thus producing the same effect as an output line that is down. Accordingly, during the reading of the ninth character, an output from the character switch group 21-77 over the four output lines is available which represents the number designated by the switch button pushed, in this case the character 0.

The outputs from terminals 23-10 and 23-11 of the group 21-77 are coupled through OR gates 21-78 and 21-79, respectively, the outputs of which are coupled in turn through the OR gates 21-81 and 21-82, respectively. The outputs of the OR gates 21-81 and 21-82 are coupled in turn to input to AND gates 21-83 and 21-84, respectively. It will be observed, therefore, that the bit sample output of the AND gate 21-56 is coupled to a bit sample input terminal of the AND gate 21-84. Similarly, the bit sample output of the AND gate 21-57 is coupled to the bit sample input terminal of the AND gate 21-83.

Bearing in mind the fact that the inputs to AND gates 21-83 and 21-84 derived from the character switch group 21-77, remain up during the reading of the ninth character, these AND gates will produce outputs when their bit sample inputs are up. Thus, when the third timing bit for the ninth character is read by the time track photocell, AND gate 21-84 produces an output through OR gate 21-86 to the line 21C86. Similarly, when the fourth timing bit for the ninth character is being read, an output is produced from the AND gate 21-83 through the OR gate 21-86 to the line 21C86. It is in this manner that the keyed-in identification data stored in the character switches is sampled during the reading of the film card. Thus, the data representing the character switch data is available on the generated switch data line 21C86 for comparison with identifying data simultaneously obtained by the reading of the identifying data track of the film card. To express it simply, the timing signal generator circuitry, the counter, the character switches, and the associated decoding gates effectively convert the parallel information stored in the character switch on the control panel to the serial information output for comparison with information being read from the information track of a film card.

It should be observed, at this point, that when the output of the AND gate 21-76 coupled to the ninth character switch group 21-77, is up, an output is produced over the "ninth character read" line 21C76. Referring to FIG. 21A this line is coupled to the pulse input 21-36c of the register input control flip-flop 21-36. This pulse then resets flip-flop 21-36 to the 0 state whereby its "1" output line goes down to block AND gate 21-68 and thereby prevent further information from going into the shift register.

It should also be recalled with reference to both FIGS. 21D and 21C, that at the end of the reading of the fourth bit of the eighths character, AND gate 21-58 produces an "error sample end" output over line 21C58 indicating the end of the error sampling phase. This output coupled to the enable input 21-62b of the flip-flop 21-62 whereby the next sampler input from line 21C43 resets the flip-flop to the 0 state. Thus its "1" output goes down whereby further counter advance pulses from the timing track single shot 21-42 will be ineffective at the AND gate 21-64 to produce an output to the shift register driver. Thus at the end of the eighth character, neither is information fed into the shift register nor is the shift register driver triggered.

*Data comparison to select the card to be printed*

Flip-flop 21-36 is reset to the 0 state by the rise of the line 21C76 indicating the beginning of the ninth card character. Its "0" output is up, this output being coupled to the AND gate 21-89. The other input to AND gate 21-89, being coupled to the sampler pulse line 21C43, is up whenever the timing track single shot is triggered. Therefore, at this time, the AND gate produces an output which is coupled through emitter follower 21-91 to the pulse input 21-92a of the print and error compare flip-flop 21-92. To enable this input to set the flip-flop, the input terminal 21-92b must be up. It should be pointed out at this time, that flip-flop 21-92 will be in the 0 state at the time of arrival of a pulse at terminal 21-92a. The reason for this, is the fact that the card identification data start pulse on line 21C53 and obtained from the last flip-flop of the counter at the first timing bit was applied to the reset pulse input 21-92c of the flip-flop 21-92. This pulse would thus have placed the flip-flop in the 0 state, whereby upon the "0" output 21-92h is up.

It should also be pointed out at this point, that whenever the "0" output is up, the effect on the subsequent circuitry is to indicate that a comparison has been made between data read from the card or read out of the shift register and data stored in the machine by the character switches, and that the comparison showed equivalence of data from the two sources. Thus, it is the purpose of the enable inputs 21-92b and 21-92 to permit the changing of the state of flip-flop 21-92 from the 0 state to the 1 state by a pulse input from the emitter follower 21-91, only when a comparison between the character switch or shift register data and the read data from the film card results in a difference between the data from the two sources.

It will now be shown how both these enable inputs are prevented from coming up, whenever comparison reveals an equal condition.

It will be observed, that the serial information representing the condition of the panel character switches is fed on line 21C86 to an input of the OR gate 21-93. The output of the OR gate 21-93 is fed through an inverter 21-94 to an input of the comparing AND gate 21-95. It is fed also, but directly, to an input of the AND gate 21-96. The serial card data from the identification track is fed from the Schmitt trigger 20-49 directly to the other input of AND gate 21-95, and through the inverter 21-97 to the other input of the comparing AND gate 21-96. Neither of the AND gates 21-95 and 21-96, of course, will produce an output unless both of its inputs are up.

Both inputs to an AND gate can be up only when the generated switch data on line 21C86 and the card identifying data from the Schmitt trigger 20-49 simultaneously are different. For example, assuming that the first bit of the ninth keyed-in character is a binary 0, and accordingly, the switch date input to inverter 21-94 and to AND gate 21-96 is a binary 0, no output will be possible from the AND gate 21-96. However by virtue of the inversion of inverter 21-94, the effect at the AND gate 21-95 input therefrom will be that of a binary 1. Assume further that the information input from the first bit read is a binary 0. Read data input to the AND gate 21-95 is a binary 0 thus precluding any output from the AND gate 21-95. Therefore, if the outputs from the card identifying data track and the character switch do compare at any one instant, no output from either AND gate 21–96 or 21–95 will be available. Thus there is no enable input to the set side of the flip-flop 21–92, thereby precluding the setting of the flip-flop to the 1 state. Therefore the flip-flop will remain in the 0 state until such time as there is a difference between the card data track output and the switch data output. As employed in the logic, flip-flop may be said to recognize a difference.

*Activation of a reproduce station to remove card from transport*

Assume that no difference information is obtained from the ninth and tenth characters read from the identifying track of the film card, the print compare flip-flop 21–92 will be in the 0 state at the end of the reading of the tenth character. The "0" output thereof is coupled to the set enable input 21–97a of the print flip-flop 21–97. Thus, this enable input will be up at the end of the reading of the tenth character if no difference was discovered.

At this point mention should be made of the mode switch contacts. For all three of the mode switches the contacts are shown in their inactivated position. The mode switch buttons are mechanically interlocked in conventional manner whereby the pressing of one mode switch button releases all other mode switch buttons. Mode 1 switch includes a pair of movable contacts 3–17a and 3–17b. These contacts are interconnected mechanically as indicated by the dotted line 3–17c. The contacts are shown in their normal condition, that is, with the button released. Mode 2 switch includes the movable contacts 3–18a and 3–18b mechanically interconnected as by the line 3–18c. Mode 3 switch includes the movable contact 3–19a.

The pressing of the button 3–17 on the control panel to activate the mode 1 switch will cause the system to print copies upon detection of equivalence between the ninth and tenth characters of the card and the ninth and tenth characters stored in the machine by the keying of the selected panel button in each of the ninth and tenth character groups. Pressing of the mode 2 switch button 3–18, which will of course release both the mode 1 and the mode 3 switch groups if either of them is previously actuated, will provide for printing based on a detection of equivalence of the last five characters of the film card with the last five characters stored in the machine by pressing the desired buttons in each of the last five character switch button groups. Pressing of the mode 3 switch will preclude printing in the operation of the machine.

By tracing through the drawing, it will be apparent that pressing mode 1 switch button, couples an input line 21C100 from the counter to the set pulse input 21–97b of the print flip-flop 21–97. This input line is up during the reading of the eleventh and twelfth characters in a manner similar to that in which the line 21C76 is up during the reading of the ninth character. This 11th and 12th character line is brought up by the counter when the counter indicates that the character being read is the eleventh character. The fact that this line is up and that the print flip-flop 21–97 is thus placed in the 1 state at the beginning of the eleventh character produces a "1" output signal from the flip-flop at 21–97c which is coupled to the print lamp driver 21–101 to illustrate the print lamp 3–22 on the control panel.

The placing of the print flip-flop in the 1 state, causes the "0" output 21–97d thereof to be down. This output is coupled through the OR gate 21–102 to produce an output from the emitter follower 21–103 to drive the print ramp driver 21–104. The print ramp driver accordingly energizes the print ramp solenoid 11–16 of FIG. 11 to depress the ramp at the print (reproducing) station to intercept the card as it moves along the conveyor.

It should be mentioned at this point, that the OR gate 21–102, would not provide the negative output to drive the print ramp driver 21–104 unless the other two inputs thereto are down. One of these inputs is derived from the "1" output of the feed flip-flop 21–23. Recall that this flip-flop is reset to the zero state by the first time signal on line 21C38 from the time track photocell. Its "1" output is, therefore, down when the print flip-flop 21–97 is set by the rise of the 11th–12th character line 21C100. The third input to the OR gate 21–102 is derived by way of inverter 21–106 from OR gate 21–41.

It will be observed by reference to FIG. 31, which shows an inverter used throughout this logic, including inverter 21–106, that the output of an inverter such as inverter 21–106 is down except when a negative pulse is applied to the input thereof. Referring to FIG. 31, input terminal 31–11 is coupled to the base of transistor 31–12, which is normally nonconducting. With the application of the potentials as indicated to the other terminals, the output terminal 31–13 will normally be clamped to 5 volts below ground. Upon occurrence of a negative input signal at terminal 31–11, transistor 31–12 is turned on whereupon the output terminal 31–13 is brought up to 5 volts above ground.

From the foregoing it should be apparent that whenever a positive time pulse is coupled into the OR gate 21–41 from line 21C38, it will in effect, be inverted in inverter 21–106. Subsequent to a positive time pulse input to OR gate 21–41, the output of the gate will remain positive by virtue of its being fed back through print switch contacts 11–66a to one of the inputs to the gate. Therefore, until the print switch is actuated, the third input to the OR gate 21–102 will be down. Thus, the setting of the print flip-flop will actuate the print ramp driver.

It is fall of the output of the OR gate 21–41 which can terminate the driving of the print ramp driver. This OR gate is caused to fall and remain down as follows. It will be recalled, that upon entry of a card into the carriage of the print station, the leading edge of the card engages a movable arm of the print or scan start switch 11–66 of FIG. 13. A movable contact of this switch 11–66a is shown in the deactivated condition in FIG. 21B. In this condition it is coupled between the input of the inverter 21–106 and an input of the OR gate 21–41. When the card energizes or activates the switch, its movable contact 11–66a connects a point 5 volts below ground to an input of OR gate 21–41. As already discussed, the "0" output of the print flip-flop, coupled to another input of the OR gate 21–41 is negative. With the card in the print station no card is being read by the reading station and the outputs of the reading station amplifiers will be negative. Therefore, the third input of the OR gate 21–41, derived from line 21C38, will be down. Accordingly, activation of the print switch by the card entering the station, causes the output of OR gate 21–41 to go down. This output is coupled to the inverter 21–106 whereby the output thereof goes up. This output, being coupled to the print ramp OR gate 21–102 causes the output of the OR gate 21–102 to go up whereupon the print ramp driver 21–104 is deenergized. Accordingly, arrival of the film card in the carriage of the reproducing station, thus activating the print switch, is effective to raise the ramp of the station. After the action of the switch, the output of OR gate 21–41 will remain until either the print flip-flops 21–97 or timing track Schmitt trigger 21–38 applies a positive input to the gate.

The above discussion has revealed the coincidence of conditions which causes the fall of the output of OR gate 21–41. In addition to releasing the print ramp as discussed above, the fall of this output activates print relay driver 21–98 to energize the print relay 21–99. This initiates the print cycle, which will be discussed hereinafter with reference to FIG. 22.

It may be mentioned at this point that the reason for the connection of the timing track Schmitt trigger output to OR gate 21–41 is that this connection insures that the gate output will go positive on the turning on of the power to the machine. When the power is first turned on, time is required for the read lamp to illuminate, during this time the read amplifiers will have positive outputs. At the same time, the OR gate output will go positive and remain positive until all of the inputs are negative. This setting of the OR gate output is necessary because the output of the gate is used to inhibit the action of the start button whenever a card is being reproduced and the start button is accidentally or mistakenly pushed. The output of OR gate 21–41 is connected to the level input 21–23a of the feed flip-flop 21–23.

The purging function

The manner in which a card is caused to enter the reproducing station for printing has been briefly alluded to. Before describing the detailed operation of the printing cycle, in view of the fact that the reading of the eleventh and following characters has not yet been discussed, the effect and purpose of reading these characters will now be considered. It will be recalled, that it was mentioned that among other functions of this system is that of keeping the file current. In other words, provision is made whereby out dated documents and the film cards bearing same can be eliminated from the file. This function is referred to in discussing the machine as the purging function. It is achieved by the use of a two character date code. The two characters are assigned to the eleventh and twelfth character positions of the film card. In the embodiment of the machine described, the first of the two digits represents a two month period within a year, and the second of the digits represents a year. As applied to an insurance policy filing system, the twelfth character is the last digit of the year of expiration of the policy. For example, if the policy expired in 1959, the twelfth character would be a 9. If the policy expired in 1958, the character would be an 8. If the policy expired in 1961, the twelfth character would be a 1.

Similarly, the eleventh character is assigned a code number which represents a two month period within a year. In this manner, ten or less characters can be employed to represent the expiration dates occurring within the twelve months of a year. For example, character 1 would represent the January-February period. Character 6 would represent November and December. Consequently, where the eleventh and twelfth characters were 6 and 0 respectively, the expiration date of the policy would occur within the two month period of December and November, 1960.

In order to make the optimum use of a two character date code, the purging system according to the typical embodiment of the invention is to purge two month periods of the current year on a "less than" basis, and to purge all cards whose year character is one less than the current year digit, and also to purge all cards whose year character is two less than the current year digit.

Referring to FIG. 21D, it will be observed that character switch groups 21–111 and 21–112 are provided for the eleventh and twelfth character positions on the control panel. These two character switch groups are, of course, used to designate the purge year and the two month period within the purge year, prior to which documents or policies have expired. The character switch groups are sampled in the same manner as was described with reference to the group 21–77 for the ninth character. The switch data outputs therefrom are available likewise on the generated switch data line 21C86.

It will be observed also from FIG. 21C that a group 21–113 of purge year switches is provided. This group has inputs from the bit sample outputs of the counter, and provides outputs through the OR gates 21–114 and 21–116 which represent the purge year minus one and the purge year minus two respectively. A schematic of the purge year switch appears in FIG. 36.

Referring to FIG. 36, the organization of the purge year switch 21–113 of FIG. 21C is shown. Four inputs to the switch from the bit simple lines of the counter are provided. Input 36–11 is provided for coupling to the AND gate 21–54 of FIG. 21C, input 36–12 is provided for coupling to the AND gate 21–55, input 36–13 is provided for coupling to the AND gate 21–56 and input 36–14 is provided for coupling to the AND gate 21–57. As mentioned briefly above, this purge switch is coupled mechanically to the character switches for the twelfth character position, as indicated schematically in FIGS. 21C and 21D by the dotted line 21–146.

In FIG. 36, it will be observed that on the righthand side is a listing of numbers from zero through nine and aligned with each of these laterally is a group of switch contacts. Each switch contact of a group corresponding to specific numbers should be understood to be mechanically connected with the contacts operated by the correspondingly numbered button in the twelfth character switch group. For example, referring to FIG. 23 along with FIG. 36, the contacts 23–16 and 23–17 of the twelfth character switch are mechanically connected to the contacts 36–21 and 36–22 of the purge swtich. Therefore, when the character 5 button for the twelfth character switch is pushed, in addition to opening he contacts 23–16 and 23–17, the pressing of the button also opens the contacts 36–21 and 36–22 of the purge switch.

It will be observed that there are eight output lines from the purge switch. The organization of the contacts and conductors in the switch is such that the output lines 36–23, 36–24, 36–25 and 36–26 present in the excess three binary code a number which is one less than the character of the button which is depressed in the twelfth character switch group. For example, if the character 5 button in the twelfth character switch group is depressed, the binary output at the aforementioned four outputs will represent four. Therefore, if the number of the depressed button in the twelfth character switch group represents a purge year, the number at these four outputs will represent the year prior thereto or the purge year minus one.

In a fashion similar to the above four additional outputs 36–27 through 36–30 are provided to produce a number in the excess three binary code which is two less than that of the depressed button. This number represents the second year prior to the purge year or the purge year minus two.

From the foregoing, it should be apparent that the sequence of bit sample pulses applied to the inputs of the purge year switch will provide simultaneously two sets of output signals from the switch. The first set at the OR gate 21–114 produces an output representing the purge year minus one. The second set, coupled through the OR gate 21–116 provides a sequential data output therefrom representing the purge year minus two. Both of these generated purge year data outputs are then compared simultaneously with the purge year output obtained by the reading station from the twelfth character of the film card. This comparison will be described presently.

Data comparison for purging on the month code

In this example, the eleventh character represents a two month period in the purge year, prior to which all cards are to be purged. During the reading of the eleventh character by the reading station, the read data output from the identifying data track, are gated with the generated switch data output from the decoding gates of the counter and eleventh character switch in the manner previously described with reference to the reading and comparison of the ninth character.

It will be recalled that the first bit for each character represents $2^3$, the second bit represents $2^2$, the third bit represents $2^1$ and the fourth bit represents $2^0$. Referring to the coupling between the read data track and the AND gate 21–95, and the coupling of the generated switch data input through inverter 21–94 to the AND gate 21–95, it will be observed that whenever the bit information from the identifying data track represents a binary 1, the switch data represents a binary 0, the AND gate will produce an output. When the most significant bits are read first, if a binary 1 output, for example, is obtained for the first bit from the data track and a binary 0 from the switch data input, this indicates that the information on the card for the given character is greater than the switch information. In other words, considering the eleventh character, the AND gate 21–95 will provide an output whenever the eleventh character on the film card bears a month code which is more recent than the month code character which was keyed into the control panel by pressing the appropriate character switch button for the eleventh character. For this reason, AND gate 21–95 is referred to as the "greater than" AND gate.

Because of the oppositely arranged connection for the inputs to the AND gate 21–96, it will produce an output whenever the information from the card represents a character less than the corresponding character keyed into the machine. Therefore, AND gate 21–96 is referred to as the "less than" gate. Obviously, during the reading of the eleventh character, it is undesirable to set up the purge station to remove any card which shows other than a less than output from the AND gates 21–95 and 91–96. This is provided for in two ways.

If the greater than AND gate 21–95 produces an output, the output thereof is coupled over the line 21–119 to the set enable input 21–121a of the greater than flip-flop 21–121. Consider that the register input control flip-flop 21–36 is in the "0" state as the result of triggering by the ninth character pulse from line 21C76 upon the reading of the ninth card character. Its "0" output to AND gate 21–89 is, therefore, up. The arrival of a sampler signal at AND gate 21–89 from line 21C43 upon triggering of the timing track single shot will produce an output from the AND gate 21–89 which is coupled through the emitter follower 21–122 and over the line 21–123 to the set pulse input 21–121b of the "greater than" flip-flop 21–121. This flip-flop is thus placed in the 1 condition whereupon the "0" output 21–121c thereof is down. This output is coupled to the AND gate 21–124. Consequently AND gate 21–124 cannot be satisfied when the "greater than" flip-flop is in the 1 state.

By virtue of the coupling of AND gate 21–124 to the set enable input 21–126a of the "less than" flip-flop 21–126, this flip-flop cannot be set by a trigger pulse input to the set pulse input 21–126b when the "greater than" flip-flop is in the 1 state. Accordingly, there being an AND gate 21–127 coupled to the "1" output 21–126c of the "less than" flip-flop, the output of the AND gate 21–127 will be down.

The inputs to OR gate 21–128, other than that from AND gate 21–127, and representing the purge year minus one compare and the purge year minus two compare, will both be down at this time. Therefore, the output of the OR gate 21–128 will be down so that the input from this source to the AND gate 21–129 will be down. Therefore, no purge enable output from the AND gate 21–129 will be available to the set enable input of the purge station control flip-flop 21–139, if the reading of the information track of the eleventh character indicates a character thereon having a greater value than the character keyed into the control panel for the eleventh character.

Upon the appearance of information from the information track indicating that the character being read is less than the character keyed in for the eleventh character position, the AND gate 21–96 will produce an output signal. Thus the input to the AND gate 21–124 from the AND gate 21–96 will be up. The "greater than" flip-flop 21–121 will be in the 0 state as established by the input signal over the line 21–132 from the 11th–12th character line 21C100, and coupled to the reset pulse input 21–121d of the flip-flop. This signal appeared on the reading of the first bit for the eleventh character. As discussed previously the first timing bit of the eleventh character, by advancing the counter of FIGS. 21C and 21D produces a pulse or a rise of the line 21C100. Thus it is seen, that both inputs to the AND gate 21–124 are up and accordingly the set enable input 21–126a of the "less than" flip-flop is up.

The next information compare sample signal to the set pulse input thereof will set the flip-flop to the 1 condition whereby one input of the AND gate 21–127 is brought up. This flip-flop 21–126 will therefore remain up, or in the set state, until it is reset by the eleventh character pulse over line 21C100 during processing of the next card to be read.

The maintenance of the set state of flip-flop 21–126 is the case even though the reset pulse input 21–126d thereof remains up during the reading of the eleventh and twelfth characters. This is true because input to the reset pulse gate of the flip-flop does not again rise to pulse the flip-flop until the beginning of the reading of the eleventh character of the next card. Therefore, even though the fact that the output of AND gate 21–96 being up enables the input 21–92b of the compare flip-flop 21–92, whereby a subsequent pulse to the input 21–92a thereof will cause a setting of the flip-flop, with the associated fall of the "0" output thereof coupled to one input of AND gate 21–127, the other input to this gate will remain up long enough for the subsequent resetting of flip-flop 21–92 to return the first input to the AND gate 21–127 to the up condition. Resetting of the flip-flop 21–92 will occur upon the reading of the twelfth information character.

This resetting is accomplished as follows. Referring to FIG. 21D, a line 21C133 is coupled to the output of the counter decoding AND gate 21–133, whose output is, of course, coupled to the input to the twelfth character switch group 21–112. This line comes up upon the reading of the first bit of timing information for the twelfth character, by virtue of the advance of the counter at this time. This 12th character signal line 21C133 coupled through the mode 2 switch contacts 3–18a and the line 3A18 therefrom to the reset pulse input 21–92f of the compare flip-flop 21–92. It should be observed at this time, that the 12th character signal line 21C133 is coupled also to the reset pulse inputs 21–137a of the purge year minus one compare flip-flop 21–137 and to the reset pulse input 21–138a of the purge year minus two flip-flop 21–138. It is also coupled to the set pulse input 21–121e of the "greater than" flip-flop 21–121. Thus, the reading of the first bit of information from the timing track for the twelfth character will set the "greater than" flip-flop to its 1 state.

Having established that, upon the initial reading of the twelfth character, both inputs to the purge compare AND gate 21–127 will be up, the output of the OR gate 21–128 and coupled to AND gate 21–129 will be up. Assuming that no error was detected, and of course there would be none in the handling of the first card which we are still discussing, the input 21–129b to the AND gate 21–129 derived from the error station control flip-flop 21–172 would be up. Similarly the input from the OR gate 21–128 would be up whereby the output of the AND gate would be up. This output is coupled to the enable input 21–139a of the purge station control flip-flop 21–139.

The purge ramp driver 21–141 is like the print ramp driver 21–104, previously described. It is energized to energize the purge ramp solenoid, such as 15–34 in FIG. 15, for the purge station upon arrival at the input of the driver. This pulse is derived from the purge ramp OR gate 21–142 when both the inputs thereof are down. The input coupled to the "0" output of the purge station control flip-flop 21–139 is down whenever the flip-flop is set. Therefore, arrival of a positive pulse at the set pulse input 21–139c of the purge flip-flop will set the flip-flop. The other input to the OR gate 21–142 is derived from the "1" output of the feed flip-flop 21–23. This output is down whenever the feed flip-flop is in the don't feed condition. This is, of course, the condition in which the feed flip-flop is left after the feeding of the first card.

Thus it is seen that the arrival of a positive pulse at the set pulse input 21–139c of the purge station control flip-flop will cause the purge ramp to descend and intercept the card having an eleventh character which is less than the keyed-in character for the eleventh character position.

It should be noted, however, that if flip-flop 21–92 is set to a 1 state indicating that the twelfth character read and the twelfth character stored in the machine differ, the output of AND gate 21–127 will go negative and will not generate a purge condition.

The positive pulse to the purge flip-flop input 21–139c occurs at the beginning of the reading of the thirteenth character. Its origin may be traced by way of the mode switch group through the contacts 3–19a of the mode 3 switch in their condition shown in the drawing, and through the contacts 3–17a of the mode 1 switch button 3–17 in the depressed position (not as shown in the drawing), to the 13th through 16th character signal line 21C143. In the manner similar to that described for the character signal lines to junction 21C100 and 21C133, this line 21C143 rises at the reading of the first timing bit for the thirteenth character and falls at the end of the last timing bit for the sixteenth character. Thus, at the reading of the first timing bit for the thirteenth character the purge ramp descends. Thus the card having the two-month period code character indicating that it has expired, and a twelfth character equal to the keyed-in twelfth character, is removed from the file at the purge station.

At this point it should be noted that the purge year minus one and purge year minus two flip-flops have their "0" outputs coupled to the OR gate 21–128. Therefore, assuming that the input from the "no error" line 21A172 to AND gate 21–129 is up, the AND gate 21–129 will provide a purge enable output whenever either of the two purge year flip-flops is in the 0 state or reset. In view of the fact that these two flip-flops are reset by virtue of the rise of the 12th character line 21C133, the first timing bit for the twelfth character will reset both of the flip-flops. Therefore, in order to avoid the purging of every card as the result of the rise of this line on the reading at the twelfth character, it is necessary that the reading of those cards which are not to be purged be effective to again set the two flip-flops before the rise of line 21C143 at the beginning of the thirteenth character. The manner in which this is accomplished will be discussed at this point.

Referring to FIG. 21C, it will be observed that the purge year switch 21–113 and the twelfth character switch group 21–112 for the twelfth character, are mechanically interconnected as indicated by the dotted line 21–146. The nature of this combination of switches has already been discussed. It will therefore be evident that the output from the OR gate 21–114 coupled to the purge year minus 1 group of outputs, provided in response to the bit sample inputs thereto, is a binary code representing a decimal number one less than the character keyed in by pressing the appropriate twelfth character switch button in the group 21–112. For example if the character keyed in is 9, the output of OR gate 21–114 and available on the "purge year minus one data" line 21C114 is a binary representation of the decimal number 8. Similarly, the output of the OR gate 21–116 on the "purge year minus two" line 21C116 would be a serial binary code representing the decimal number 7, or two years back of the number keyed into the character switch group 21–112.

In the embodiment of the invention shown and described herein, all cards bearing a twelfth character one year or two years prior to the year keyed in, will be purged. Therefore, both the purge year minus two and the purge year minus one data generated by the logic and available on lines 21C114 and 21C116 respectively, is compared with the data read by the identifying data track photo cell and amplifier. Purging on the two year basis promotes simplicity of the logic. It requires that for the file to be kept current by the machine, there be no cards in the file older than two years back of the date keyed in.

*Data comparison for purging on the year code*

The information comparisons are made in the same manner as the comparisons of the switch information and the read information for determining whether or not a card should be printed. For example, the purge year minus one comparison group includes AND gates 21–147 and 21–148. One input to the gate 21–147 is obtained directly from line 21C114. The other input thereto is obtained through the inverter 21–97 from the read identifying data track output. The data input to gate 21–148 is obtained directly from the output of the read identifying data track. The generated purge year minus one data is obtained through the inverter 21–149 from the line 21C144.

If the output of one or the other of the AND gates 21–147 and 21–148 is up, it indicates that the card has a date thereon which is not one year back of the date keyed into the control panel. Therefore, it is desired that this card not be purged unless it has a date thereon which is two years back of the date keyed in. Accordingly, assume that it is the output of the AND gate 21–148 which is up. This is coupled to the set enable input 21–137b of the purge year minus one compare flip-flop 21–137, whereupon the next information compare sample on line 21–123 at the set pulse input 21–137c will set the flip-flop to the 1 state. Thereupon the "0" output falls and being coupled to the OR gate 21–128 does not provide an input to the AND gate 21–129 which would enable purge station control flip-flop 21–139. If it had been the output of the AND gate 21–147 which had been up, the effect would have been the same in view of the fact that its output is coupled to the set enable input 21–137e of the purge year minus one flip-flop 21–137.

At the same time that the comparison for the purge year minus one character is taking place, a comparison is being made for a purge year minus two character on the information track in the twelfth character position. This comparison is made in the same way as that for the purge year minus one by virtue of the couplings of the purge year minus two input from line 21C116 through the inverter 21–151 to the AND gate 21–152, and directly from the line 21C116 to the AND gate 21–153. The data input from the card track is coupled directly to the AND gate 21–152 and through the inverter 21–97 to the AND gate 21–153. If the data read from the card track for the twelfth character does not compare with the purge year minus two code, the output of one or the other of the AND gates 21–152 and 21–153 will be up to enable the setting of the purge year minus two flip-flop 21–138. The next information compare sample input to the corresponding trigger set pulse input of the flip-flop will place the flip-flop in the 1 condition. Thereupon the "0" output thereof will go down and, being coupled to the OR gate 21–128 which is coupled in turn to the AND gate 21–129, will not provide a purge flip-flop enabling output therefrom.

To briefly summarize at this point, if a card bears a code for the eleventh character which is not less than the character keyed in the eleventh character position, or if the eleventh read character is less but the twelfth read character differs from the twelfth keyed in character, and if along with either of these conditions on the card the twelfth character is not one year or two years prior to the year keyed into the twelfth character position, the output of the AND gate 21–129 is down to disenable the setting purge station control flip-flop at the time of the set pulse input thereto which occurs at the beginning of the thirteenth character. Consequently, such a card will not be purged from the system at the purge station. On the other hand, if the card did contain a month code which indicated a month less than the keyed-in two-month period, it would be purged by virtue of the reading of the eleventh character provided the twelfth character read from the card did agree with the character keyed into the twelfth-character position. If a card contained a twelfth character which was either one year or two years prior to the year keyed into the twelfth character position of the control panel, the card would be purged. The manner of doing this will now be described.

Assume that the card bears a twelfth character which is one year prior to the keyed in year. The comparison by way of the AND gates 21–147 and 21–148, would result in the outputs of both gates being down. Therefore, the purge year minus one flip-flop 21–137 would be disenabled for setting and therefore could not be set by subsequent info compare sample pulses from lines 21–123 at the set pulse inputs thereof. Therefore the "0" output thereof would remain up. This output is coupled to the OR gate 21–128 and to the AND gate input 21–129. The "no error" input to AND gate 21–129 being up would result in an output from this AND gate to the set enable input of the purge station control flip-flop 21–139. Accordingly, the rise of the 13th–16th character line 21C143 at the beginning of the reading of the thirteenth character, would set the purge station control flip-flop and consequently energize the purge ramp driver. Thus the card would be removed upon reaching the purge ramp.

By tracing the circuitry, through the mode switches in particular, it will be apparent that the purge function can be obtained in the described embodiment in either the first or third mode of operation. Furthermore, a card can be purged after printing if desired. Having thus described the purging function, we should now turn to the handling of the last five characters of the card.

*Selection of a card for printing, based on the last five characters*

The last five characters of the card as used in this example, represent a numerical designation of the agent or producer of the insurance policy. In mode 1 of operation of the machine, nothing is done with these characters at all. They are read, but the information read therefrom is not used. On the other hand, by pressing the mode 2 switch button, the printing of the card is based upon the reading and comparison of the last five characters rather than on the reading and comparison of the ninth and tenth characters as was done in mode 1.

It will be observed that the only difference between the printing on the last five characters rather than on the ninth and tenth characters, is the fact that with the mode 2 switch contact 3–18a engaging the lower pair of contacts in the drawing rather than as shown in the drawing, the rise of the 12th character line 21C133 is not effective to reset the print compare flip-flop 21–92, but rather the rise of the 13th–16th character line 21C143 is effective to do so. Therefore, this flip-flop can be reset to the 0 state to indicate a compare condition beginning with the reading of the thirteenth character. This flip-flop will then remain in this condition until such time as one of the last five characters being read by the identifying track reading station is different from that keyed into the machine for printing. However, if all of the last five characters are the same as those keyed into the machine, this flip-flop 21–92 will remain in the reset condition. This enables the print station control flip-flop 21–97 to be set upon the arrival, by way of mode 2 switch contacts 3–18b in the lower position (not shown on the drawing), of the "information end" pulse on line 21C156, at the set pulse input of the flip-flop. The information end signal input is derived from the AND gate 21–156 coupled to the last flip-flop 21–53 of the counter in FIG. 21D. This line comes up at the beginning of the sixty-eighth bit, which is the last timing bit for the seventeenth character. Thus, instead of printing a card based on the trigger pulse obtained from the beginning of the eleventh character as is the case when the ninth and tenth characters are used to determine the printing of the card, when the last five characters are used to determine the printing of the card, the print control flip-flop is triggered by the reading of the last timing bit corresponding to the last character.

*Deposit of card at final receive*

Up to this point, we have seen how a card can be purged and also how a card can be printed based on the comparison of the ninth and tenth characters or on a comparison of the last five characters. If a card is neither purged nor printed and if it is the first card out of the feed station, it will go to the final receive station, the ramp of which is always down. When the card has entered the final receive station, the leading edge thereof will actuate the receive station limit switch such as 15–38 in FIG. 16 and FIG. 17. The movable contacts thereof are designated generally in FIG. 21B by reference numeral 21–158. The movable contacts thereof are shown in the deactivated position. In this position of course the output line of the switch, which is coupled to the AND gate 21–159 is down. However when the switch is activated by the arrival of a card in the receive station, the movable contacts thereof bring the output line up.

Similarly, the purge station has a limit switch 21–161 therein which functions in the same manner. Likewise, the error station has a limit switch 21–162 therein which also functions in the same manner. It is the purpose of these limit switches, to do two things. The first, is to set the feed flip-flop 21–23 to the feed state for the feeding of the next card. It is also the purpose to reset the print control flip-flop 21–97 if it should happen to be in the set condition at the time of arrival of a card in one of these three receive stations. However before these functions are performed by the activation or actuation of these limit switchs, certain other conditions must also be established. Accordingly, a group of gates is coupled to the stations and will be described at this time.

When the output of the OR gate 21–163 is up, assuming that the set enable input 21–23k of feed flip-flop 21–23 is up, the feed flip-flop is set to the feed state. Tracing back through the stop switch line 21–164 from the enable input 21–23k of the feed flip-flop through the inverter 21–166, the stop switch button 3–14 contact 21–167, and the purge station full switch contacts 21–168, it is apparent that the enable input line 21–23k to the feed flip-flop 21–23 is normally up. The line 21–164 would be down if stop button 3–14 were depressed to couple a 5-volt positive potential to inverter 21–166, or if the purge station were full of cards whereupon the purge station full switch contacts 21–168, such as switch 15–53 of FIG. 15, would be positioned (not as shown) to apply a 5-volt positive potential to the inverter 21–166. This latter case would also energize the purge full indicator light driver 21–169 to illuminate the purge full light 3–23 on the control panel.

Now referring again to the OR gate 21–163, the output thereof will be up to set the feed flip-flop when any of the inputs thereto are up. The first input thereof is coupled to the output of the AND gate 21–159. As was already mentioned the first input to AND gate 21–159 will be up whenever a card enters the final receive station and activates the limit switch 21–158 therein. The other input of this AND gate will be up only when the output of the AND gate 21–171 is up. One of the inputs to this gate is derived from the error station control flip-flop 21–172. This line is up whenever the error station control flip-flop is in the 0 state, which is the case except when an error is detected as will become apparent in the description of the error detection which follows in this disclosure. Thus, this input to the AND gate 21–171 is normally up. A second input to the AND gate 21–171 is derived from the "0" output of the purge station control flip-flop and is up whenever the "0" output of this flip-flop is up. This is the case at all times when a purge function is not indicated. Finally, the third input for the AND gate 21–171 is up whenever the input to the print ramp driver 21–104 comes up. This line is up whenever the print switch is not activated by a card in the print station, or whenever the print control flip-flop 21–97 is in the 0 or "no print" state.

In view of the foregoing, it can be appreciated that the receipt of a card by the receive station is effective by virtue of the limit switch, to produce a setting of the feed flip-flop to the feed condition when, simultaneously, the error station control flip-flop is in the "no error" condition, the purge station control flip-flop is in the "no purge" condition, and the print ramp solenoid is not activated.

In the event, that the print control flip-flop 21–97 is in the print condition, and assuming that the other conditions just mentioned have been met, the operation of the receive station limit switch is also effective to reset the print station control flip-flop to the 0 state. This is because of the fact that the output of the OR gate 21–163 is coupled over the line to an input of the OR gate 21–173. The output of this OR gate is coupled to the reset pulse input 21–97e whereby the print flip-flop can be reset upon concurrence of the aforementioned conditions.

While this aspect is being discussed, it will be well to complete the discussion with the requirements necessary for the purge station limit switch and the error station limit switches to set the feed flip-flop and reset the print flip-flop as just described for the final receive station. Activation of the purge station limit switch 21–161 raises the output thereof so that the input therefrom to the AND gate 21–176 will be up. In order to produce an output from this AND gate to set the feed flip-flop by way of OR gate 21–163, the other input thereof must also be up. This input will be up whenever the purge station control flip-flop is in the 1 state, by virtue of the coupling of this input to the "1" output of the purge control flip-flop 21–139. This flip-flop will of course be up whenever a purge is indicated, which, in fact is what causes the purge ramp to intercept the card to be purged. Therefore, the arrival of a card in the purge station naturally results in the setting of the feed flip-flop. It also will effect the resetting of the print flip-flop, if it should happen that the print flip-flop is in the 1 state at the time of the purge operation.

Referring to the error station limit switch, the output thereof will be up whenever the switch is activated by the arrival of a card in the error station. In order to produce by way of the OR gate 21–163 the results above described for the final receive station and the purge station, the AND gate 21–177 must be satisfied. Activation of the limit switch will bring up one input thereof. The second input will be up upon the deenergization of the print ramp driver in the same manner as described in the discussion of the receive station limit switch performance. The third input is coupled to the "1" output of the error station control flip-flop 21–172. This line will be up, as will become apparent whenever an error in filing is indicated. This of course is the condition that causes the interception by the error station ramp, of a misfiled card. Accordingly, if the input to the print ramp driver is up, the arrival of a card in the error station will normally bring up the output of the AND gate 21–177 and effect a setting of the feed flip-flop and a resetting of the print control flip-flop 21–97 if the latter happen to be in the 1 state.

*Activation of receive station plungers*

It will be recalled from the brief description of the invention, that after arrival of a card in either the purge station, the error station, or the final receive station, the card is driven into a hopper by a solenoid plunger disposed below the station such as plunger 15–19 in FIG. 15. The manner of causing energization of the solenoid 15–21 and the resulting operation of the plunger will now be described. In FIG. 21B there is shown a group of three plunger drivers, the final receive station plunger driver 21–178, the purge station plunger driver 21–179 and the error station plunger driver 21–180. To each of these is coupled an OR gate, each of the OR gates having an input from an AND gate. Considering first the purge station plunger driver and its associated gates, the AND gate 21–181 associated therewith has an input 21–181a from the "0" output of the purge station control flip-flop. The output of the AND gate 21–181 is coupled to the input 21–182a of the OR gate 21–182. The OR gate output is coupled back to the second input 21–181b of the AND gate 21–181. A second input 21–182c to the OR gate 21–182 comes from the plunger pulse single shot 21–183. This output is also coupled to inputs of each of the other two OR gates associated with a corresponding plunger driver. A third input to the OR gate 21–182 is derived from the inverter 21–180a coupled to the input of the error plunger driver 21–180. The fourth input to the OR gate 21–182 and designated 21–182e is derived from the inverter 21–178a coupled to the input of the receive plunger driver 21–178.

The AND gate 21–184 for the receive plunger driver has an input from the inverter 21–185 coupled to the output of the AND gate 21–171. Thus, whenever the AND gate 21–171 is down, the input to the AND gate 21–184 derived therefrom is up. The second input to the AND gate 21–184 derived from the output of the OR gate 21–186 coupled thereto.

The inputs to the OR gate 21–186 are derived from the AND gate 21–184, from the inverter 21–179a, from the inverter 21–180a, and from the plunger pulse single shot 21–183.

The first input to the AND gate 21–187 is obtained from the "0" output of the error station control flip-flop 21–172. The second input to this AND gate is derived from the output of the OR gate 21–188 associated therewith. The output of the AND gate 21–187 provides one of the inputs to the OR gate 21–188. The other inputs to the OR gate are derived from the inverter 21–179a, from the inverter 21–178a, and from the plunger pulse single shot 21–183.

To describe the operation of the circuitry associated with the drivers, the purge station plunger driver will be taken as an example.

Initially, each of the OR gates 21–186, 21–182 and 21–188 will have a positive output as a result of the positive input supplied to each by the single shot 21–183 in the stable state. Because each of the three inverters 21–178a, 21–179a, and 21–180a is connected to an output from one of the three OR gates, all the inverter outputs will be negative. The outputs of the AND gates 21–184, 21–181 and 21–187 will depend on the outputs of the flip-flops and inverters to which each is connected. In this example, the input to the purge plunger driver AND gate 21–181 from the purge station control flip-flop is down, and has been down since the time of the setting of the purge station control flip-flop. The input of the error plunger driver AND gate 21–187 from the error station control flip-flop is up inasmuch as the error station control flip-flop remained in the 0 state, no misfiling of the particular card now in the purge station, having been previously detected. Likewise, the input of the receive plunger driver AND gate 21–184 is also up. Therefore, prior to triggering of the plunger pulse single shot 21–183, the outputs of the purge plunger driver AND gate 21–181 is down whereas the outputs of the other two AND gates are up.

Recalling that the OR gate 21–163 will produce a positive output pulse whenever any of the inputs thereto is up, and that the AND gate 21–176 is satisfied when the purge station control flip-flop is set, when the card activates the purge station limit switch 21–161, the pulse from the OR gate 21–163 coupled to the plunger pulse single shot 21–183 triggers the latter. During the astable state of the single shot, the "0" output thereof is down and this is coupled to each of the plunger driver OR gates. The OR gate with a negative input from the associated AND gate (namely the purge gate 21–181 in this example) will also have a down output which will activate the associated plunger driver. Because the OR gate output is down, the input from the associated AND gate will remain down by virtue of the down input connected to the OR gate output. Due to the fact that another card may be being processed by the read station during the latter portion of the single shot pulse, the connection of an OR gate output through an inverter to inputs of the other two OR gates, insures that only the one OR gate will have a down output for a particular single shot pulse. Because of the feed back connection between an OR gate output and the associated AND gate input, the length of a plunger pulse is not shortened by changes in the outputs of the purge, error, or print flip-flops, which will occur as the next card is read.

FIG. 32 shows the typical driver circuitry used for various solenoids employed in the machine. The circuit includes an input 32–11 coupled to the base of a PNP emitter follower 32–12. The emitter of the emitter follower 32–12 is coupled through the resistor 32–13 to the base of a PNP switching transistor 32–14, the emitter of which is coupled to ground and the collector of which is coupled to the output terminal 32–16. Output terminal 32–16 would be coupled to one side of a solenoid winding, the other side of which would be connected to a source of negative potential. The fall of potential to the input terminal 32–11 turns on the switching transistor 32–14 to provide ground potential at the output to energize the solenoid winding. The subsequent rise of the input again turns off the switching transistor whereupon current flow to the output terminal 32–16 is terminated.

At this point, it may be well to describe briefly an emitter follower driver which has been used satisfactorily. It is shown in FIG. 33. The input is applied to terminal 33–11. This is coupled to the base of the NPN transistor 33–12 and to the base of the PNP transistor 33–13, these transistors being connected together in complementary arrangement. Output terminal 33–14 is connected to the emitters of the transistors. This driver is useful to avoid excessive loading of signal sources.

*Distinguishing single document and double document cards*

Usually, it is the practice to store two documents on a single film card. It has been found that there is adequate space on the card to do so without sacrificing the quality of prints which can be achieved. However, the system of this invention, so far as the logic is concerned, assumes that there is only one document on the card unless there is some indication whereby the presence of a second document is indicated to the logic. It will be recalled that in the example described so far, there are seventeen characters on the film card and there are sixty-eight binary identification bits used in the coding of these characters. In the event that there is a second document on the card, an additional "1" bit of code is provided on the identifying track of the card. This sixty-ninth bit is used to set up the reproducing cycle to make a print of both documents. Referring to FIG. 21B, the energization of the second document relay 21–211 will provide the necessary functions to obtain a print of the second document as well as the first.

The second document relay driver 21–210 will be energized by a negative input signal thereto from the OR gate 21–212. The OR gate can produce such a signal when both of its inputs are down. One input of the OR gate is derived from the output of the print relay OR gate 21–41. This line is down when the OR gate is satisfied and the print relay driver 21–98 is energized, as has already been described. The second input to the OR gate 21–212 will be down when the flip-flop 21–213 is in the 0 state. However, it will be observed that the set pulse input thereof is coupled to the date end line 21C156 which, it will be recalled, rises at bit 68, which is the last bit of the seventeenth character. Consequently, this flip-flop is normally in the 1 state at the end of the reading of the film card. Thus, ordinarily, the OR gate 21–212 is not satisfied at the end of the film card and the second document relay 21–211 is not energized.

The presence of a sixty-ninth information bit on the information track will result in the input from the information track to the AND gate 21–95 being up. The fact that there is no switch information corresponding to a sixty-ninth code bit will result in the generated switch data line 21C86 coupled to OR gate 21–93 being down. The shift register flip-flop 21–37 will be in the 0 state and therefore, the input therefrom to the OR gate 21–93 will be down. The output of OR gate 21–93 will, therefore, be down and the output of the inverter 21–94 will be up. Consequently, AND gate 21–95 will be satisfied, thereby producing a positive output in the line 21–214 coupled to the reset enable input of the second document flip-flop 21–213. The next information compare sample pulse on line 21–123a coupled to the reset pulse input of the flip-flop will reset the flip-flop whereupon the "1" output thereof will go down. This output and that from OR gate 21–41 are coupled to the second document OR gate 21–212. Both being down will energize the second document relay 21–211 which will, in turn, provide for the printing of both the first and second document. Both the print relay and the second document relay will later be deactivated upon reset of the print flip-flop, which occurs when the printed card arrives at a receive station.

*Filing error detection*

The error detection phase of the operation of the machine will now be described. It will be recalled, that the binary information obtained from the reading of the eight characters of the first film card fed from a capsule was stored in the core shift register 21–67 of FIG. 21A. If it should happen that any film card fed subsequently bears a character among the first eight which is different from those of the first card, it is the result of an error in the filing of the film cards in the capsule. Therefore, it is the purpose of the error detection portion of the present invention to remove any such misfiled cards from the correctly filed group, and the error receive station is provided for this purpose.

Upon the feeding of the second card from the feed station, the card data start line 21C53 coupled to the set-pulse input of the flip-flop 21–62 comes up upon the reading of the first timing bit for the second card. The shift register data return flip-flop 21–37 will be in the 0 state at this time whereby its "0" output will be up. This is coupled to the set-enable input of the flip-flop 21–62. Accordingly, the rise of the card data start line will set the flip-flop 21–62 to the 1 state whereby the input to AND gate 21–64 from the flip-flop will be up. The timing track single-shot 21–42 is triggered by the first timing bit, and upon its return to the stable state, the counter advance output line from the "1" output thereof and appearing at the other input of the AND gate 21–64 will be up. Therefore, an output from the AND gate to the shift input of the shift register driver 21-66 will be up. This will cause a shift of the stored information in the register whereby the first bit of information therein will be shifted out through emitter follower driver 21-191 and Schmitt trigger 21-192 to the set-pulse input of the flip-flop 21-37.

It will be recalled that the arrival of the ninth information character of the *first* card fed from the capsule caused a rise of the ninth character line 21C76 resetting flip-flop 21-36 to the 0 state. Thus, the "0" output thereof is up at the time of feeding the second card and, being coupled to the set-enable input 21-37c of the flip-flop 21-37 permits the arrival of the first information bit from the shift register at the flip-flop to change the state thereof to the 0 state. This assumes, of course, that the first bit stored in the register is a "1" bit. If it is an "0" bit, the flip-flop 21-37 will not be influenced thereby. Accordingly, the "1" output of this flip-flop will rise or will remain down depending on the nature of the bit shifted into the flip-flop from the shift register. Inasmuch as this output is coupled by the line 21-193 to the OR gate 21-93, the effect is to provide data to the OR gate representing data stored in the shift register. This data is then compared with identifying data being read from the film card in the same manner as previously described for the comparison of the generated character switch data with the read data.

For this comparison, the compare flip-flop 21-92 looks for a difference between the data. Its "1" output is coupled to the set pulse inputs of the error station control flip-flop 21-172. The set-enable input 21-172c of flip-flop 21-172 is coupled by way of the line 21A62 to the "1" output of the flip-flop 21-62. Recalling that this flip-flop was set to the one state by the card data start signal, the set-enable input of the error station control flip-flop will be up. Therefore, whenever a comparison of the data shifted out of the shift register with the read data results in a difference, the flip-flop 21-92 will recognize the difference and be set, whereupon the error station control flip-flop will be set.

In view of the fact that the error sample end line 21C58 rises at the beginning of the last bit of the eighth character permitting resetting of flip-flop 21-62, this flip-flop cannot be relied upon after reset of flip-flop 21-62 during the last bit of the eighth character to provide a set enable input over line 21A62 to the error control flip-flop 21-172. Therefore, line 21C58 is also coupled to the other set enable input of flip-flop 21-172 so it can nevertheless be set by a pulse on line 21B92.

The setting of the error station control flip-flop will cause the "0" output thereof to go down. This output is coupled to an input of the OR gate 21-196. In order to activate the error ramp driver 21-197, the input thereto from the OR gate 21-196 must go down. Therefore, the two other inputs to this OR gate must go down as well as that from the flip-flop in order for the error station ramp to be depressed by the solenoid thereof to intercept the misfiled card.

Inasmuch as the difference detected by the print and error compare flip-flop 21-92, disenables the print station control flip-flop, the "0" output thereof will be up. This output is coupled through the print OR gate 21-102, emitter follower 21-103 and the line 21-198 to inverter 21-197. The inverter output to the OR gate 21-196 will therefore be down. In view of the fact that the feed flip-flop 21-23 will have been reset by the first time bit at the time of error comparison, it will be in the 0 state and the "1" output thereof will be down. This output is coupled to the third input of the OR gate 21-196. Therefore, detection of a non-comparison during the comparison of the first eight characters of a card, will cause the energization of the error ramp solenoid to depress the ramp for interception of the misfiled card.

It must be remembered, that each of the one hundred or so cards fed from the feed station following the first card fed therefrom must have its first eight characters compared with those stored in the shift register from the first card, in order to detect a filing error. Consequently, provision is made to avoid losing the data stored in the shift register after each bit comparison. This is done by coupling the "1" output of the flip-flop 21-37 to the set-enable input 21-71d of the single shot 21-71. Also, the info compare sample line 21-123 from emitter follower 21-122 and AND gate 21-89 is coupled through the line 21-203 to the trigger-pulse input 21-71e of the single shot 21-71. Thus, assuming that the first bit shifted out of the shift register is a "1" bit, the flip-flop 21-37 will be set. The "1" output thereof rises and thus, the enable input 21-71d of the single shot 21-71 is up. This single shot, is then triggered by the information sample input from line 21-203 derived from AND gate 21-89 upon the triggering of the time track single shot when the next timing bit is read. The resetting of the single shot 21-71 applies a "1" bit to the shift register data input 21-67b. It is in this manner, that the shifting of a "1" bit out of the shift register is compensated for by the shifting of another "1" bit into the shift register. Accordingly, during the reading of the first eight bits of any card, the stored information in the shift register is not lost.

Before finishing the discussion of the error detection system, it should be mentioned that the rise of the "1" output of the error station control flip-flop when an error is detected is effective to enable the setting of the flip-flop 21-206 of FIG. 21B. The set-pulse input of this flip-flop is coupled to info compare sample line 21-123a from the AND gate 21-89. Therefore, when this line comes up as it does for every timing bit, the flip-flop 21-206 is set. The "1" output thereof rises and operates the filing error lamp driver 21-207. Therefore, when a filing error is detected, the filing error lamp 3-24 on the control panel of the machine is illuminated. This lamp will remain illuminated until the flip-flop 21-206 is reset, which can only occur when the start button 3-13 is depressed, the output of the start switch being coupled through the line 21-208 to the reset pulse input of the flip-flop.

In order to prevent the continuous shifting of information out of the shift register at the end of the sampling of the first eight characters, to thereby permit sampling of the ninth and tenth characters with data generated from character switch settings, the shift register driver AND gate 21-64 must be disenabled at the end of the reading of the last bit for the eighth character. This is accomplished by resetting the flip-flop 21-62. The resetting of this flip-flop is obtained by coupling the sampler signal line 21C43 to the reset pulse input of the flip-flop 21-62, and by coupling the error sample end line 21C58 to the reset enable input of the flip-flop. This latter line rises upon the reading of the last bit of the eighth character. The rise of this line enables reset of the flip-flop 21-62 by the sampler signal to prevent further shifting of the shift register. At this time, the shift register will again have stored therein the information representing the first eight characters of the first card fed from the feed station.

*Summary of comparison aspects of the system*

The comparison of the information being read, and the stored signal, is handled in the same manner regardless of whether the stored information was stored by way of the panel character switches or in the bit shift register. A "greater than" signal is generated at the output of the "greater than" AND gate 21-95, the inputs of which are the read signal and the inverted generated signal, in the event that the signal which is read represents a binary number which is greater than the number represented by the simultaneously generated signal. A "less than" signal is generated at the output of the "less than" AND gate 21-96, the inputs of which are the inverted read signal and the generated signal, in the event that the signal being read represents a binary number which is less than the number represented by the signal simultaneously generated. In order to compare the signals read and the signals generated on a "equal to" basis, compare flip-flop 21–92 is reset to the compare (0) state at the beginning of the test. During the comparison test, the data compare sampler signal, derived from the time track triggered single shot, is gated with the inputs to the compare flip-flop from the "less than" and "greater than" AND gates. If either of the inputs from these AND gates is up at the time of the sampling signal, indicating that the information being read is different from information being generated, the compare flip-flop is set by the sample signal to 1 state. If this takes place during the error comparison test, the error station control flip-flop is thereby set to place the error station in condition for removal of the misfiled card. On the other hand, if the difference condition occurs during the print selection phase, the setting of the print station control flip-flop to the print state will be disenabled for the particular card being checked.

If, during the test, the output of neither of the comparing AND gates rises, the compare flip-flop will remain in its 0 or "equivalent" state upon arrival of the sample signal. If this flip-flop remains in this state during the filing error detection phase, it does so because there was no filing error as to this particular card, and there is no effect at the error station. If the flip-flop remains in the "equivalent" state through the printing selection phase of the test, it indicates that the card should be printed, and enables the setting of the print station control flip-flop to the "print" condition whereby provision is made for the printing of the card.

Because the purging operation is on a basis somewhat different from the detection of a misfiled card or the detection of a card for printing, the AND gate outputs are handled slightly differently for this purpose. To employ the output of the "less than" AND gate to remove all cards bearing a two month period code less than that keyed into the control panel of the machine, two flip-flops are employed. The "greater than" flip-flop 21–121 is set to its "greater than" state by gating together the output of the "greater than" AND gate and the sampling signal. If the output of the "greater than" AND gate is up during the reading of the eleventh character, the "greater than" flip-flop is set and the card will not be purged on the basis of this character. On the other hand, the "less than" flip-flop 21–126 is set to a "less than" state by gating together the output of the "less than" AND gate and the sampling signal, provided of course, that the reading of prior bits in the eleventh character has not caused the setting of the "greater than" flip-flop to "greater than" state. The setting of the "less than" flip-flop provides one positive input to AND gate 21–127. Therefore so long as the flip-flop 21–92 does not detect a difference signal on comparison of the twelfth read character with the twelfth keyed in character, the setting of the "less than" flip-flop provides conditions for the purge station to remove the card. Since any further setting of the "less than" flip-flop is prohibited after the "greater than" flip-flop has been set, and since the most significant bits are compared first, the state of the "less than" flip-flop indicates the result of the "less than" test.

The comparison for purging cards based upon those bearing the number for the twelfth character representing one or two years prior to the purge year keyed into the control panel, is done in substantially the same manner as the print determining comparison was made. One comparison flip-flop 21–137 is used for the purge year minus one comparison and another 21–138 is used for the purge year minus two comparison.

*The print cycle*

Referring to the schematic of FIG. 22, components which have already been mentioned herein are given the same reference numerals. Relays, where controlled directly by a specific switch, are given the switch number with the postscript R. Various contact sections of the relays are given lower case letter postscripts in addition to the R.

The circuit is supplied by 115-volt A.C. input to terminals 22–169 from the main power switch of FIG. 20. Principal portions of the circuit are the branch including the scan solenoid 11–99 and brake disabling, scan relay 22–171R, the branch including the card release solenoid 11–37, the branch including the valve solenoid 9–21a, the branch including the counter advance solenoid 22–176, the branch including brake motor 11–111 and brake sustaining relay 22–172R and, the branch including the stepping switch 22–177 and the counter relay 22–191R.

In addition to the stepping contact 22–179 of switch 22–177, fixed contact terminals 22–180 through 22–190 are provided. Each of these, with the exception of contact 22–180, is connectable through a corresponding normally-open, button-operated switch in the number-of-copies switch bank 22–200 to the common junction 22–202. The junction is connected through counter relay 22–191R, to one of the supply lines 22–169. The stepping contact is connected to the other supply line.

The counter advance solenoid 22–176 is operatively coupled, as indicated schematically by the dashed line 22–178, to the stepping contact 22–179 of the stepping switch. Each energization of the solenoid 22–176 is, therefore, capable of moving the contact 22–179 from one of the lower numbered of the fixed contacts 22–180, 22–190, to the next higher numbered contact. An example of a stepping switch which may be conveniently employed in a series MER "stepper" produced by Guardian Electric Mfg. Co. of Chicago, Illinois. The stepping switch is for the purpose of causing repeated scans of the same card to provide the number of copies selected by the panel button depressed. Conventional interlocking mechanical linkage may be provided between the panel buttons in the number of copies bank, so that only one switch can be closed at a time.

Referring further to FIG. 22, scan solenoid winding 11–99, in parallel with the control winding of scan relay 22–171R, is connected in series with the normally closed section 22–191Rb of counter relay 22–191R, with the normally open section 21–99a of the print relay 21–99 of FIG. 21B with the normally closed contacts 11–126a of the end-of-second-scan switch 11–126 with normally closed cointacts of the end-of-first document-scan switch 11–124, and with the normally closed section 22–172Rb of the brake sustaining relay 22–172R. This combination forms a branch across the supply lines 22–169. The normally open contacts 21–211a of the second document relay of FIG. 21B, are connected across the contacts 11–124a of the end-of-first-scan switch 11–124.

The counter reset solenoid winding 22–192 is in a series combination with the normally open section 22–191Rc of the counter relay and with the normally closed section 21–99b of the print relay 21–99 of FIG. 21. This series combination is connected in parallel with the combination of scan solenoid winding 11–99, and relay sections 22–191Rb and 21–99a.

Card release gate solenoid 11–37 is connected in series with the normally closed section 22–172Rc of the brake sustaining relay, with normally open section 22–191Ra of the counter relay, and with the normally open contacts 11–128a of the home switch 11–128 of FIG. 11.

The valve solenoid 9–21a is in series with the normally closed contacts 21–26b of the card release gate limit switch 11–44 of FIG. 12 and with the normally open section 21–99c of the print relay 21–99.

Counter advance solenoid 22–176 is in series with normally closed scan relay section 22–171Ra and with the normally closed contacts 11–128b of home switch 11–128. This series group is connected in a branch across lines 22–169.

The brake circuit branch includes the brake motor 11–111 in series with variable and fixed resistances 22–193 and 22–194, respectively, with rectifier 22–196, and with normally-open section 22–172Ra of the brake sustaining relay 22–172R.

Section 22–172Ra is connected across the combination of relay section 22–171Ra and home switch section 11–128b. Normally-open contacts 11–127a of full-brake switch 11–127 are connected across the series resistances 22–193, 22–194.

A second portion of the brake circuit is connected across the combination of brake motor 11–111 and contacts 11–127a of the brake switch. This portion includes the brake sustaining relay control winding 22–172R in series with normally-closed contacts 11–127b of the full brake switch 11–127. An R-C time delay branch including resistor 22–197 and capacitor 22–198, is connected across relay winding 22–172R.

In the operation of the reproduce station, assume that the print ramp driver of FIG. 21B has caused the ramp to descend between the belts and deflect the card upwardly from the belts.

The kinetic energy of the card carries it up the ramp, over the inclined forward edges of the gates, and the card is guided along the upper surface of the gates by the lower surfaces of the inner portions and of the platen.

As the leading edge of the card reaches the rear edges of the gates and platen inner portions, it pushes the forward end 11–69 of the print switch actuating arm to the rear. This arm being spring loaded, absorbs the energy of the card, bringing it to rest and then moves the card forward so that the trailing edge thereof abuts the depending abutment or card stops 11–56 and there holds the card firmly in position.

The print switch 11–66 causes the print relay driver of FIG. 21B to energize relay 21–99 of FIG. 21B closing section 21–99a to energize scan solenoid 11–99 and to energize the scan relay 22–171R. Section 21–99c is also closed to energize the vacuum solenoid 9–21a whereby a high vacuum is applied to the platen to secure the card thereto. Energization of the scan relay 22–171R closes a normally open set of contacts 22–171Rb thereof to turn on the reproduce light 11–72 supplied by an alternating current potential applied between one of the input terminals 22–169 and terminal 22–211. Energization of solenoid 11–99 causes pawl 11–96 to engage the ratchet wheel 11–93 initiating the drive of the carriage drive pulley 11–63. Pulley 11–63 drives the pinion shaft. Pinions 11–58, fastened to the pinion shaft, being engaged with the gear racks 11–52, 11–53 mounted on the platen, initiate traverse of the carriage.

As the carriage is moved, the lamp 11–72 and the projection lens assembly 11–81 project an image of the portion of the card appearing above aperture 11–74. Thus, the card is "scanned" as the carriage moves it along. By employing a fixed optical system in the copying machine, the image can be projected on the coated drum or other photo-sensitive member in the copying machine as it moves in synchronism with the traverse of the carriage, though the photo-sensitive member may have a surface speed of perhaps thirty times that of the carriage, depending upon the magnification desired.

Of course, in a copying machine using sensitized paper as the photo-sensitive member, the paper moving mechanism synchronizes paper movement with the carriage.

When the carriage has moved a distance sufficient to project the documentary information of the first document on the card, the time wheel 11–116 will be advanced far enough for the cam 11–121 thereon to open the end-of-first document scan switch 11–124. Assuming there is no second document on the card, the second document relay 21–211 of FIG. 21B will not be energized, and the contacts 21–211a thereof in parallel with those of the end-of-first scan switch, will remain open. Therefore, opening of the end-of-first-scan switch by the cam, deenergizes scan solenoid 11–99, whereupon the pawl 11–96 is disengaged. It also deenergizes the brake disabling scan relay 22–171R whereupon section 22–171Ra in the brake circuit closes applying a low level D.C. to the brake motor 11–111 and energizes brake sustaining relay 22–172R. The scan return spring 11–106 returns the carriage to its initial "home" position. This is the "scan home" phase of operation.

If the card contained a second document, the second document relay would have been energized by the reading of the sixty-ninth information bit. The above sequence, beginning with deenergization of the scan solenoid, would not therefore have begun until the timing cam had moved to the position where it could open the end-of-second-document switch 11–126. Accordingly, the scan would be extended enough to reproduce the second document as well as the first.

Energization of brake sustaining relay 22–172R closes section 22–172Ra thus assuring a power supply to the brake motor independent of relay section 22–171Ra and home switch section 11–128b. Energization of relay 22–172R also opens the normally closed section 22–172Rb whereby deenergization of scan solenoid 11–99 and brake disabling relay 22–171R is assured during the "scan home" phase.

Momentarily before reaching the home position, cam 11–121 operates the full brake switch 11–127 closing section 11–127a to apply full D.C. voltage to the brake motor 11–111 to stop the carriage at home. Operation of switch 11–127 also opens section 11–127b which would deenergize relay 22–172R but for a time delay of approximately .2 sec. provided by the R-C branch in parallel with the relay. Consequently, relay section 22–172Ra remains closed long enough for full brake voltage through switch section 11–127a to cause brake motor 11–111 to stop the carriage at home. During "scan home," relay 22–172R, being energized, maintains open the normally closed relay section 22–172Rc to prevent operation of the card release solenoid 11–37 until the carriage is home.

When the carriage is home, brake switch 11–127 is still actuated by a portion of cam 11–121 by virtue of the location of the switch close to the home position. Relay 22–172R therefore opens at the end of the time delay and section 22–172Rc thereof in the gate solenoid branch, closes.

At home position, timing cam 11–121 actuates home switch 11–128 opening section 11–128b in the brake circuit and closing section 11–128a in the gate solenoid circuit. Thus, relay section 22–172Rc and switch section 11–128a are now closed in the gate solenoid circuit.

During the scan home portion of the cycle, the counter and stepping switch advance solenoid 22–176, which is connected in parallel with part of the brake circuit, is energized, advancing the stepping switch one step.

If only one copy was desired, the advance of one step places contactor 22–179 on terminal 181. Inasmuch as the copy button numbered "1" would have been depressed to order one copy, its switch contacts 22–201 would therefore be closed. Thus, the advance of the counter stepping switch closes the circuit through counter relay 22–191R whereupon it is energized. This closes relay section 22–191Ra during the "scan home" portion of the cycle. Consequently, upon return to home position, by the closing of the home switch section 11–128a and brake sustaining relay section 22–172Rc, the circuit through gate solenoid 11–37 is completed whereupon the gates are opened to release the card. The vacuum valve solenoid 9–21a is deenergized upon actuation of limit switch 11–44 by crank 11–33 upon the opening of the gates which actuation opens switch section 21–26b. This switches the platen supply vacuum valve 9–21 to change from a high vacuum at the platen to a slight pressure, to eject the card to the belt whereby it is carried away to a card receiving station.

It may be mentioned at this point that the energizing of counter relay 22–191R closes relay contact 22–191RC. However, print relay contacts 21–99b were opened upon energization of the print relay. Energizing of counter relay 22–191R opens section 22–191Rb. Therefore, while the brake sustaining relay section 22–172Rb again closes when the relay 22–172R is deenergized after the aforementioned time delay, the opening of section 22–191Rb prevents reenergization of the pawl solenoid 11–99. Thus, a new scan is not started, upon completion of the one required for one copy.

If more than one copy is desired, the appropriate control panel button may be set to make the desired number of copies. Assuming that five copies are desired, the control panel button numbered "5" is set for five copies. Referring to the schematic of FIG. 22, this closes the button operated switch connected to terminal 22–185. It should be apparent, therefore, that counter advance solenoid 22–176 moves the stepping switch one step at a time during each "scan home" until it has reached terminal 22–185.

So long as counter relay 22–191R remains deenergized, section 22–191Ra thereof will remain in its normally open position, avoiding actuation of the card release gate solenoid 11–37. Moreover, section 22–191Rb in the scan solenoid branch will remain closed. Therefore, each time the carriage has returned to "home position," and brake sustaining relay section 22–172Rb has again closed, the scan solenoid is reenergized and a new scan is initiated for the same film card, and the scan and scan-home are repeated. Repetitions will occur until the movable contact of the stepping switch has been advanced by the counter advance solenoid 22–176 to terminal 22–185, whereupon the card will be released upon completion of "scan home" in the same manner as discussed above in the description concerning production of only one copy.

It should be noted that the copies switching circuit provides that if, for some reason, an operator of the machine decides to change the number of copies keyed into the machine during the time the print function is being performed, and the new number is less than the number of scans already performed, the print process will be discontinued for that particular card. The card will be returned to the scan home position and be released from the reproduce station and the processing of cards will continue in a normal manner.

From the foregoing description, many advantages of this invention can be readily appreciated. From a file of 30,000,000 pages, a clerk with the help of this invention can obtain a full size copy of any page in less than a minute. A minimum of space is required for the file by virtue of the small size and thickness of the cards.

No card need ever be removed from the file, thus eliminating an otherwise common filing problem of documents missing from the file. Since no card need be removed except by machine processing, refiling by hand is not required and refiling errors are, therefore, precluded.

Documents can be purged from the file by machine, based on a predetermined code. Supplementary documents can be added to a file if desired by adding new cards. If related to other documents, the supplementary documents can be given identification whereby they will be copies as well as the other documents to which they are related.

Standard film widths can be used. Because of the comparatively large size of the identifying code word, it can take considerable abrasion before becoming illegible. The string transport system has a comparatively low cost and is highly durable and reliable. The electronic data comparison by the logic is fast, accurate and reliable. The transport control logic depends on signals from control panel switches, various station limit switches, the vacuum operated switch, and read station signals to control power to transport solenoids and reproduction relays. The logic is thus free from any clock signal, and the times required for various transport functions can therefore, be varied within wide limits without hampering the operation of the machine. The combination of the mode switch connections prevents any effects injurious to the transistor circuits from occuring when, for some reason, the operator of the machine may cause more than a single switch to be depressed at a given time.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. An information storage and reproducing system for producing copies of elements in accordance with information on the elements:
   means for storing identification data in the system;
   an element transport conveyor;
   means for feeding said elements to said conveyor;
   means for reading information on the elements transported by said conveyor;
   means coupled to said storing means and to said reading means for comparing stored data with information read from the elements to produce signals having characteristics representing such comparison;
   means coupled to said comparing means and responsive to signals having particular characteristics from said comparing means to produce copies only of particular elements represented by the signals with particular characteristics; and
   means for receiving the elements transferred from said feeding means to said conveyor.

2. In the combination set forth in claim 1,
   means responsive to the signals from the comparing means for transferring the particular elements from the conveyor to obtain a production of copies of the particular elements.

3. In combination for processing a plurality of elements each having a plurality of bits of information on the elements and for providing for the reproduction of information on duplicate elements,
   first means for retaining the elements,
   second means disposed relative to the first means for obtaining a conveyance of elements from the first means,
   third means having first and second operative relationships and operatively coupled to the first means to provide for a transfer of elements from the first means to the second means in the first operative relationship and to prevent such a transfer of elements in the second operative relationship,
   fourth means disposed relative to the second means for receiving elements from the second means,
   fifth means disposed relative to the elements on the second means for processing bits of information on the elements on the second means,
   sixth means for providing particular information for purpose of comparison,
   seventh means operatively coupled to the fifth and sixth means for comparing the processed information from the fifth means and the particular information to produce signals having characteristics in accordance with the results of the comparison,
   eighth means operatively coupled to the third means and the seventh means for normally obtaining an operation of the third means in the first relationship and for obtaining an operation of the third means in the second relationship upon the production of signals of particular characteristics by the seventh means,
   ninth means operatively coupled to the seventh means for obtaining a reproduction on duplicate elements of information on particular elements represented by the production of signals of particular characteristics by the seventh means, and tenth means operatively coupled to the third and ninth means for obtaining an operation of the third means in the first operative relationship upon the reproduction on the duplicate cards of the information on the particular cards.

4. In combination for processing a plurality of elements each having a plurality of bits of information on the elements and for providing for the reproduction of information on duplicate elements, first means for retaining the elements, second means disposed relative to the first means for obtaining a conveyance of elements from the first means, third means disposed relative to the second means for receiving elements conveyed by the second means, fourth means disposed relative to the elements on the second means and between the first and third means for processing particular bits of information on the elements on the second means, fifth means for providing particular information for purposes of comparison, sixth means operatively coupled to the fourth and fifth means for comparing the particular information from the fifth means with the particular bits of information processed by the fourth means from the elements on the second means for producing signals having characteristics representing such comparison, seventh means operatively coupled to the sixth means for reproducing on the duplicate elements the information on particular elements on the second means in accordance with the characteristics of the signals from the sixth means, and eighth means operatively coupled to the seventh means for obtaining a movement of the particular elements to the third means after the reproduction on the duplicate elements of the information on the particular elements.

5. In combination for processing a plurality of elements each having a plurality of bits of information on the elements and for providing for the reproduction of information on duplicate elements, first means for retaining elements, second means disposed relative to the first means for obtaining a conveyance of elements from the first means, third means disposed relative to the second means for obtaining a transfer of the elements on the second means to the third means, fourth means disposed relative to the second means for obtaining a reproduction on duplicate elements of information from only particular elements on the second means, and fifth means operatively coupled to the first means for preventing the transfer of elements from the first means to the second means during the reproduction on the duplicate elements of information from the particular elements on the second means.

6. In the combination set forth in claim 5, the second means being continuously movable, and sixth means operative in first and second relationships and normally operative in the first relationship to provide for a transfer of elements from the first means to the second means and operative in the second relationship to prevent a transfer of elements from the first means to the second means, the fifth means being operatively coupled to the sixth means to obtain an operation of the sixth means in the second relationship during the reproduction on the duplicate elements of information from the particular elements on the second means.

7. In combination for processing a plurality of elements each having a plurality of bits of information on the elements and for providing for the reproduction of information on duplicate elements, first means for retaining elements, second means disposed relative to the first means for obtaining a conveyance of elements from the first means, third means disposed relative to the second means for receiving elements from the second means, fourth means disposed relative to the elements on the second means for processing bits of information on such elements, fifth means for providing particular information for purposes of comparison, sixth means operatively coupled to the fourth and fifth means for comparing bits of information processed by the fourth means with the particular information from the fifth means to produce signals having characteristics dependent upon the results of the comparison, seventh means operatively coupled to the sixth means for obtaining a reproduction on duplicate elements of information on particular elements in accordance with the characteristics of the signals produced by the sixth means, and eighth means operatively coupled to the seventh means for obtaining an interruption in the conveyance of elements by the second means from the first means during the reproduction on duplicate elements of information on the particular elements.

8. In combination for processing a plurality of elements each having a plurality of bits of information on the elements and for providing for the reproduction of information on duplicate elements, first means for retaining the elements, conveyor means disposed relative to the first means for obtaining a movement of the elements from the first means, second means disposed relative to the first means and to the conveyor means for receiving elements conveyed by the conveyor means from the first means, third means disposed relative to the elements on the conveyor means for processing particular bits of information on such elements, fourth means for providing particular information for comparison, fifth means operatively coupled to the third and fourth means for comparing the information from the particular bits on the elements and the particular information from the fourth means to produce signals representing the results of such comparison, sixth means operatively coupled to the conveyor means at a position between the first and second means and provided with first and second operative relationships and operative in the first relationship to obtain a transfer of elements from the conveyor means before the movement of the elements to the second means and operative in the second relationship to provide for a movement of the elements on the conveying means past the position of transfer, seventh means operatively coupled to the fifth and sixth means for obtaining a transfer of particular elements by the sixth means from the conveyor means in accordance with the signals from the fifth means, eighth means responsive to the particular elements transferred from the conveyor means to the sixth means for reproducing on the duplicate elements the information on the particular elements, and ninth means responsive to the reproduction on the duplicate elements of the information on the particular elements for returning the particular elements to the conveyor means for transport of such elements to the second means.

9. In combination for processing a plurality of elements each having a plurality of bits of information and for providing for the reproduction of information on duplicate elements, first means for retaining the elements, second means disposed relative to the first means for obtaining a continuous conveyance of elements from the first means, third means for providing particular information for purposes of comparison, fourth means disposed relative to the elements on the second means for processing information on the elements on the conveyor means, fifth means operatively coupled to the third and fourth means for comparing the particular information from the third means with the information processed by the fourth means to produce signals having characteristics dependent upon the results of the comparison, sixth means operatively coupled to the fifth means and disposed relative to the elements on the second means for obtaining an interruption in the continuous conveyance of particular elements dependent upon the characteristics of the signals produced by the fifth means, and seventh means operatively coupled to the sixth means for obtaining a reproduction on duplicate elements of information on the particular elements upon the interruption in the continuous conveyance of such elements.

10. In the combination set forth in claim 9, eighth means operatively coupled to the seventh means for obtaining a resumption in the continuous conveyance of the particular elements upon the reproduction on the duplicate elements of information on the particular elements.

11. In combination for processing a plurality of elements each having a plurality of bits of information and for providing for the reproduction of information on duplicate elements, first means for retaining the elements, second means disposed relative to the first means for obtaining a conveyance of elements from the first means, third means disposed relative to the second means for receiving elements from the second means, fourth means normally disposed in a first state to prevent a reproduction of information on duplicate elements and operative to a second state to obtain a reproduction of information on duplicate elements, fifth means responsive only to particular elements on the second means and operatively coupled to the fourth means to obtain an operation of the fourth means in the second state for a reproduction on duplicate elements of information on the particular elements, sixth means operatively coupled to the fifth means for obtaining a conveyance of the particular elements to the third means upon the reproduction on duplicate elements of information on the particular elements, and seventh means operatively coupled to the third and fourth means for obtaining a resetting of the fourth means to the first state upon a reception of each element by the third means.

12. In the combination set forth in claim 11, eighth means normally operative in a first state to prevent a transfer of elements from the first means to the second means and operative to a second state to provide for a transfer of elements from the first means to the second means, and ninth means operatively coupled to the eighth means and third means for obtaining an operation of the eighth means in the second state upon a reception of each element by the third means.

13. In combination for processing a plurality of elements each having a plurality of bits of information on the elements and for providing for the reproduction of information on duplicate elements, first means for retaining the elements, second means disposed relative to the first means for obtaining a conveyance of elements from the first means, third means disposed relative to the second means for receiving elements from the second means, fourth means disposed relative to the second means for processing bits of information on the elements on the second means, fifth means for providing particular information for purposes of comparison, sixth means operatively coupled to the fourth and fifth means for comparing the particular information from the fifth means and the bits of information processed by the fourth means to produce signals having characteristics dependent upon the results of the comparison, seventh means operatively coupled to the first means for obtaining a transfer to the second means of elements retained by the first means, and eighth means operatively coupled to the sixth means for obtaining a reproduction on duplicate elements only of particular elements, among the elements transferred from the first means to the second means, represented by signals with particular characteristics from the sixth means.

14. In combination for processing a plurality of elements each having a plurality of bits of information on the elements and for providing for the reproduction of information on duplicate elements, first means for retaining the elements, second means disposed relative to the first means for obtaining a conveyance of elements from the first means, third means disposed relative to the second means for receiving elements from the second means, fourth means normally disposed in a first state to prevent a transfer of elements from the second means and operative to a second state to obtain a transfer of elements from the second means, fifth means responsive only to particular elements on the second means and operatively coupled to the fourth means to obtain an operation of the fourth means in the second state for a transfer of the particular elements from the second means, sixth means responsive to the transfer of the particular elements from the second means by the fourth means for obtaining a reproduction on duplicate elements of information on the particular elements, and seventh means operatively coupled to the sixth means and the fourth means for obtaining a resetting of the fourth means to the first state upon the reproduction on duplicate elements of information on the particular elements.

15. In the combination set forth in claim 14, eighth means normally operative in a first state to prevent a transfer of elements from the first means to the second means and operative to a second state to provide for a transfer of elements from the first means to the second means, and ninth means operatively coupled to the eighth means and to the third means for obtaining an operation of the eighth means in the second state upon a reception of each element by the third means.

16. In combination for processing a plurality of elements each having a plurality of bits of information and for providing for the reproduction of information on duplicate elements, first means for retaining the elements, second means disposed relative to the first means for obtaining a conveyance of elements from the first means, third means disposed relative to the second means for receiving elements from the second means, fourth means disposed between the first and third means and operative in a first state to prevent a transfer of elements from the second means and operative in a second state to obtain a transfer of elements from the second means, fifth means responsive only to particular elements on the second means and operatively coupled to the fourth means to maintain an operation of the fourth means in the second state for a transfer of the particular elements from the second means, sixth means operatively coupled to the fifth means and operative in a first state for preventing any reproduction of information on duplicate elements and operative in a second state for obtaining a reproduction on duplicate elements of information on the particular elements transferred by the fourth means from the second means, seventh means operatively coupled to the sixth means for obtaining a return of the particular elements to the second means upon the reproduction on duplicate elements of information on the particular elements, and eighth means operatively coupled to the fourth and sixth means for obtaining a resetting of the fourth and sixth means to the first state upon the reception of each element by the third means.

17. In the combination set forth in claim 16, ninth means normally operative in a first state to prevent a transfer of elements from the first means to the second means and operative in a second state to provide for a transfer of elements from the first means to the second means, and tenth means operatively coupled to the ninth means and to the third means for obtaining an operation of the ninth means in the second state upon a reception of each element by the third means.

18. An information storage and reproducing system for use with information cards bearing identifying data to obtain a reproduction of such information cards comprising;

means for storing identification data in the system, said means including manually operable switches to store data by manual entry, and said means including a register to store data read from information cards;

a card transport conveyor;

means for feeding said cards to said conveyor;

means for reading identifying data on cards transported by said conveyor;

means coupled to said reading means and to said register to enter into said register data read from a first card;

means coupled to said register and to said switches and to said reading means for comparing stored data with data read from a card;

means coupled to said comparing means for recognizing a difference between the stored data and read data;

means coupled to said recognizing means and responsive to recognition of a difference between data stored in the register and data read from a second card subsequent to said first card, for removal of said second card from said conveyor;

and means coupled to said recognizing means and responsive to a recognition of equivalence of data stored by said switches and read data to produce a copy of the document.

19. An information storage and reproducing system for use with information cards bearing identifying data and timing data to obtain a reproduction of information on documents comprising:

means for storing identification data in the system, said means including manually operable character switches to store data by manual entry, and said means including a register to store data read from information cards;

a card transport conveyor;

means for feeding said cards to said conveyor;

means for reading identifying data on cards transported by said conveyor;

means for reading timing data on cards transported by said conveyor;

a timing generator coupled to said timing data reading means to produce sampler signals for data sampling and to produce count signals;

means coupled to said timing generator and to said identifying data reading means and to said register to enter into said register identifying data read from a first card;

a counter having an input coupled to said timing generator and having outputs coupled to said character switches to energize said switches;

character switch data generating gates coupled to said character switches and to selected counter outputs to sequentially read out to a switch data output line, data stored by said character switches;

means coupled to said register and to said switch data line and to said identifying data reading means for comparing stored data with data read from a card;

means coupled to said comprising means for recognizing a difference between the stored data and read data;

means coupled to said recognizing means and responsive to recognition of a difference between data stored in the register and data read from a second card subsequent to said first card, for removal of said second card from said conveyor;

and means coupled to said recognizing means and responsive to a recognition of equivalence of data stored by said switches and read data to produce a copy of the document.

20. An information storage and reproducing system for use with information cards bearing identifying data and timing data to obtain a reproduction of information on documents comprising:

means for storing identification data in the system, said means including manually operable switches to store data by manual entry, and said means including a register to store data read from information cards;

a card transport conveyor including strands carried longitudinally between spaced pulleys, said strands being laterally spaced;

means for feeding one of said cards at a time to said strands;

means for reading identifying data on cards transported by said conveyor;

means coupled to said reading means and to said register to enter into said register data read from a first card;

means coupled to said register and to said switches and to said reading means for comparing stored data with data read from a card;

means coupled to said comparing means for recognizing a difference between the stored data and read data;

means coupled to said recognizing means and responsive to recognition of a difference between data stored in the register and data read from a second card subsequent to said first card, for removal of said second card from said conveyor, said means for removal including a ramp movable into the path of a card on the conveyor;

and means coupled to said recognizing means and responsive to a recognition of equivalence of data stored by said switches and read data to produce a copy of the document.

21. An information storage and reproducing system for use with information cards bearing a track of binary code markings representing a series of card identifying characters to obtain a reproduction of information on documents comprising:

means for storing identification data in the system, said means including a plurality of groups of manually operable switches in electrical circuit relation to store data by manual entry, each of said groups having a manual actuator to select a combination of switched conditions of switches in the group and each group having output means coupled to said switches for producing electrical binary outputs representative of a character selected by said actuator, and said storing means including a register to store data read from information cards;

a card transport conveyor;

means for feeding said cards to said conveyor;

means for reading binary code markings on cards transported by said conveyor;

means coupled to said reading means and to said register to enter into said register binary bits corresponding to markings read from a first card;

means coupled to said register and to said switches and to said reading means for comparing stored data with data read from a card;

means coupled to said comparing means for recognizing a difference between the stored data and read data;

means coupled to said recognizing means and responsive to recognition of a difference between data stored in the register and data read from a second card subsequent to said first card, for removal of said second card from said conveyor;

and means coupled to said recognizing means and responsive to a recognition of equivalence of data stored by said switches and read data to produce a copy of the document.

22. In an information storage and reproducing system having an information card transport conveyor, and having means for reading identifying data on a card transported by said conveyor, and having a reproducing station to intercept a card transported by said conveyor and produce a copy of a portion thereof, and including card release gates for supporting a card intercepted by said reproducing station, and including a print switch operable by a card upon interception by said reproducing station, and including a driving means, and having a carriage supporting said gates and adapted to be moved in translation from a home position by said driving means, and having a cam coupled to said carriage for movement in synchronism therewith, and having a vacuum pump with an intake and an exhaust, and having a solenoid valve with input lines coupled to said intake and exhaust and with an output line communicable with said carriage for alternatively coupling said intake and said exhaust to a card in the carriage, a control circuit comprising:

a source of electrical energy;

a print relay coupled to said print switch and to said source of electrical energy and controlled by said print switch;

a scan solenoid for engaging said driving means with said carriage upon energization of said solenoid, said solenoid having an operating winding coupled in a first serial coupling across said source of energy, said first serial coupling including normally closed contacts of a counter relay, normally open contacts of said print relay, normally closed contacts of an end-of-first-scan switch operable by said cam at a predetermined point of movement in translation of said carriage, and normally closed contacts of a brake relay, to initiate a scan upon closure of the said contacts of the print relay;

a scan relay coupled across said scan solenoid winding;

a card release gate solenoid to open said gates to release a card after reproduction, said card release gate solenoid having a winding in a second serial coupling across said source of electrical energy, said second serial coupling including normally closed contacts of a brake relay, normally open contacts of a counter relay, and normally open contacts of a home switch, said home switch being operable by said cam;

a solenoid valve control winding for said solenoid valve in a third serial coupling across said source of electrical energy, said third serial coupling including normally closed contacts of a switch operable by opening of said gates upon release of a card from said reproduce station and said third serial coupling including normally open contacts of said print relay;

an advance solenoid to advance a stepping switch, said solenoid having a winding in a fourth serial coupling across said source of electrical energy, said fourth serial coupling including in series with said advance solenoid winding, normally closed contacts of said scan relay, and normally closed contacts of said home switch;

a brake motor in a fifth serial coupling across said source of electrical energy, said fifth serial coupling including a parallel combination of a resistance and normally open contacts of a full brake switch operable by said cam, and normally open contacts of said brake relay, the normally open contacts of said brake relay in said fifth serial coupling being connected in parallel with the normally closed contacts of said scan relay and the normally closed contacts of said home switch in said fourth serial coupling;

a brake relay winding in a sixth serial coupling with a normally closed contact of said full brake switch, said sixth serial coupling being coupled in parallel with a portion of said fifth serial coupling;

a counter relay winding in a seventh serial coupling with a copy quantity selector switch and with a stepping switch across said source of electrical energy, said stepping switch being stepped along by energization of said stepping switch solenoid winding;

whereby said scan solenoid winding is energized by operation of the print switch by an intercepted card and remains energized after closure of the normally open contacts of the print relay in series with said scan solenoid winding during simultaneous closed contact conditions of the end-of-first-scan switch contacts in series therewith and of the normally closed brake relay contacts in series therewith to provide repetitious scans for a number of times to obtain a quantity of copies selectable by said selector switch.

23. In an information storage and reproducing system having an information card transport conveyor, and having means for reading identifying data on a card transported by said conveyor, and having a reproducing station to intercept a card transported by said conveyor and produce a copy of a portion thereof, and including a card release gate for supporting a card intercepted by said reproducing station, and including a print switch operable upon interception of a card by said reproducing station, and including a driving means and a carriage supporting said gates and adapted to be moved in translation from a home position by said driving means, and having a cam coupled to said carriage for movement in synchronism therewith, a control circuit comprising:

a source of electrical energy;

a print relay coupled to said print switch and to said source of electrical energy and controlled by said print switch;

a scan solenoid for engaging said driving means with said carriage, said solenoid having a winding coupled in a first serial coupling across said source of energy, said first serial coupling including contacts of said print relay, contacts of an end of scan switch operable by said cam at a predetermined point of movement in translation of said carriage, to initiate a scan upon operation of the contacts of the print relay;

and a card release gate solenoid to operate said gate to release a card after reproduction, said gate solenoid having a winding in a second serial coupling across said source of electrical energy, said second serial coupling including open contacts of a home switch, said home switch being operable by said cam upon return of said carriage to home position after a scan to cause release of a card.

References Cited by the Examiner

UNITED STATES PATENTS

| | | | |
|---|---|---|---|
| 2,172,330 | 9/1939 | Bryce | 88—24 |
| 2,209,324 | 7/1940 | Loughridge et al. | 88—24 |
| 2,251,998 | 8/1941 | Goodale | 88—24 |
| 2,580,270 | 12/1951 | Badgley et al. | 88—24 |
| 2,594,338 | 4/1952 | Shaw | 88—24 |
| 2,741,960 | 4/1956 | Oldenbloom | 88—24 X |
| 2,910,667 | 10/1959 | Lubkin | 340—146.2 |
| 2,946,983 | 7/1960 | Borders | 340—146.2 |
| 2,959,768 | 11/1960 | White | 340—146.2 |
| 2,984,821 | 5/1961 | Seigle | 340—146.2 |

NORTON ANSHER, *Primary Examiner.*

JOHN M. HORAN, *Examiner.*

R. A. WINTERCORN, *Assistant Examiner.*